(12) United States Patent
Kondo et al.

(10) Patent No.: US 7,980,704 B2
(45) Date of Patent: Jul. 19, 2011

(54) AUDIOVISUAL SYSTEM INCLUDING WALL-INTEGRATED AUDIOVISUAL CAPABILITIES

(75) Inventors: Tetsujiro Kondo, Tokyo (JP); Tetsushi Kokubo, Kanagawa (JP); Yasushi Tatehira, Kanagawa (JP); Kenji Tanaka, Kanagawa (JP); Hitoshi Mukai, Kanagawa (JP); Hirofumi Hibi, Kanagawa (JP); Kazumasa Tanaka, Chiba (JP); Akihiko Arimitsu, Kanagawa (JP); Junichi Shima, Kanagawa (JP); Tsugihiko Haga, Tokyo (JP); Nobuyuki Nakamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 518 days.

(21) Appl. No.: 12/066,663

(22) PCT Filed: Sep. 14, 2006

(86) PCT No.: PCT/JP2006/318670
§ 371 (c)(1),
(2), (4) Date: Jun. 18, 2008

(87) PCT Pub. No.: WO2007/032553
PCT Pub. Date: Mar. 22, 2007

(65) Prior Publication Data
US 2009/0100767 A1 Apr. 23, 2009

(30) Foreign Application Priority Data

| Sep. 14, 2005 | (JP) | 2005-266259 |
| Sep. 14, 2005 | (JP) | 2005-266260 |
| Sep. 14, 2005 | (JP) | 2005-266262 |
| Sep. 15, 2005 | (JP) | 2005-267803 |
| Sep. 16, 2005 | (JP) | 2005-269556 |

(51) Int. Cl.
G03B 21/14 (2006.01)
G03B 21/00 (2006.01)
(52) U.S. Cl. .................................... 353/79; 353/122
(58) Field of Classification Search .................... 353/79, 353/122, 48, 71
See application file for complete search history.

(56) References Cited

U.S. PATENT DOCUMENTS

| 5,546,469 | A * | 8/1996 | Donahoe | 381/152 |
| 5,580,249 | A * | 12/1996 | Jacobsen et al. | 434/11 |
| 6,202,360 | B1 * | 3/2001 | Rattner et al. | 52/36.4 |
| 6,431,711 | B1 * | 8/2002 | Pinhanez | 353/69 |
| 2005/0128184 | A1 * | 6/2005 | McGreevy | 345/156 |

FOREIGN PATENT DOCUMENTS

| JP | 4 204842 | 7/1992 |
| JP | 5 168080 | 7/1993 |
| JP | 3105332 | 9/1993 |
| JP | 6 58669 | 8/1994 |
| JP | 7 219448 | 8/1995 |
| JP | 2001 107586 | 4/2001 |

* cited by examiner

*Primary Examiner* — Thanh X Luu
(74) *Attorney, Agent, or Firm* — Oblon, Spivak, McClelland, Maier & Neustadt, L.L.P.

(57) ABSTRACT

There is a need for being able to excellently audiovisually receive contents without disordering a room atmosphere. An audiovisual room 1 is provided with one wall including an inner wall 2 and an outer wall 3. Part or all of the inner wall 2 forms a rear-projection screen 6C or a diaphragm (speaker unit) 6A. Equipment such as a projector 10 and an amplifier is placed in a space between the inner wall 2 and the outer wall 3. The space is large enough for a person to enter. Accordingly, a serviceperson etc. can enter the space to easily do works such as maintaining the equipment. The equipment such as the projector is not placed in the audiovisual room 1, making it possible to audiovisually receive contents without disordering a room atmosphere.

9 Claims, 81 Drawing Sheets

FIG. 15A

41: AUDIOVISUAL ROOM
2: INNER WALL
3: OUTER WALL
2A: CEILING
3A: UNDER-THE-ROOF PORTION
42: LEG
2B: FLOOR
3B: UNDER-THE-FLOOR PORTION

FIG. 15B

FIG.26A1
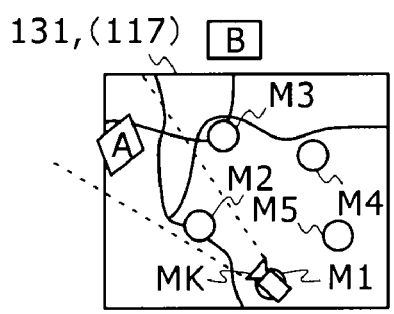
FIG.26A2
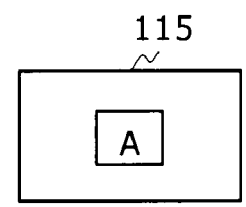
FIG.26B1
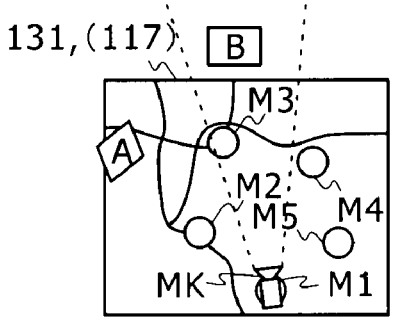
FIG.26B2
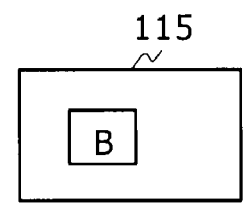
FIG.26C1
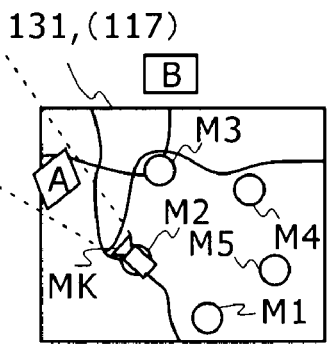
FIG.26C2
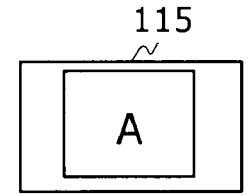

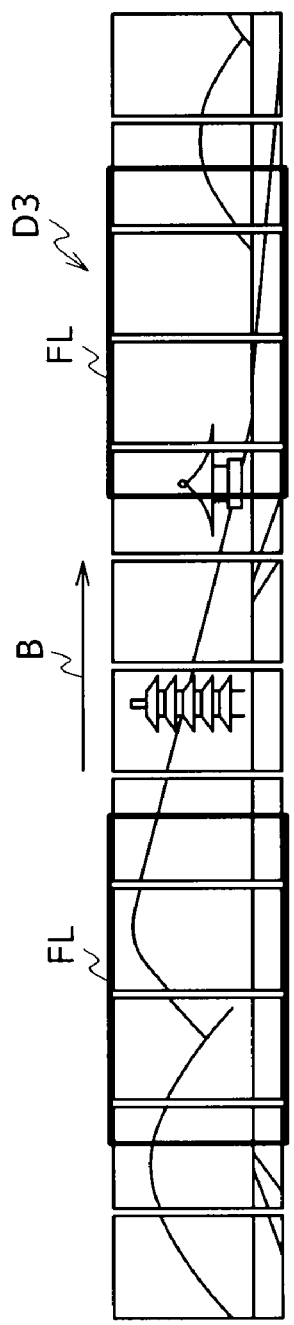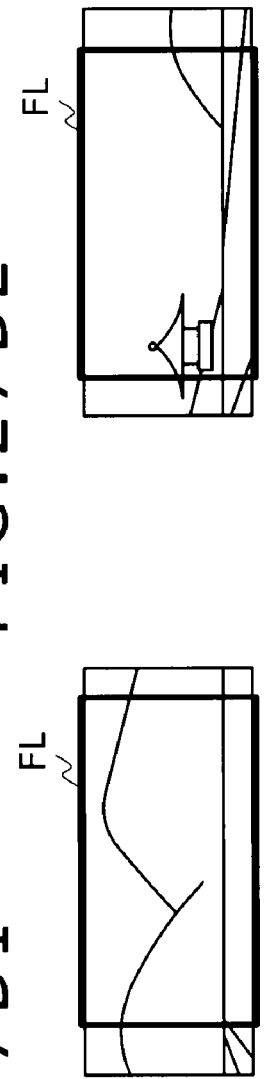

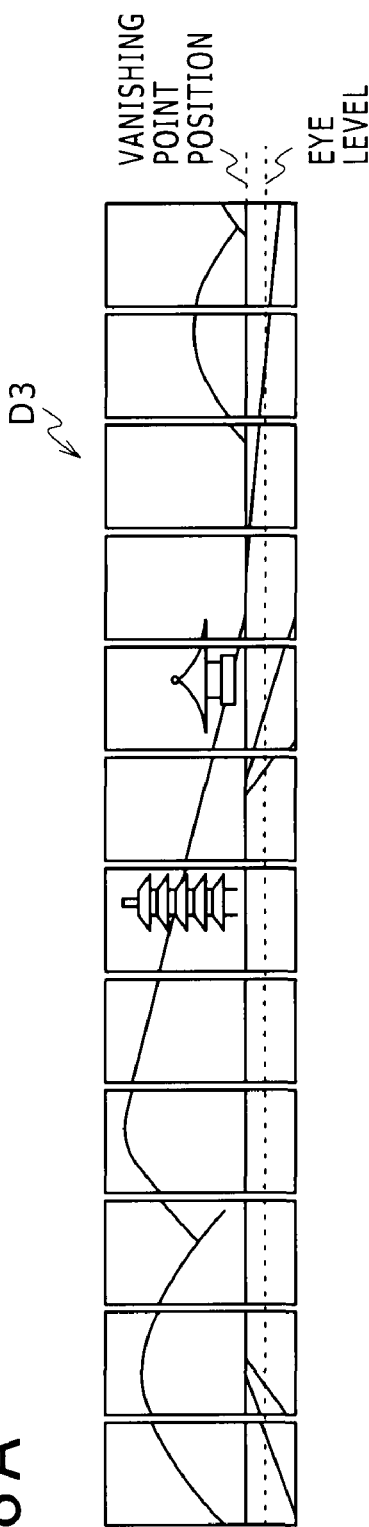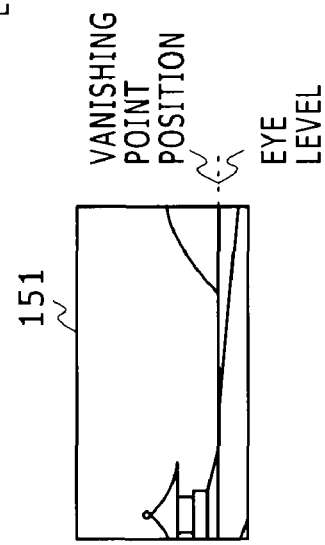
FIG. 28A
FIG. 28B

SELECT SPOT ⇩   ⇧ RETURN

FIG.38

IMAGE LUMINANCE

FIG.39

| IMAGE ID | ILLUMINATION CONTROL INFORMATION |
|---|---|
| ⋮ | ⋮ |

(SIDE VIEW)

203: TABLE SURFACE

208: TABLE BASE (BOTTOM VIEW)

203: TABLE SURFACE

208: TABLE BASE

201G

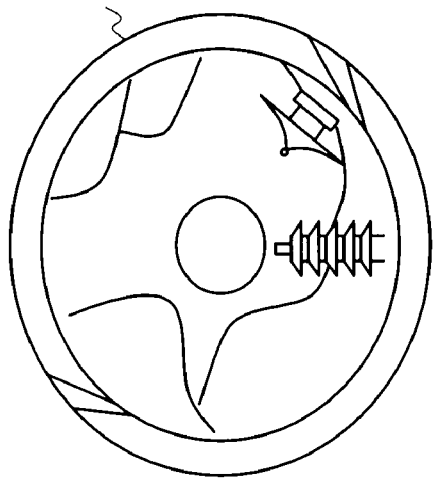
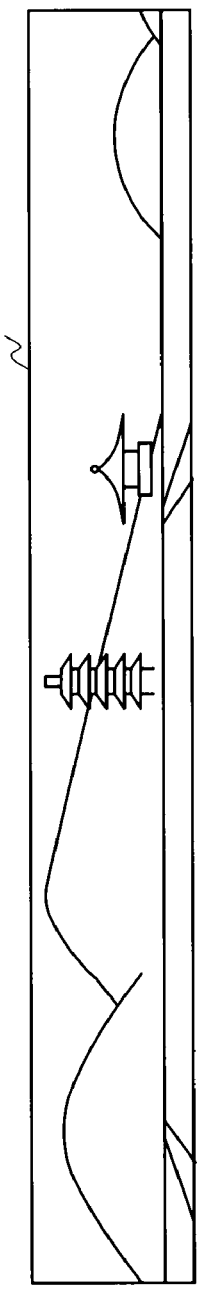
FIG.75A (CIRCULAR)
FIG.75B (RECTANGULAR)

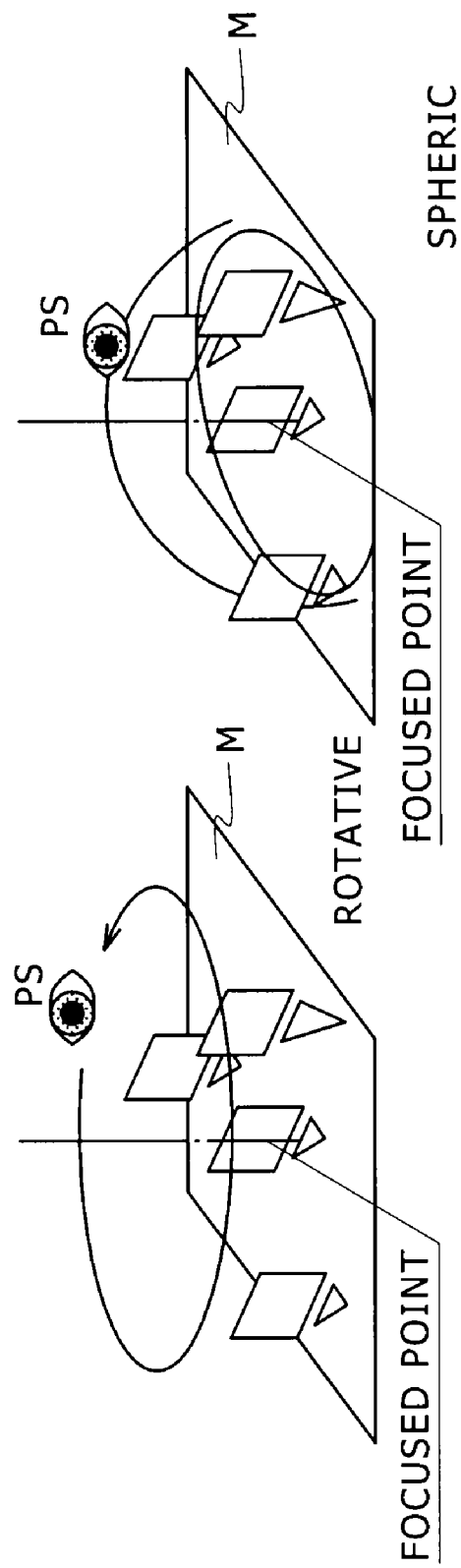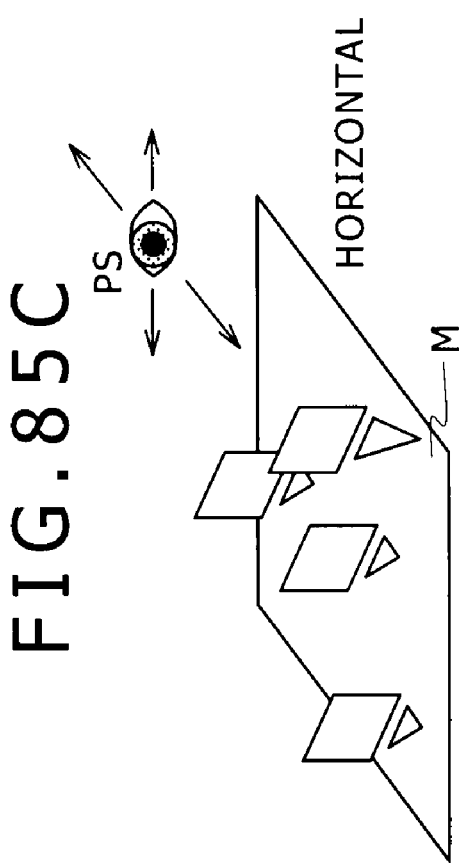

AUDIOVISUAL SYSTEM INCLUDING WALL-INTEGRATED AUDIOVISUAL CAPABILITIES

BACKGROUND OF THE INVENTION

1. Technical Field

The present invention relates to an audiovisual system for audiovisually receiving contents. More specifically, the invention relates to an audiovisual system that is placed in a room having at least one wall including an inner wall and an outer wall and in a space between the inner and outer walls and equips the inner wall with equipment for maximizing at least a video display function or an audio output function so as to be capable of excellently audiovisually receiving contents without disordering a room atmosphere.

2. Background Art

In related art, an audiovisual room for appreciating video contents is furnished with equipment such as a projector needed for processes associated with various video contents.

The projector is used to appreciate video contents on a large screen. A so-called front projector radiates video light to the front of a screen to display an intended video. A rear-projection projector radiates video light to the rear of a screen to display an intended video. The front projector independently provides a construction for radiating video light and the screen. The construction for radiating video light is provided on a ceiling or the like. By contrast, the rear-projection projector integrally forms the construction for radiating video light and the screen.

Concerning such audiovisual room for appreciating contents, for example, JP-A No. 168080/1993 proposes a technique for ensuring an intended space-saving acoustic field by creating a speaker cabinet using a shape and a material suited for an audiovisual room.

DISCLOSURE OF THE INVENTION

A multi-screen display system uses multiple projectors to display high-resolution video on a large screen. When multiple projectors are used for multi-screen display, many projectors need to be placed in a room and may disorder the room ambience. Even when the room is furnished with just an apparatus for appreciating a video content, the room ambience may be disordered depending on a user or a room structure.

It is therefore an object of the invention to provide an audiovisual system capable of excellently receiving audiovisually contents without disordering a room atmosphere.

The concept of the present invention lies in an audiovisual system for audiovisually receiving contents, comprising: a room having at least one wall including an inner wall and an outer wall provided with a specified interval therebetween; and equipment that is placed in a space between the inner wall and the outer wall in the room and provides the inner wall with equipment enabling at least one of a video display function and an audio output function.

According to the invention, a room has at least one wall including an inner wall and an outer wall provided with a specified interval therebetween. In a space between the inner wall and the outer wall, equipment is placed for providing the inner wall with at least one of a video display function and an audio output function. For example, the space between the inner wall and the outer wall is large enough for a person to enter. In this case, a serviceperson etc. can enter the space and easily do works such as installing the equipment in the space between the inner wall and the outer wall and maintaining the equipment.

For example, part or all of the inner wall is constructed to provide a rear-projection screen (fogged glass, opaque acrylic plate, etc.) The equipment to be placed in a space between the inner wall and the outer wall includes a projector for projecting a video on the screen. In this case, for example, the projector is fixed to the outer wall so that a shorter direction corresponds to a wall thickness direction. Video light is emitted from the projector in a direction along the outer wall, reflected on a mirror, and radiated to the screen. In this case, the projector can be stably fixed to the solid outer wall. Further, in this case, a space between the inner wall and the outer wall does not become too narrow even when the projector is fixed to the outer wall. This is because the projector is fixed to the outer wall so that a shorter direction corresponds to a wall thickness direction. Moreover, in this case, the interval between the inner wall and the outer wall can be decreased because a light path for the video light is bent, i.e., the video light is emitted from the projector in a direction along the outer wall, reflected on a mirror, and radiated to the screen.

Further, for example, part or all of the inner wall forms a diaphragm provided with an oscillator. The equipment to be placed in a space between the inner wall and the outer wall includes a drive device such as an amplifier that drives the oscillator based on an audio signal.

In this manner, there are provided the room having at least one wall including the inner wall and the outer wall and the equipment that is placed in the space between the inner wall and the outer wall and provides the inner wall with equipment enabling at least one of a video display function and an audio output function. The equipment is not placed in the room, making it possible to excellently audiovisually receive contents without disordering a room atmosphere.

Meanwhile, for example, the room has a double ceiling structure including an under-the-roof portion and a ceiling provided with a specified interval to the under-the-roof portion or has a double floor structure including an under-the-floor portion and a floor provided with a specified interval to the under-the-floor portion. When the double ceiling structure or the double floor structure is used, the equipment such as a projector and an amplifier can be placed under the roof or the floor, for example.

Further, for example, the room has walls all including inner walls and outer walls each of which has a specified interval therebetween. The room has a double ceiling structure including an under-the-roof portion and a ceiling provided with a specified interval to the under-the-roof portion. The room has a double floor structure including an under-the-floor portion and a floor provided with a specified interval to the under-the-floor portion. The inner wall, the ceiling, and the floor form a structure that is supported by a plurality of legs against the under-the-floor portion. In this manner, a space can be formed for all of the wall, the ceiling, and the floor. In addition, the structure constructed by the inner walls, the ceiling, and the floor can be completely independent of the outer walls.

Moreover, for example, the room has walls all including inner walls and outer walls each of which has a specified interval therebetween. The room has a double ceiling structure including an under-the-roof portion and a ceiling provided with a specified interval to the under-the-roof portion. The room has a double floor structure including an under-the-floor portion and a floor provided with a specified interval to the under-the-floor portion. The ceiling and the floor are fixed to the outer wall. The inner wall is fixed to the ceiling and the floor. In this manner, a space can be formed for all of the wall, the ceiling, and the floor. In addition, the inner wall can be stably fixed to the outer wall through the ceiling and the floor.

Furthermore, for example, part or all of inner walls for the room include a plurality of replaceably supported plate-like members. In this manner, a room atmosphere can be variously changed by replacing differently decorated plate materials as needed. Further, it is possible to easily change the size of a rear-projection screen or the position of a diaphragm mounted with an oscillator.

Still further, for example, the room has a room entrance for entering an inside through the outer wall and the inner wall. The room entrance is sidewards provided with a space entrance for entering a space between the inner wall and the outer wall. In this manner, the space entrance can be easily provided without providing the space entrance for the inner wall or the outer wall.

The invention provides the room having at least one wall including the inner wall and the outer wall and the equipment that is placed in the space between the inner wall and the outer wall and provides the inner wall with at least one of a video display function and an audio output function. The equipment is not placed in the room, making it possible to excellently audiovisually receive contents without disordering a room atmosphere.

BRIEF DESCRIPTION OF DRAWINGS

FIGS. 15A and 15B show still another construction of the audiovisual system;

FIG. 26(A1), FIG. 26(A2), FIG. 26(B1), FIG. 26(B2) FIG. 26(C1), and FIG. 26(C2) show relationship between a bird's-eye image and a display on the background image display section;

FIG. 27(A), FIG. 27(B1), FIG. 27(B2), FIG. 27(C1), and FIG. 27(C2) show image displays on the background image display section;

FIGS. 28(A) and 28(B) show correction of an image display position based on a vanishing point;

FIG. 38 shows a luminance level change depending on a photograph orientation;

FIG. 39 illustrates illumination control information;

FIGS. 75A and 75B illustrate a process of a panoramic image conversion section;

FIGS. 85A, 85B, and 85C show examples of a bird's-eye viewpoint movement process;

BEST MODE FOR CARRYING OUT THE INVENTION (1) Audiovisual System

Figure 1:
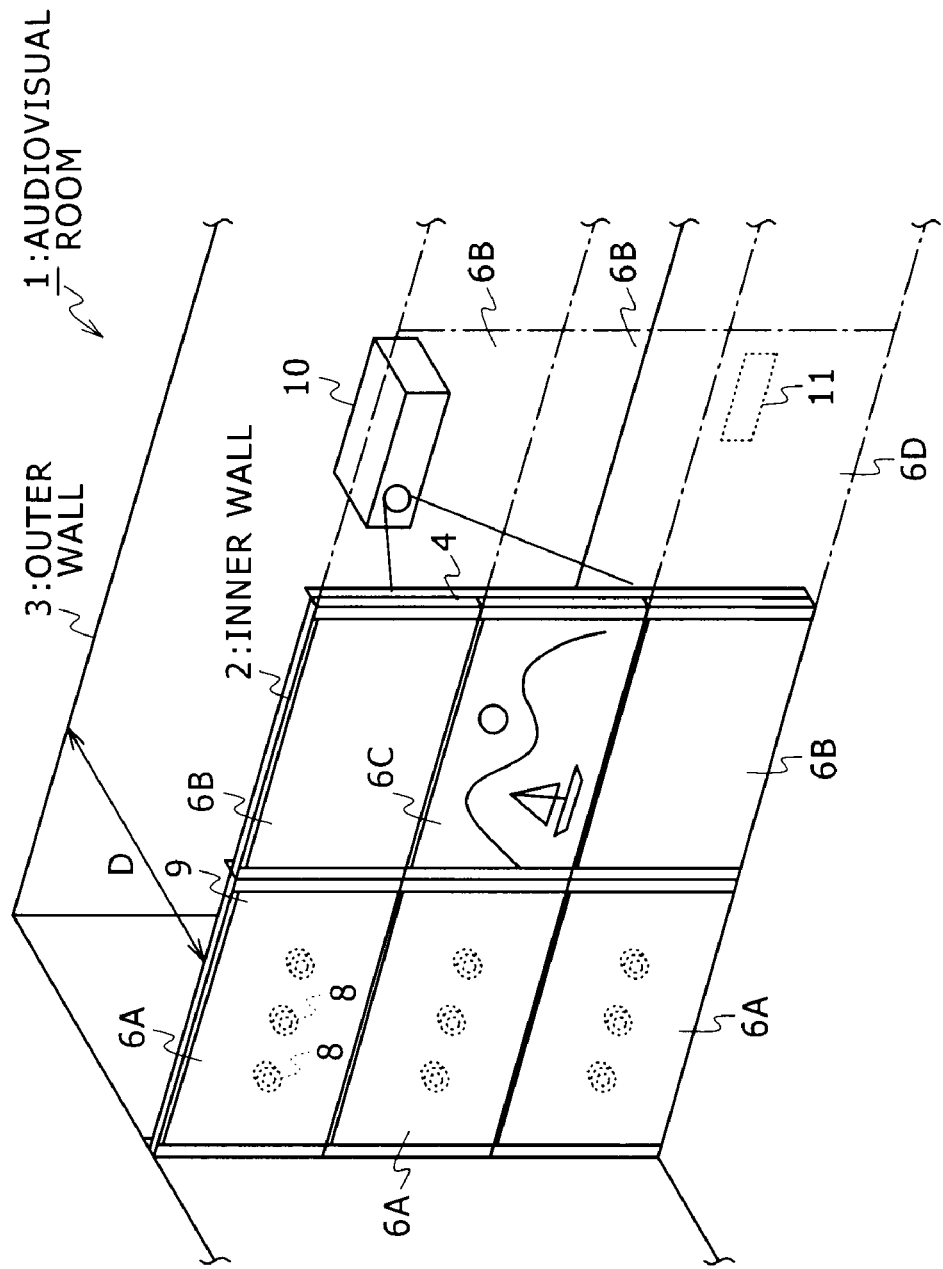
FIG. 1 is a perspective view showing a construction of a double-walled audiovisual system.

FIG. 1 shows a construction of the audiovisual system. The audiovisual system includes: an audiovisual room (room) 1 having one wall including an inner wall 2 and an outer wall 3 that maintain a specified interval therebetween; and equipment such as a projector 10 that is placed in a space between the inner wall 2 and the outer wall 3 and provides the inner wall 2 with at least a video display function or an audio output function.

The audiovisual room 1 is an audiovisual room formed in an ordinary home. The inner wall 2 is provided for one of four walls forming one room of the ordinary home. The one wall includes the inner wall 2 and the outer wall 3 and features a dual structure. Similarly to walls of an ordinary house, the three remaining walls and the outer wall 3 are formed by providing a decorative sheet for walls of a building structure, for example. A ceiling and a floor are formed in the same manner as a ceiling and a floor for an ordinary house.

Figure 2:
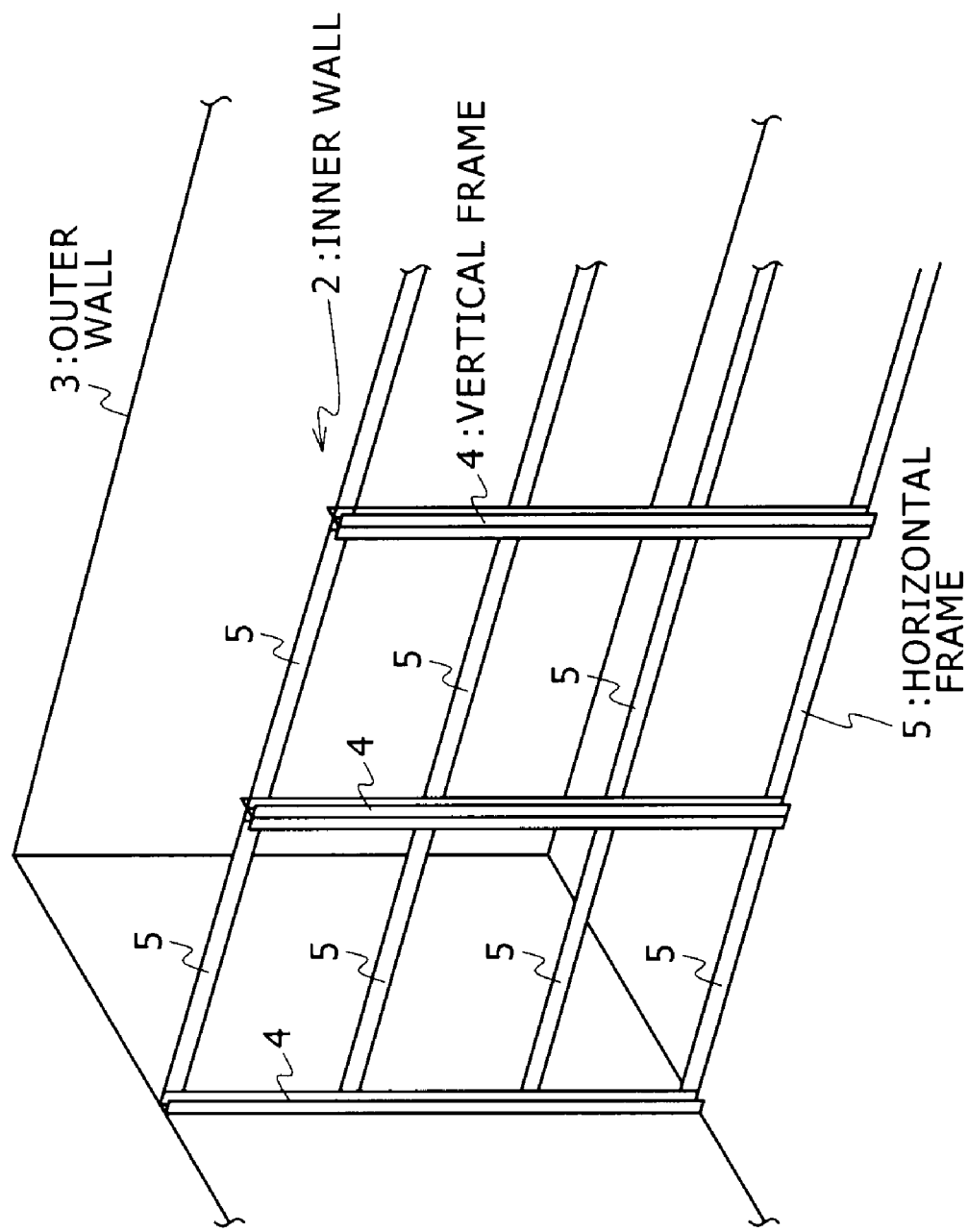
FIG. 2 is a perspective view of an inner wall frame construction.

As shown in FIG. 2, the inner wall 2 is formed by installing vertical frames 4 between the ceiling and the floor at a specified interval, horizontally attaching horizontal frames 5 between the vertical frames 4 to form a skeleton, and attaching plate-like units 6A through 6D to the skeleton as shown in FIG. 1. The plate-like units 6A through 6D are included in a plate-like member.

Figure 3:
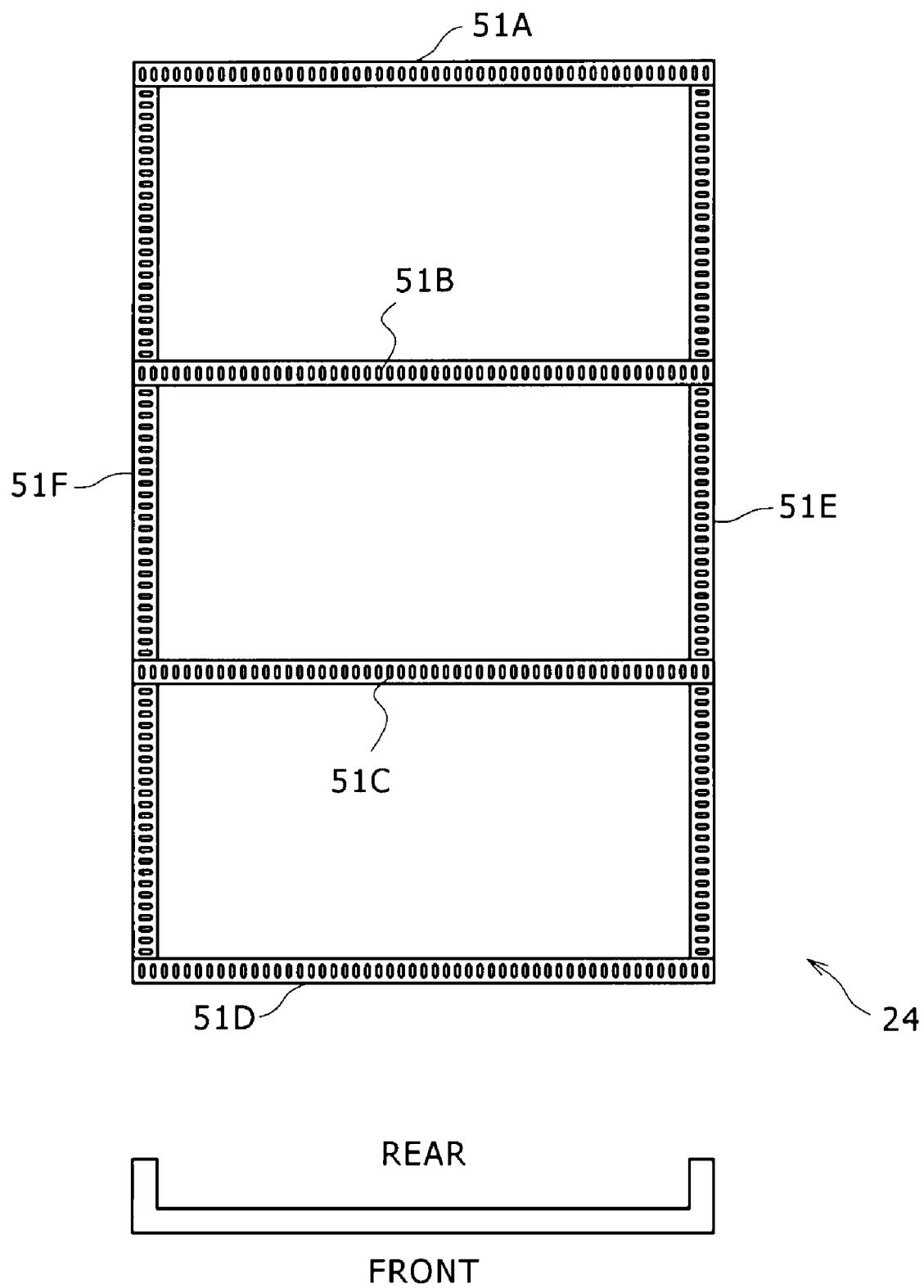
FIG. 3 schematically diagrams the inner wall frame construction.

The frame construction of the inner wall 2 will be described in more detail with reference to FIG. 3. FIG. 3 shows only a frame part 24 corresponding to a pair of vertical frames 4. An upper part of FIG. 3 shows the frame part 24 viewed from the front. A lower part of FIG. 3 shows the frame part 24 viewed from the top. That is, the frame part 24 has a right-angled U-shaped cross section of the surface for fixing the plate-like unit.

As shown in the upper part of FIG. 3, the frame part 24 includes six frames 51A through 51F. The frames 51E and 51F correspond to the vertical frames 4 in FIG. 2. The frames 51A through 51D correspond to the horizontal frames 5 in FIG. 2. The frames 51A through 51F each are made of a metal material, for example.

Figure 4:
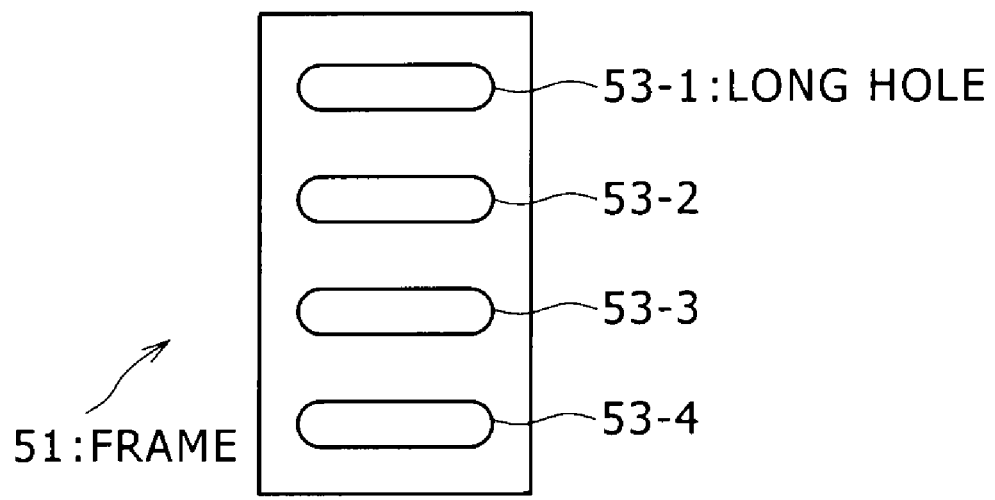
FIG. 4 is a partially enlarged view of the frame.

In addition, the frames 51A through 51F each have elongate holes (or circular holes) at a specified positions. The elongate holes are provided at specified positions so as to equally divide the respective frames 51A through 51F. When part of the frame 51 (frames 51A through 51F) is enlarged, the frame 51 has long elongate holes 53-1 through 53-4 at a specified interval in a shorter direction as shown in an example of FIG. 4.

That is, as shown in FIG. 3, a vertically long elongate hole is provided for each of the frames 51A through 51D included in the horizontal frame 5 out of frames 51A through 51F. A horizontally long elongate hole is provided for each of the frames 51E and 51F included in the vertical frame 4.

Figure 5:
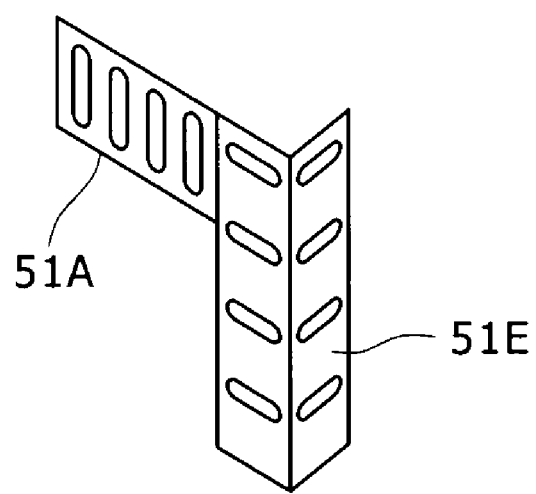
FIG. 5 shows how horizontal and vertical frames are welded.

Frames 51E and 51F are formed as L-shaped angle members and are fixed to each of the straight frames 51A through 51D by welding, for example. As shown in FIG. 5, for example, the straight frame (horizontal frame) 51A and the L-shaped frame (vertical frame) 51E are welded and fixed in the frame part 24. In this manner, as shown in the lower part of FIG. 3, the cross section becomes right-angled U-shaped.

That is, as will be described in detail, since the frame part 24 has the right-angled U-shaped cross section, the elongate holes provided for each of the frames 51E and 51F can be used not only on the front side but also on the left and right sides.

Next, details about fixing the plate-like unit to the above-mentioned frame part 24 will be described. Meanwhile, the frames 51A through 51F, unless needed to be distinguished individually, are simply referred to as the frame 51 in the following description.

Figure 6:
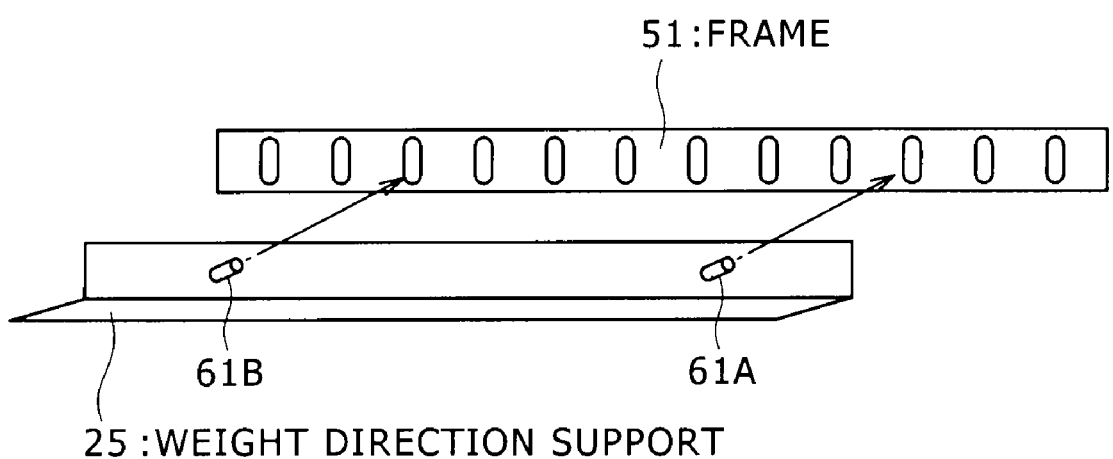
FIG. 6 shows how to fix a weight direction support to a horizontal frame.
Figure 7:
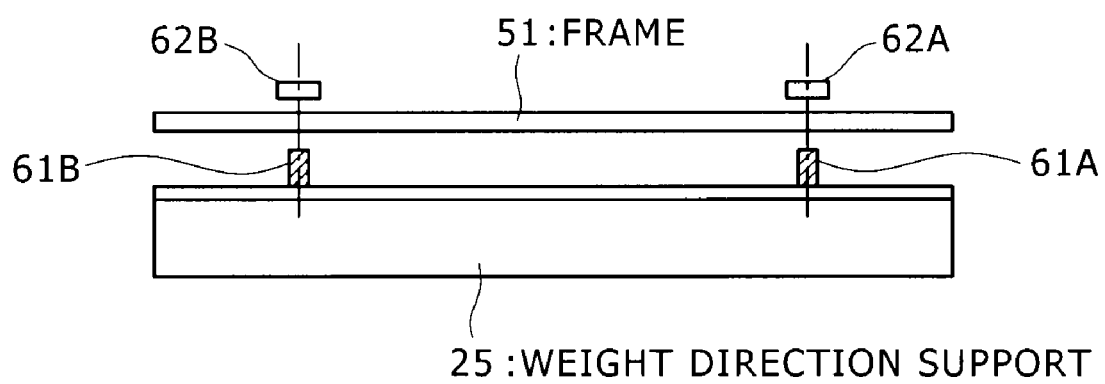
FIG. 7 shows how to fix a weight direction support to a horizontal frame.

FIGS. 6 and 7 are referenced to describe a weight direction support 25 that supports, in a weight direction, the plate-like unit to be attached to the frame part 24. FIG. 6 is a perspective view of the weight direction support 25 to be fixed to the frame 51. FIG. 7 is a top view of FIG. 6.

The weight direction support 25 is made of a metal material, for example. As shown in FIG. 6, the weight direction support 25 includes an L-shaped angle member. The L-shaped angle member is provided with a bolt 61A and a bolt 61B that can be each fit into elongate holes provided for the flame 51. The frame 51 is a horizontal frame and corresponds to the frames 51B through 51D.

When the weight direction support 25 is fixed to the frame 51, the bolt 61A and the bolt 61B of the weight direction support 25 are each fit into specified elongate holes of the frame 51 as shown in FIG. 7. A nut 62A and a nut 62B are respectively screwed on the bolt 61A and the bolt 61B that are fit.

Figure 8:
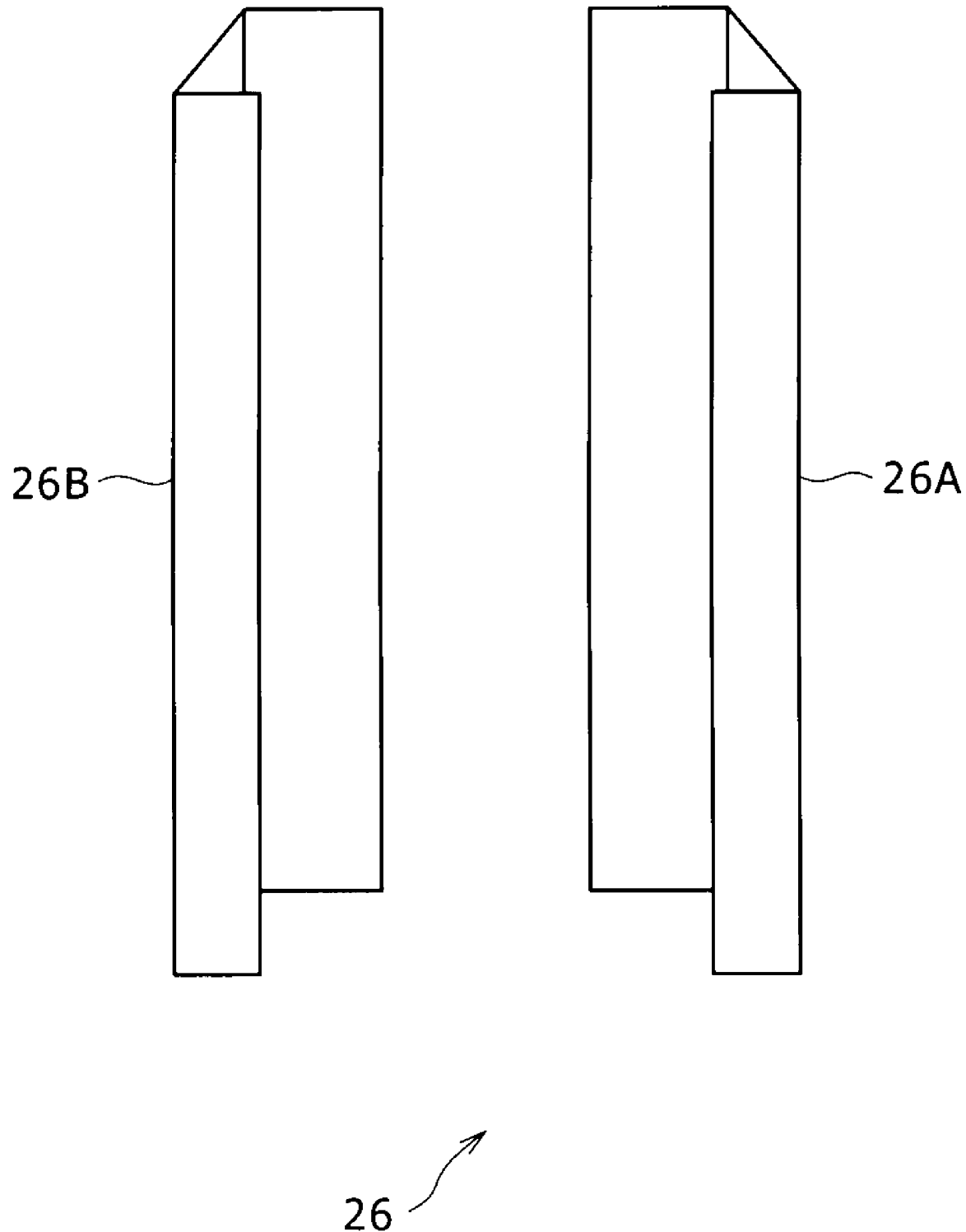
FIG. 8 shows a horizontal support for a plate-like unit.
Figure 9:
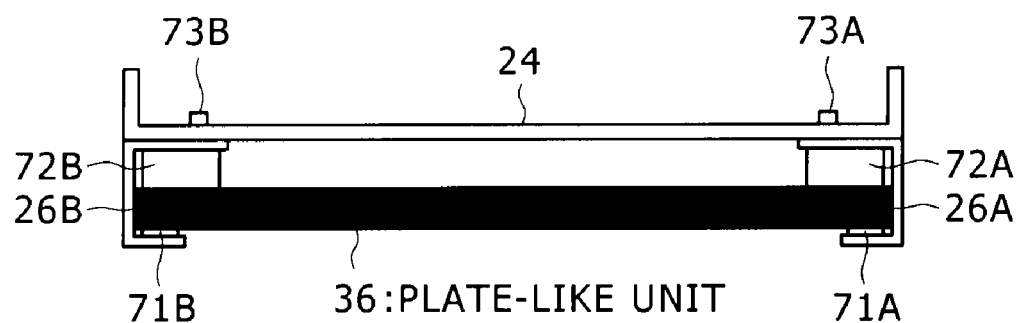
FIG. 9 shows how to fix the horizontal support to the frame.

FIGS. 8 and 9 are referenced to describe a horizontal support 26 that horizontally supports the plate-like unit to be attached to the frame part 24. The horizontal support 26 is made of a metal material, for example. As shown in FIG. 8, the horizontal support 26 (26A, 26B) is formed so as to be right-angled U-shaped when viewed cross-sectionally and is detachably mounted on the frame part 24. As shown in FIG. 9, the horizontal support 26 horizontally supports the plate-like unit 36 in such a manner that the horizontal supports 26A and 26B sandwich the plate-like unit 36 using the right-angled U-shaped form.

As shown in FIG. 9, the horizontal supports 26A and 26B each are provided with, for example, a specified number of bolts (not shown) that can be fit into the elongate holes provided for the frame (vertical frame) 51 of the frame part 24. The bolts are fit into the elongate holes of the frame 51 and are fixed by as many nuts (a nut 73A and a nut 73B according to the example in FIG. 9) as the bolts.

The horizontal supports 26A and 26B each sandwich the plate-like unit 36 together with specifically shaped cushioning materials (a cushioning material 71A, a cushioning material 71B, a cushioning material 72A, and a cushioning material 72B in FIG. 9) so that the plate-like unit 36 can be further sandwiched.

The cushioning material 71A, the cushioning material 71B, the cushioning material 72A, and the cushioning material 72B each are made of such material as urethane (sponge) or rubber. The cushioning material 71A and the cushioning material 71B each are provided toward the front of the plate-like unit 36 and the cushioning material 72A and the cushioning material 72B each are provided toward the rear of the plate-like unit 36 to absorb a shock applied to the plate-like unit 36 and protect it.

Further, when the plate-like unit 36 is removed from the frame part 24, the nut 73A screwed on the bolt provided for the horizontal support 26A is loosened. The horizontal support 26A is moved to the right along the elongate hole of the frame 51. Moreover, similarly, the nut 73B screwed on the bolt provided for the horizontal support 26B is loosened. The horizontal support 26B is moved to the left along the elongate hole of the frame 51. In this manner, the plate-like unit 36 can be removed.

In a state where the nuts 73A and 73B are completely removed from the bolts, the plate-like unit 36 can be also removed by pulling out the bolts provided for the horizontal supports 26A and 26B from the elongate holes of the frame 51 and removing the horizontal supports 26A and 26B from the frame part 24.

Figure 10:
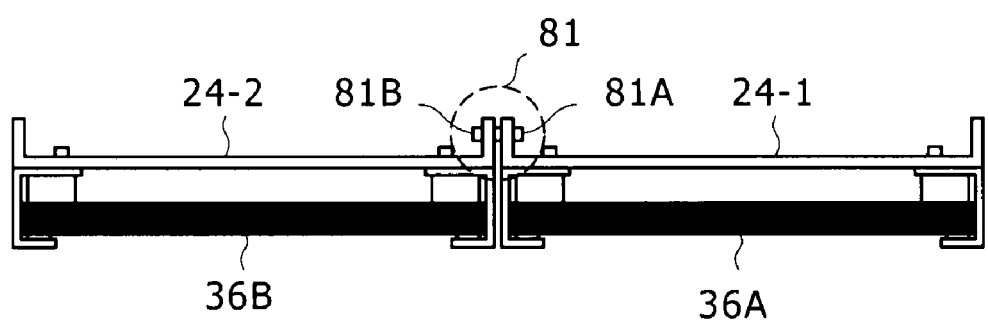
FIG. 10 shows how to connect multiple frames.

The frame construction of the inner wall 2 as shown in FIG. 2 horizontally provides only the specified number of the above-mentioned frame parts 24. FIG. 10 is referenced to describe a case of horizontally connecting the frame parts 24. FIG. 10 is a top view of connected frame parts 24-1 and 14-2.

As described with reference to FIGS. 3 and 5, the vertical frames 51E and 51F in the frame parts 24-1 and 24-2 are each formed as L-shaped angle members. The elongate holes provided for each of the frames 51E and 51F can be used not only on the front side but also on the left and right sides. That is, the frame parts 24-1 and 24-2 each have a right-angled U-shaped cross section of the surface for fixing each of the plate-like units 36A and 36B. Accordingly, the right-angled U-shaped form is used to horizontally connect the frame parts 24-1 and 14-2.

For example, a joint section 81 uses a bolt 81A and a nut 81B to fix a left side surface of the frame part 24-1 in the drawing and a right side surface of the frame part 24-2 in the drawing. That is, when the L-shaped frame 51F of the frame part 24-1 and the L-shaped frame 51E of the frame part 24-2 each are placed horizontally, the joint section 81 uses a specified number of bolts 81A and nuts 81B to fix the elongate holes provided for each of the opposite surfaces of the L-shaped forms.

As mentioned above, the inner wall 2 includes multiple replaceably supported plate-like units (plate-like members). Further, while FIG. 1 shows the inner wall 2 whose entire surfaces uses plate-like units, only part of the inner wall 2 may use multiple replaceably supported plate-like units. In this manner, the room atmosphere can be variously changed by replacing the plate-like units having different decorations as needed. Moreover, it is possible to easily change the size of a rear projection screen or the position of a diaphragm mounted with an oscillator.

Now referring back to FIG. 1, the plate-like units 6A through 6D are various function units for audiovisually receiving video contents and are arranged in the skeleton according to functions, designs, etc. needed for the audiovisual room 1. In the example of FIG. 1, a set of three plate-like units 6A having a speaker function is arranged between the vertical frames 4 at both ends of the inner wall 2. The plate-like unit 6A having the speaker function is hereafter referred to as a speaker unit depending on needs.

The speaker unit 6A is constructed by arranging an oscillator 8 driven and vibrated by an audio signal on a diaphragm 9 vibrated by vibration of the oscillator 8 at a constant interval. In this manner, the oscillator 8 is driven based on an audio signal to vibrate the diaphragm 9 and provide the function as a speaker. Further, the speaker unit 6A freely and vibratably holds the diaphragm 9 in a frame body, though not shown, to ensure sufficient strength and is formed so as to be capable of being arranged in the vertical frame 4. Moreover, the surface of the diaphragm 9 is provided with a decorative sheet such as saran.

The audiovisual room 1 includes a plate-like unit 6B simply functioning as a blind and a plate-like unit 6C functioning as a screen between the vertical frames 4 inside the speaker unit 6A. Further, in the description below, the plate-like unit functioning as the blind is referred to as a blank unit and the plate-like unit 6C functioning as the screen is referred to as a screen unit. Here, the blank unit 6B simply has the blind function and is made of a plate material such as a gypsum board whose surface is decorated On the other hand, the screen unit 6C has a screen function for a rear-projection projector and is formed by using a frame body to enforce a plate material applied to a screen of the rear-projection projector. Specifically, the frame body holds a fogged glass, an opaque acrylic plate, etc. for formation. The audiovisual room 1 includes the projector 10 corresponding to the screen unit 6C on the outer wall 3 positioned at the rear of the screen unit 6C. In this manner, the audiovisual room 1 is constructed to be capable of appreciating video of various video contents using the screen unit 6C.

Further, this audiovisual room 1 includes the blank unit 6B and a plate-like unit 6D functioning as a video apparatus operation section between the vertical frames 4 contiguous to the screen unit 6C. Meanwhile, the plate-like unit having the operation section function is hereafter referred to as an operation unit.

Here, the operation unit 6D is provided with a bay 11 where the video apparatus etc. are arranged. For example, the bay 11 is provided with a video apparatus that is provided in the audiovisual room 1 and requires a direct user operation, e.g., a DVD (Digital Versatile Disc) player or a video tape recorder whose recording medium needs to be replaced. Further, for example, the bay 11 is provided with a reception section that receives a remote controller signal from a remote commander needed for remotely controlling respective video apparatuses.

An apparatus other than the above-mentioned apparatuses using storage media is arranged in a space between the inner wall 2 and the outer wall 3. An interval D between the inner wall 2 and the outer wall 3 is so configured that a person can enter the space between the inner wall 2 and the outer wall 3, and install and maintain various video apparatuses. One of the blank units 6B is constructed to be removed from the front so as to form an entrance for a person who enters the space between the inner wall 2 and the outer wall 3.

According to the audiovisual system as shown in FIG. 1, one of the four walls in the audiovisual room 1 is formed by the inner wall 2 and the outer wall 3 that are arranged at a specified interval. The inner wall 2 is provided with the screen unit 6C and the speaker unit 6A. In addition, these projector 10 and speaker unit 6A are driven by a video signal and an audio signal related to video contents acquired from video apparatus (including apparatus using storage media installed at the bay 11) installed in the space between the inner wall 2 and the outer wall 3. In this manner, the screen unit 6C displays a video projected from the projector 10 and the speaker unit 6A outputs an audio.

According to the audiovisual system as shown in FIG. 1, one of the four walls includes the inner wall 2 and the outer wall 3 having the space therebetween. The inner wall 2 is provided with the screen unit 6C and the speaker unit 6A. The space between the inner wall 2 and the outer wall 3 is used to install the projector 10 and the other devices (equipment) related to video contents. The devices related to video contents are not installed in the audiovisual room 1, making it possible to excellently receive audiovisually contents without disordering a room atmosphere.

According to the audiovisual system as shown in FIG. 1, the inner wall 2 and the outer wall 3 are arranged so as to ensure a given interval large enough for a person to enter. Accordingly, a serviceperson etc. can enter the space for works such as installing various video apparatuses in the space between the inner wall 2 and the outer wall 3 and maintaining various video apparatuses installed in this space, making it possible to improve workability.

According to the audiovisual system as shown in FIG. 1, the inner wall 2 is made of multiple plate material units. A specified number of plate-like units form the speaker unit 6A. In this manner, the entire wall surface has the speaker function. Accordingly, this audiovisual system makes it possible to audibly appreciate video contents without installing a speaker in the audiovisual room 1 and can further prevent a room atmosphere from being disordered. In this case, high-quality sounds are also available because the speaker-related inner wall is divided into multiple portions.

According to the audiovisual system as shown in FIG. 1, the inner wall 2 is formed of multiple replaceably supported plate-like units. An audiovisual room atmosphere can be variously changed by replacing differently decorated plate materials as needed. Further, it is possible to easily change the screen size and the speaker position. Moreover, this plate material unit can be removed to make an entrance to the space.

Figure 11:
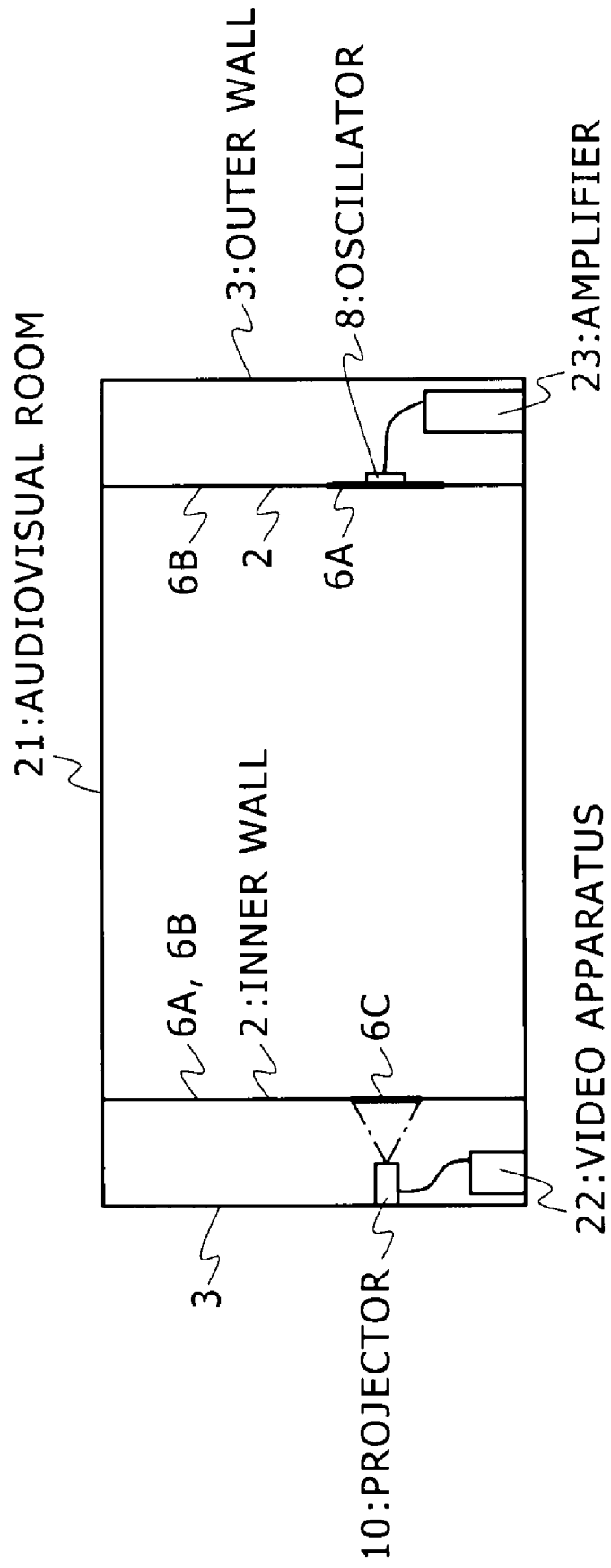
FIG. 11 shows another construction of the audiovisual system.

FIG. 11 shows another construction of the audiovisual system. This audiovisual system includes: an audiovisual room (room) 21 including the inner wall 2 and the outer wall 3 having a specified interval therebetween; and equipment such as the projector 10 that is installed in a space between the inner wall 2 and the outer wall 3 and allows the inner wall 2 to provide at least the video display function or the audio output function. The mutually corresponding parts in FIGS. 11 and 1 are designated by the same reference numerals.

That is, in this audiovisual system, opposite two of the four walls are made of the inner wall 2 and the outer wall 3 having the space therebetween. Of the two opposite walls, one inner wall 2 includes the speaker unit 6A and the blank unit 6B. The space between the inner wall 2 and the outer wall 3 is used to install an amplifier 23 for driving the speaker unit 6A.

The other inner wall 2 includes the screen unit 6C, the blank unit 6B, and the speaker unit 6A. A video apparatus 22 is installed in the space between the inner wall 2 and the outer wall 3 used for installing the screen unit 6C. The video apparatus 22 corresponding to the installed screen unit 6C transmits audio data to the amplifier 23 using radio communication such as Bluetooth, for example.

Except the above-mentioned construction, the audiovisual system in FIG. 11 is constructed similarly to the audiovisual system as shown in FIG. 1. The audiovisual system as shown in FIG. 11 can provide the same effect as that of the audiovisual system as shown in FIG. 1 by using the inner wall 2 and the outer wall 3 to form opposite two of the four walls. In this case, a realistic acoustic field is available because the speaker is also provided at the rear of the screen.

Figure 12:
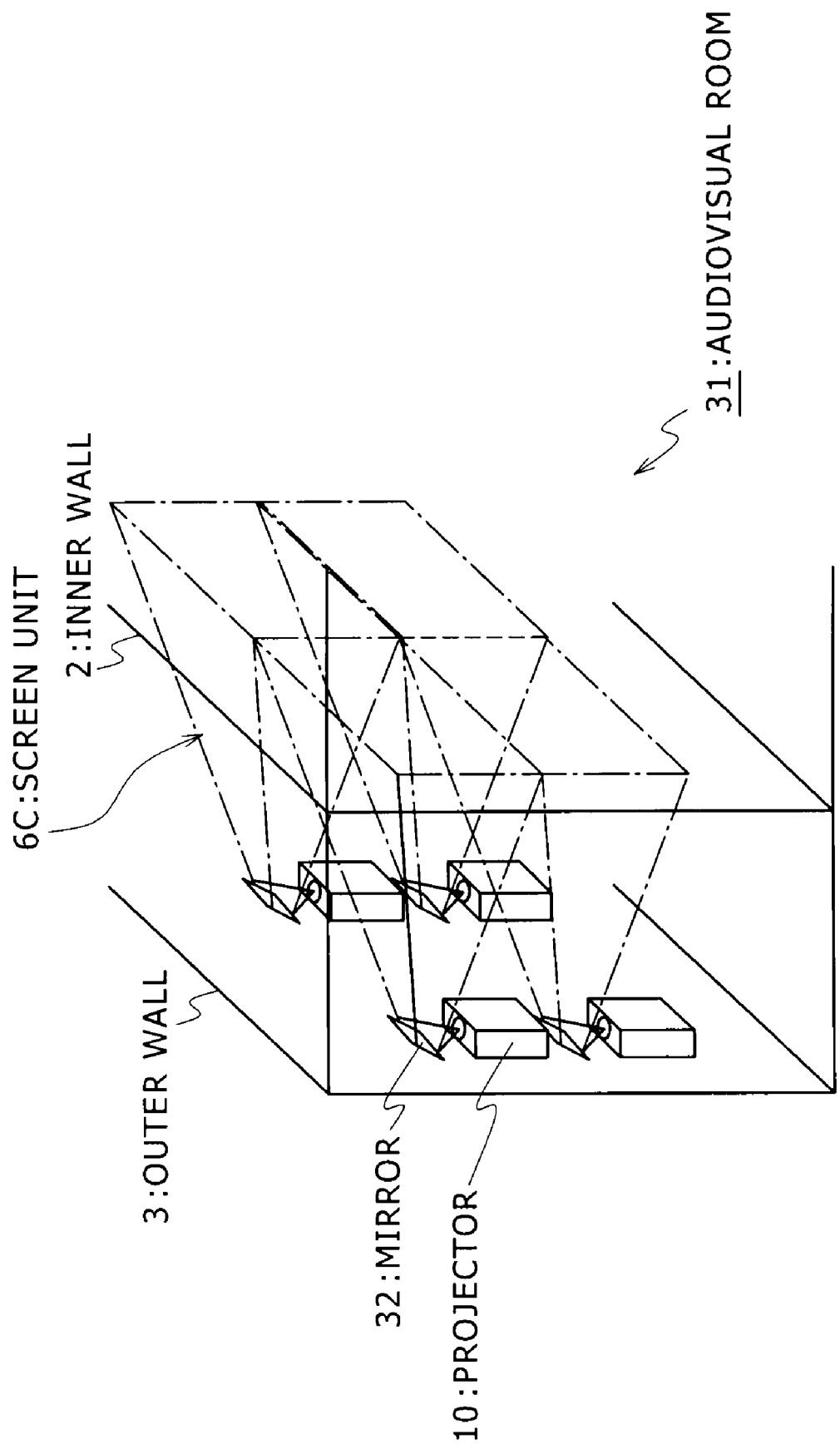
FIG. 12 shows another construction of the audiovisual system.

FIG. 12 shows another construction of the audiovisual system. In this audiovisual system, a large-sized screen unit 6C is provided for the inner wall 2 of an audiovisual room 31. In addition, multiple projectors 10 are provided at the rear of this large-sized screen unit 6C. These multiple projectors 10 provide a multi-screen display to display high-resolution video on a large screen.

Figure 13:
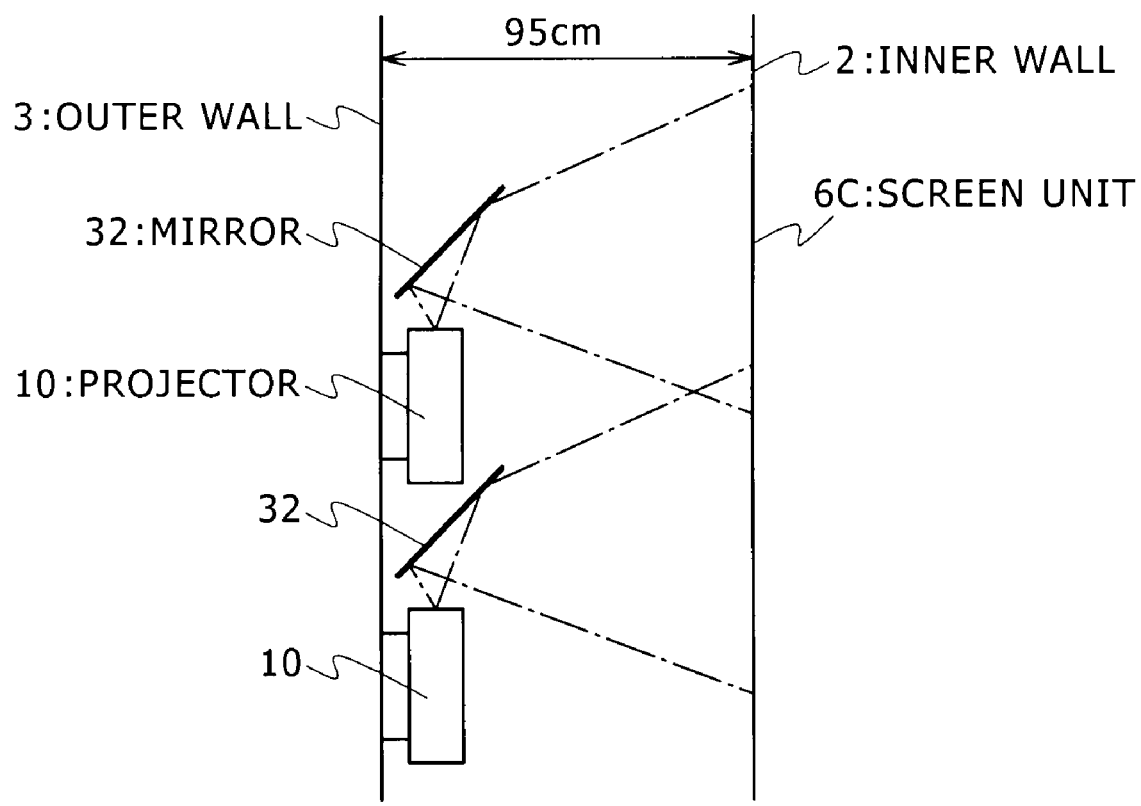
FIG. 13 illustrates how a projector is installed.

Here, as shown in FIG. 13, each projector 10 is fixed to the outer wall 3 so that a shorter direction corresponds to a wall thickness direction. Because of this, a space between the inner wall 2 and the outer wall 3 does not become too narrow even when the projector 10 is fixed to the outer wall 3.

Further, as shown in FIG. 13, each projector 10 emits video light (outgoing light used for video display) in a direction along the wall surface. The video light is reflected on a mirror 32 provided on the light path and is radiated on the screen unit 6C. In this case, the mirror 32 bends the light path of the video light. As shown in FIG. 13 in comparison with FIG. 14, a distance between the inner wall 2 and the outer wall 3 can be shortened to enable large-screen display.

Figure 14:
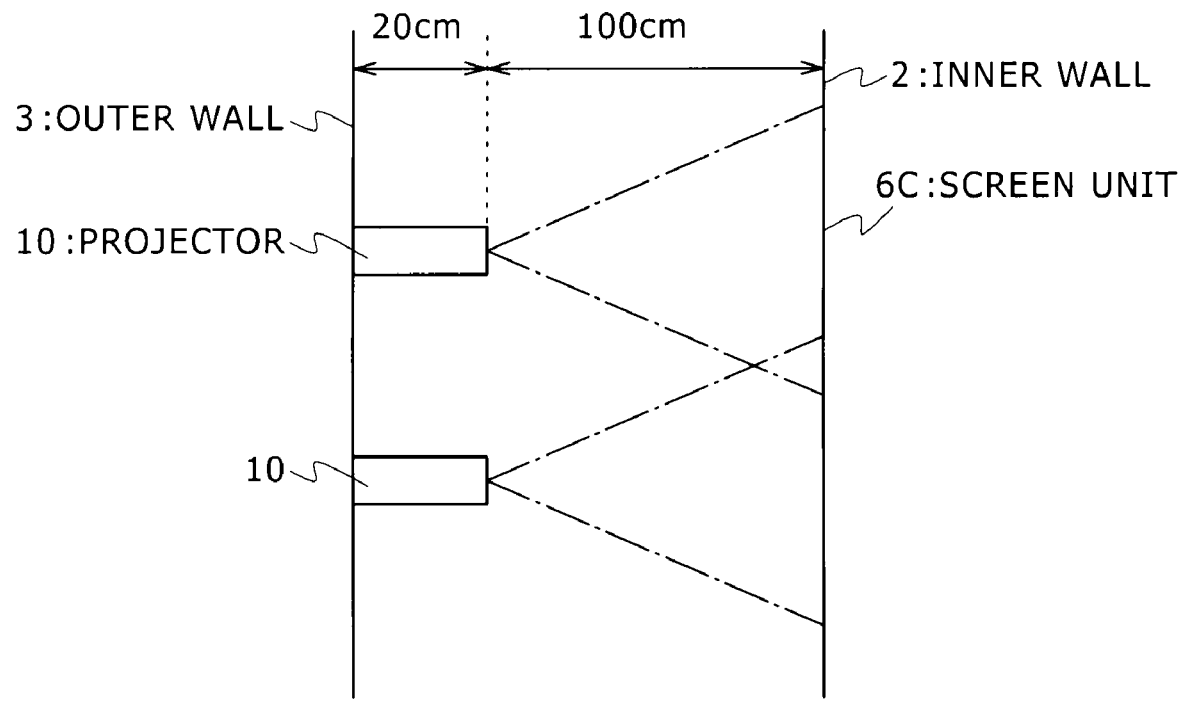
FIG. 14 shows a comparative example of installing a projector.

Meanwhile, in consideration for this, the direction of installing the projector is not limited to upward but may be downward, sideward, etc. Dimensions indicated in FIGS. 13 and 14 are examples of intervals between the inner wall 2 and the outer wall 3 needed for display using a specifically sized screen.

Except the above-mentioned construction, the audiovisual system in FIG. 12 is constructed similarly to the audiovisual system as shown in FIG. 1. The audiovisual system as shown in FIG. 12 can provide the same effect as that of the audiovisual system as shown in FIG. 1. In this case, as mentioned above, the projector 10 emits video light in the direction along the outer wall 3. Thereafter, the mirror 32 reflects the video light toward the screen unit 6C. The large screen display is available by shortening the distance between the inner wall 2 and the outer wall 3. Further, the projector 10 can be stably attached to the solid outer wall 3. Moreover, maintainability etc. can be improved because the space between the outer wall 3 and the inner wall 2 does not become too narrow.

FIGS. 15A and 15B show still another construction of the audiovisual system. FIG. 15A shows a perspective view. FIG. 15B shows a side view. This audiovisual system forms the inner wall 2 and the outer wall 3 for all the four walls of an audiovisual room 41 and forms a space where a person can enter. Further, the audiovisual room 41 has a double ceiling structure in which a ceiling 2A is provided by maintaining a specified interval against an under-the-roof portion 3A, and has a double floor structure in which a floor 2B is provided by maintaining a specified interval against an under-the-floor portion 3B.

In addition, a rectangular parallelepiped structure including the inner wall 2, the ceiling 2A, and the floor 2B is supported by multiple legs 42 against the under-the-floor portion 3B. That is, the floor 2B is supported by the multiple legs 42 against the under-the-floor portion 3B. The four inner walls 2 are supported by this floor 2B. Furthermore, the ceiling 2A is supported by the four inner walls 2. As mentioned above, the rectangular parallelepiped structure including the inner wall 2, the ceiling 2A, and the floor 2B is supported by the multiple legs 42 against the under-the-floor portion 3B.

For example, this audiovisual room 41 is provided with the screen unit 6C and the speaker unit 6A on one inner wall 2. The speaker units 6A are provided for the remaining inner wall surfaces, the floor surface, and the ceiling surface. In this manner, it is possible to appreciate video contents in a surround acoustic field.

Except the above-mentioned construction, the audiovisual system as shown in FIGS. 15A and 15B is constructed similarly to the audiovisual system as shown in FIG. 1 and can provide a similar working effect. Further, since the double ceiling structure or the double floor structure is provided, equipment such as the projector and the amplifier can be installed under the roof or under the floor. Moreover, the rectangular parallelepiped structure including the inner wall 2, the ceiling 2A, and the floor 2B is supported by the multiple legs 42 against the under-the-floor portion 3B. All of the walls, the ceiling, and the floor can easily and reliably form spaces. In addition, the structure constructed by the inner walls, the ceiling, and the floor can be completely independent of the outer walls.

Figure 16B:
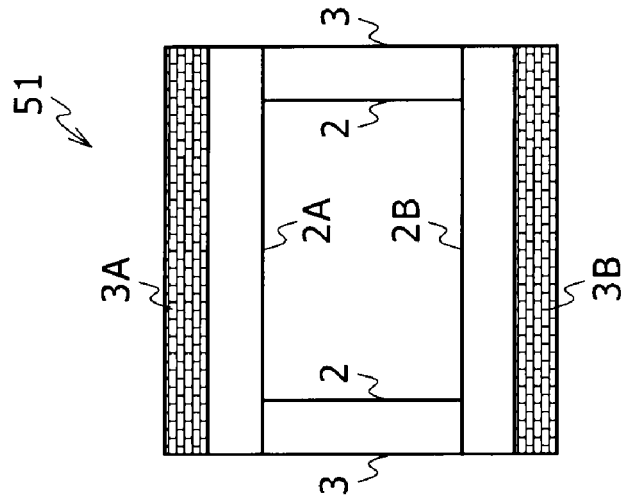
FIGS. 16A and 16B show yet another construction of the audiovisual system.
Figure 16A:
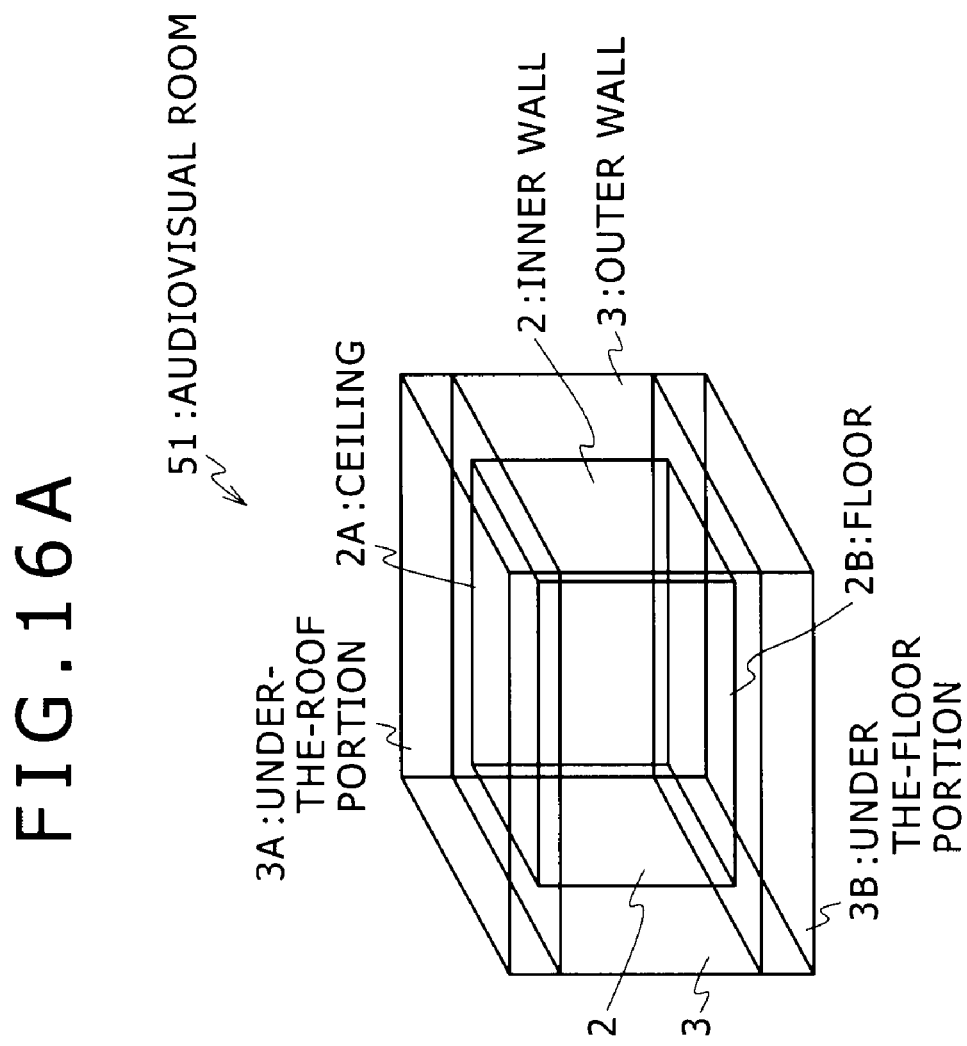

FIGS. 16A and 16B show yet another construction of the audiovisual system. FIG. 16A shows a perspective view. FIG. 16B shows a side view. This audiovisual system forms the inner wall 2 and the outer wall 3 for all the four walls of an audiovisual room 51 and forms a space where a person can enter. Further, the audiovisual room 51 has a double ceiling structure in which the ceiling 2A is provided by maintaining a specified interval against the under-the-roof portion 3A, and has a double floor structure in which the floor 2B is provided by maintaining a specified interval against the under-the-floor portion 3B. In addition, the ceiling 2A and the floor 2B are fixed to the outer wall 3. The inner wall 2 is fixed to the ceiling 2A and the floor 2B.

For example, this audiovisual room 51 is provided with the screen unit 6C and the speaker unit 6A on one inner wall 2. The speaker units 6A are provided for the remaining inner wall surfaces, the floor surface, and the ceiling surface. In this manner, it is possible to appreciate video contents in a surround acoustic field.

Except the above-mentioned construction, the audiovisual system as shown in FIGS. 16A and 16B is constructed similarly to the audiovisual system as shown in FIG. 1 and can provide a similar working effect. Further, since the double ceiling structure or the double floor structure is provided, equipment such as the projector and the amplifier can be installed under the roof or under the floor. Moreover, the ceiling 2A and the floor 2B are fixed to the outer wall 3. The inner wall 2 is fixed to the ceiling 2A and the floor 2B. All of the walls, the ceiling, and the floor can easily and reliably form spaces. In addition, the inner wall 2 can be stably fixed and held on the outer wall 3 via the ceiling 2A and the floor 2B.

Figure 17:
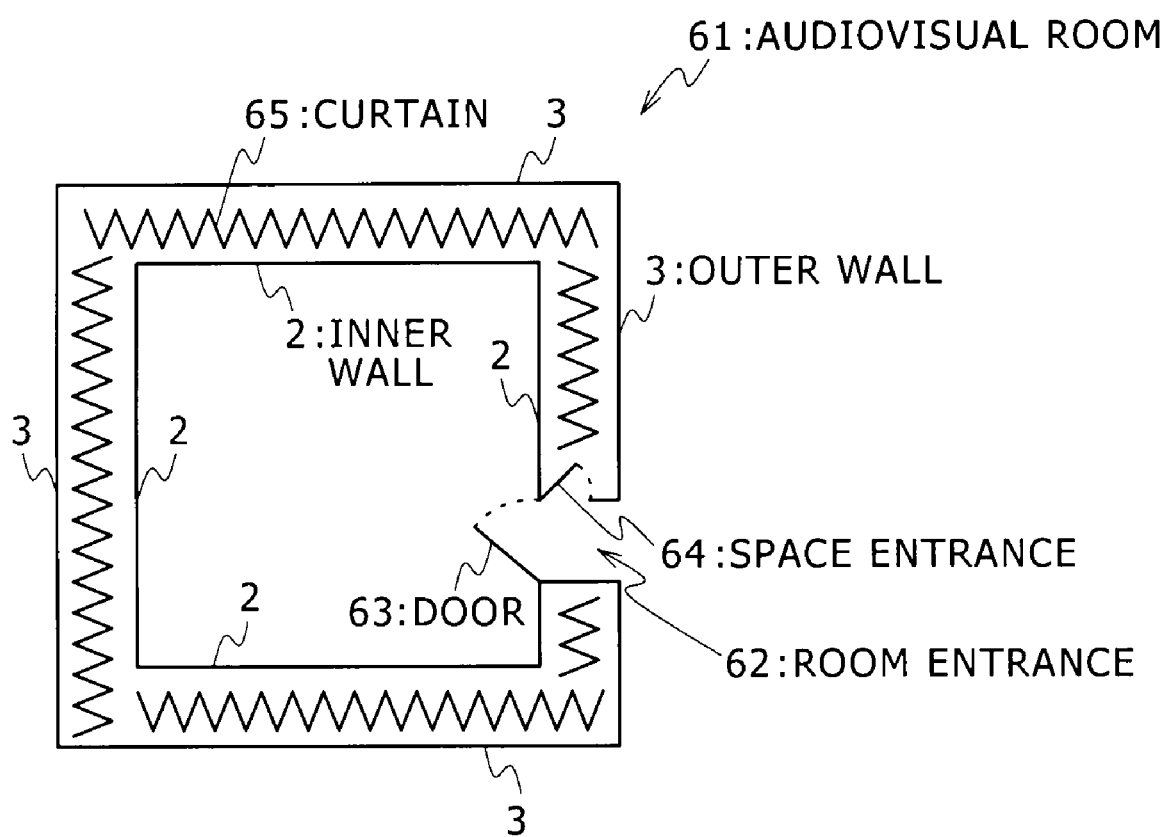
FIG. 17 shows still yet another construction of the audiovisual system.
Figure 18:
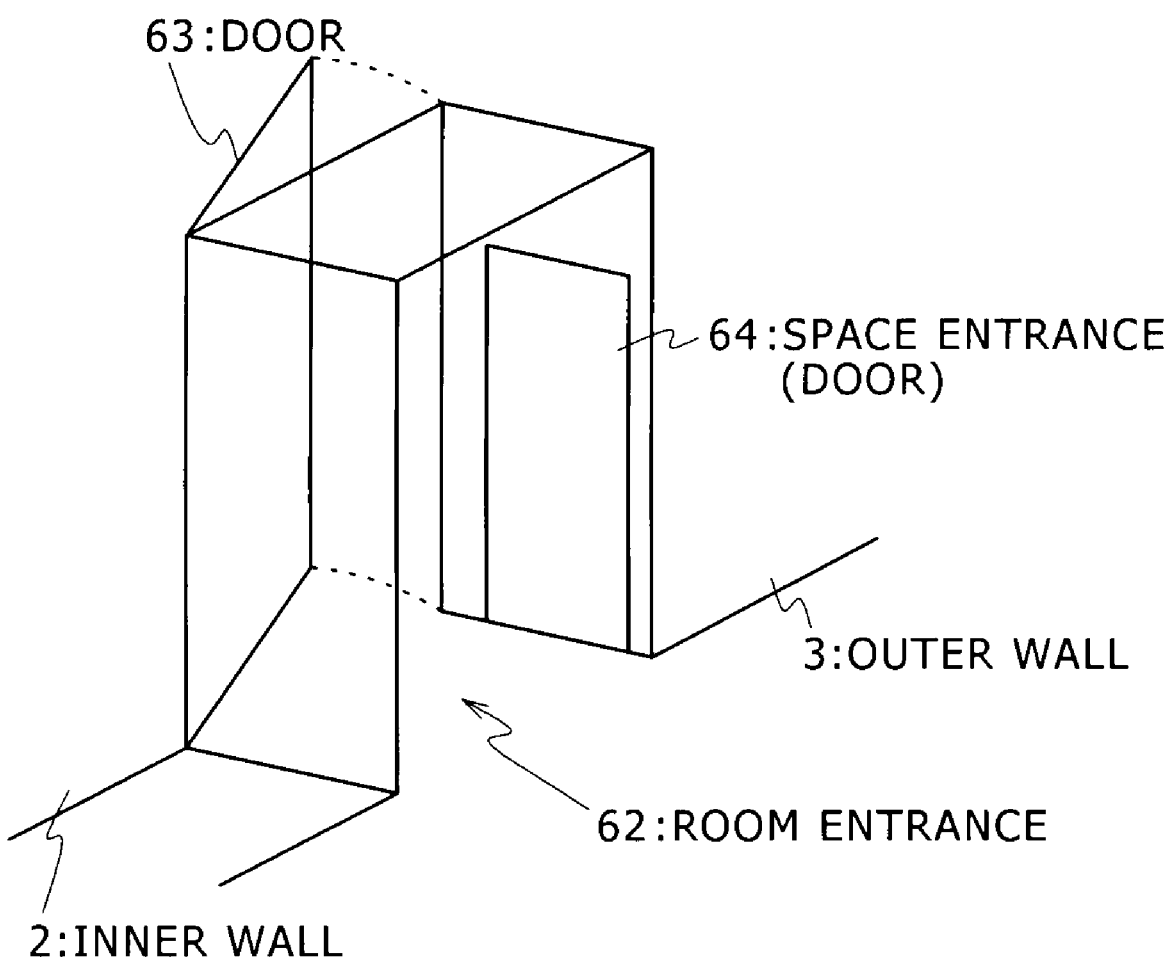
FIG. 18 shows a room entrance and a space entrance.

FIG. 17 shows still yet another construction of the audiovisual system. An audiovisual room 61 according to this audiovisual system uses the dual structure for the ceiling, floor, and walls similarly to the audiovisual rooms 41 and 51 according to the audiovisual systems as shown in FIGS. 15A, 15B, 16A, and 16B. As shown in FIG. 18, the audiovisual room 61 has a room entrance 62 for entering an inside from the outside through the outer wall 3 and the inner wall 2. In this case, a user passes a tunnel-shaped passage belonging to the room entrance 62 and enters the inside of the audiovisual room 61 through a door 63 provided for the inner wall 2. In addition, a space entrance (door) 64 is provided at the side of this room entrance 62, i.e., the side of the tunnel-shaped passage, for entering the space between the inner wall 2 and the outer wall 3.

Further, as shown in FIG. 17, the audiovisual room 61 is provided with an acoustic material using a curtain 65 in the space between the inner wall 2 and the outer wall 3. This prevents a sound wave generated by the speaker unit 6C from reflecting on the outer wall 3 so as not to negatively affect sound reproduction by the speaker unit 6C. Meanwhile, such acoustic material may be replaced by mat-shaped glass wool bonded to the inside of the outer wall 3. Various members and layout methods can be widely used.

Except the above-mentioned construction, the audiovisual system as shown in FIG. 17 is constructed similarly to the audiovisual system as shown in FIG. 1 and can provide a similar working effect. Further, the space entrance 64 is not provided for the inner wall 2 or the outer wall 3. The space entrance 64 can be easily provided. In addition, a serviceperson etc. can easily enter the space between the inner wall 2 and the outer wall 3 through this space entrance 64.

The above-mentioned construction examples of the audiovisual system uses the inner wall 2 and the outer wall 3 to form one, two, or four of the four walls, the invention is not limited thereto. The wall, ceiling, or floor included in the audiovisual room (room) can be constructed as a dual structure depending on needs to provide the same effect as those of the above-mentioned construction example.

(2) Image Display Apparatus

Figure 19:
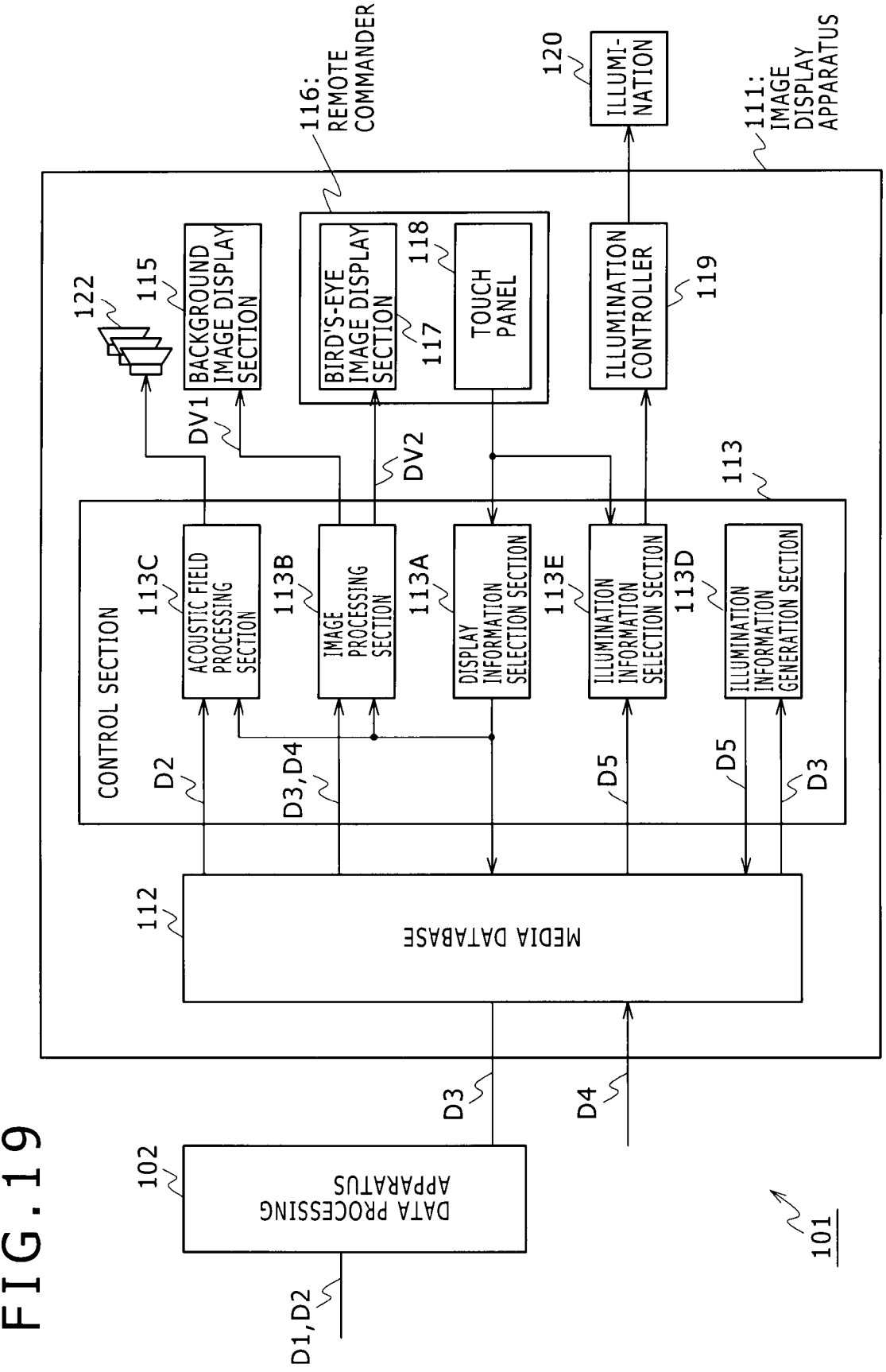
FIG. 19 is a block diagram showing a construction of an image display system for displaying images on a background image display section and a bird's-eye image display section.

FIG. 19 shows a construction example of an image display system 101 that displays an image on the inner wall 2 included in the audiovisual room according to the above-mentioned audiovisual system. This image display system 101 includes a data processing apparatus 102, an image display apparatus 111, and a illumination 120. Further, the image display apparatus 111 includes a media database 112, an acoustic field processing section 113C, an image processing section 113B, a display information selection section 113A, an illumination information selection section 113E, an illumination information generation section 113D, a background image display section 115, a remote commander 116 including a bird's-eye image display section 117 and a touch panel 118, an illumination controller 119, and a speaker 122. Here, the acoustic field processing section 113C, the image processing section 113B, the display information selection section 113A, the illumination information selection section 113E, and the illumination information generation section 113D each are included in the control section 113.

The data processing apparatus 102 supplies panoramic image data D3 to the image display apparatus 111. The data processing apparatus 102 generates the panoramic image data D3 from image data D1 based on an imaging result previously acquired at a photographing spot.

That is, this image display system 101 previously pans, for example, the imaging apparatus (camera) in increments of a specified angle at a specified photographing spot to acquire an imaging result. This makes it possible to photograph a wide scope hardly displayable on one screen and to acquire the imaging result based on a wide-angle image. According to this embodiment, the imaging apparatus is panned to acquire an imaging result and is let to make a round. In this manner, a panorama's image capable of a comprehensive view at this photographing spot is applied to this imaging result based on the wide-angle image.

Meanwhile, here, when the imaging apparatus is let to make a round, a rotary shaft etc. related to panning of the imaging apparatus is accurately adjusted for this photography so that this imaging apparatus correctly returns to the beginning position. Further, an imaging result photographed in this manner at the first position is compared to a imaging result photographed after making a round to return to the first position. When the return does not match the first position according to this comparison result, the rotary shaft etc. are first readjusted to repeat the photography. Moreover, this photography is set so that an auto iris adjustment optimizes exposure for each imaging result.

When this imaging result is acquired according to a still picture, this image display system 101 also records an audio at this photographing spot based on a surround-sound system for a specified time period. Meanwhile, this surround-sound system uses a 5.1-channel surround-sound system, for example. At this time, this audio is recorded by multiple fixed microphones with reference to a given orientation.

This image display system 101 performs these photography and audio recording at predetermined multiple spots. The data processing apparatus 102 is supplied with image data D1 and audio data D2 based on this photography and recording.

Figure 20A:
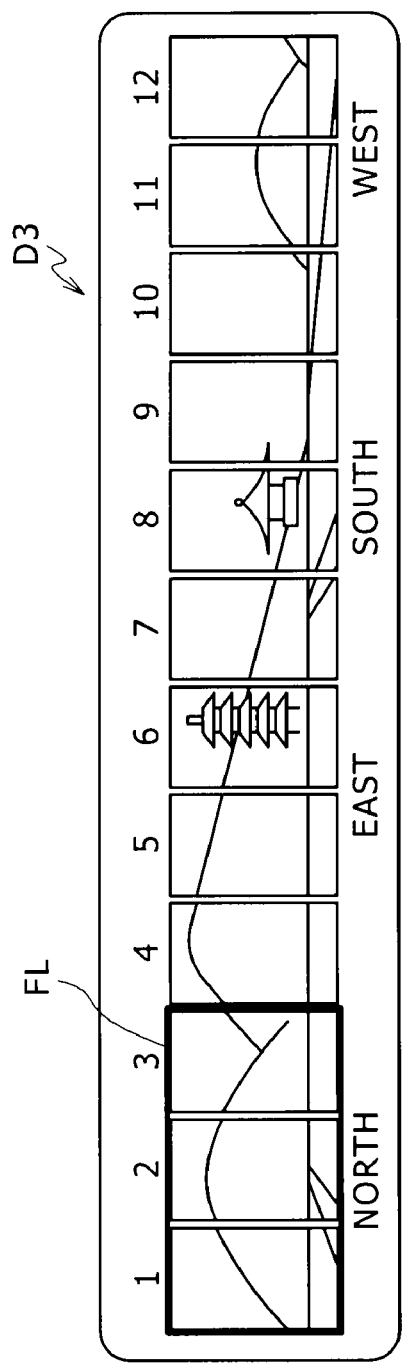
FIGS. 20A and 20B illustrate panoramic image data.
Figure 20B:
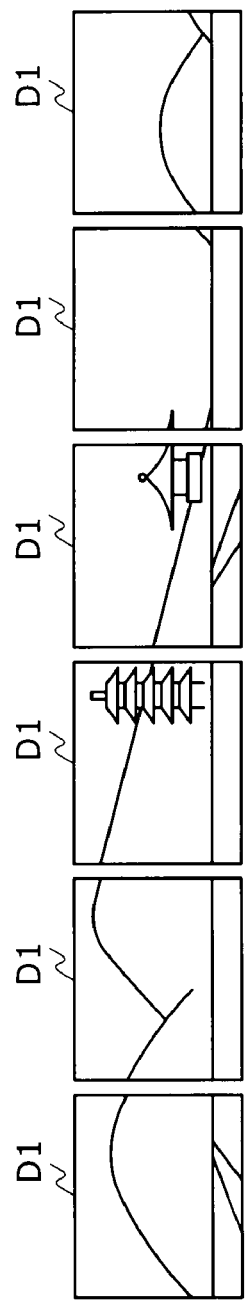

The data processing apparatus 102 includes a computer capable of image processing, for example, processes an image based on this image data D1 acquired in this manner so as to enable the image display apparatus 111 to easily process the image data D1, and generates panoramic image data D3 for each photographing spot. Here, as shown in FIG. 20A, the panoramic image data D3 is image data concerning multiple images (hereafter referred to as "partial images") formed by dividing the circumference of each photographing spot based on a specified angular range. The panoramic image data D3 forms this partial image using a set of image files according to JPEG (Joint Photographic Coding Experts Group) etc. Meanwhile, here, FIG. 20B shows an image based on the original image data D1. Further in FIG. 20A, a frame designated by reference symbol FL indicates the size of one screen displayed by the image display system 101.

In this manner, the data processing apparatus 102 joins multiple imaging results photographed at respective photographing spots to generate a panorama's image, and then extracts partial images to generate the panoramic image data D3. The panoramic image data D3 is generated by setting orientation information about each partial image so as to be able to detect the orientation of each partial image at the photographing spot.

Incidentally, when the imaging apparatus acquires an image in this manner, a flat imaging plane formed of an image sensor images and acquires light incoming from a subject through an iris represented by a pinhole of a pinhole camera. As a result, an image distortion increases around the image. Consequently, it is difficult to naturally join sequentially panned and photographed images without a sense of incongruity. For example, a building roof bends or is dislocated at a joint.

Figure 21:
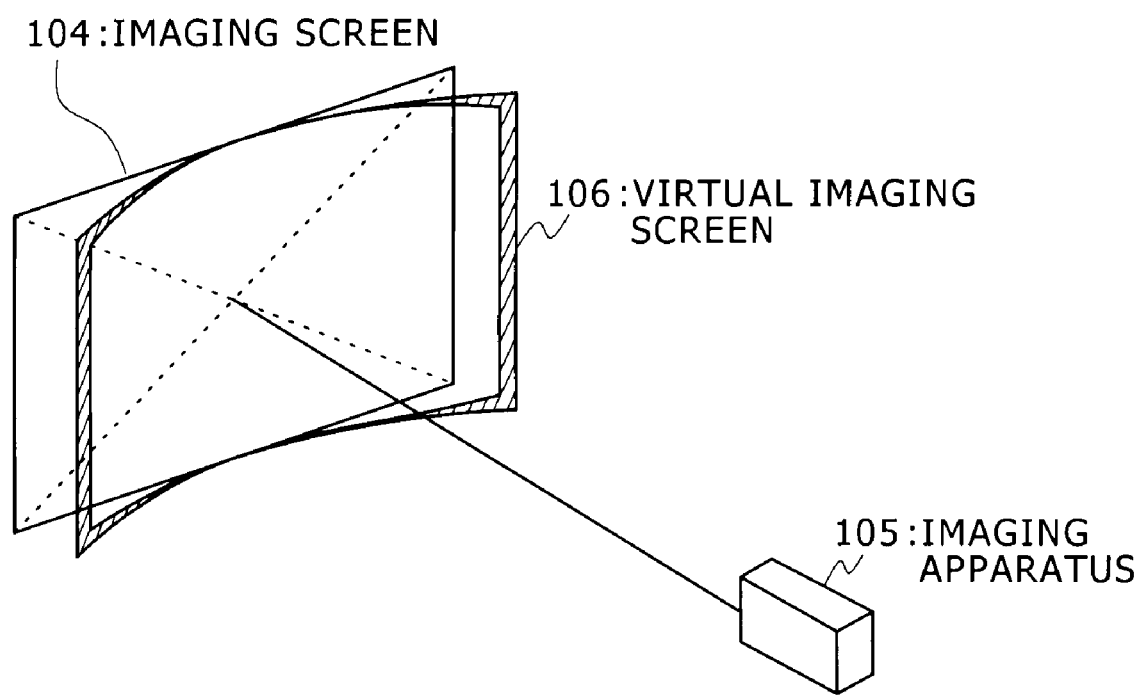
FIG. 21 illustrates an image distortion.

For this reason, the data processing apparatus 102 eliminates this image distortion from the image based on the image data D1, then generates an panoramic image, and extracts partial images. Consequently, as shown in FIG. 21, it is assumed that an image based on the imaging result is projected on a flat imaging screen 104 corresponding to the flat imaging plane and an imaging apparatus 105 views this projected image on the imaging screen 104. The data processing apparatus 102 performs arithmetic processing to re-project the image projected on the imaging screen 104 then on a virtual imaging screen 106 capable of eliminating the image distortion. This eliminates this type of image distortion. Here, the data processing apparatus 102 performs this arithmetic processing by defining this virtual imaging screen 106 using a plane bent only in a longer direction (horizontal direction) of the image for simplifying the processing. In this manner, the virtual imaging screen 106 is formed into a shape as if a cylinder were partially cut out by a plane parallel to an axis.

In this manner, as shown in FIG. 21, the data processing apparatus 102 assumes a contact between the imaging screen 104 and the virtual imaging screen 106 at the center, for example, and settles this contact position to be an origin to define a three-dimensional coordinate space. The viewpoint is defined to be (0, 0, −a). Meanwhile, here, the half horizontal width of an image on the imaging screen 104 is assumed to be value 1. When half an field angle is θ, tan θ=1/a is defined to be a radius of the virtual imaging screen 106.

Figure 22:
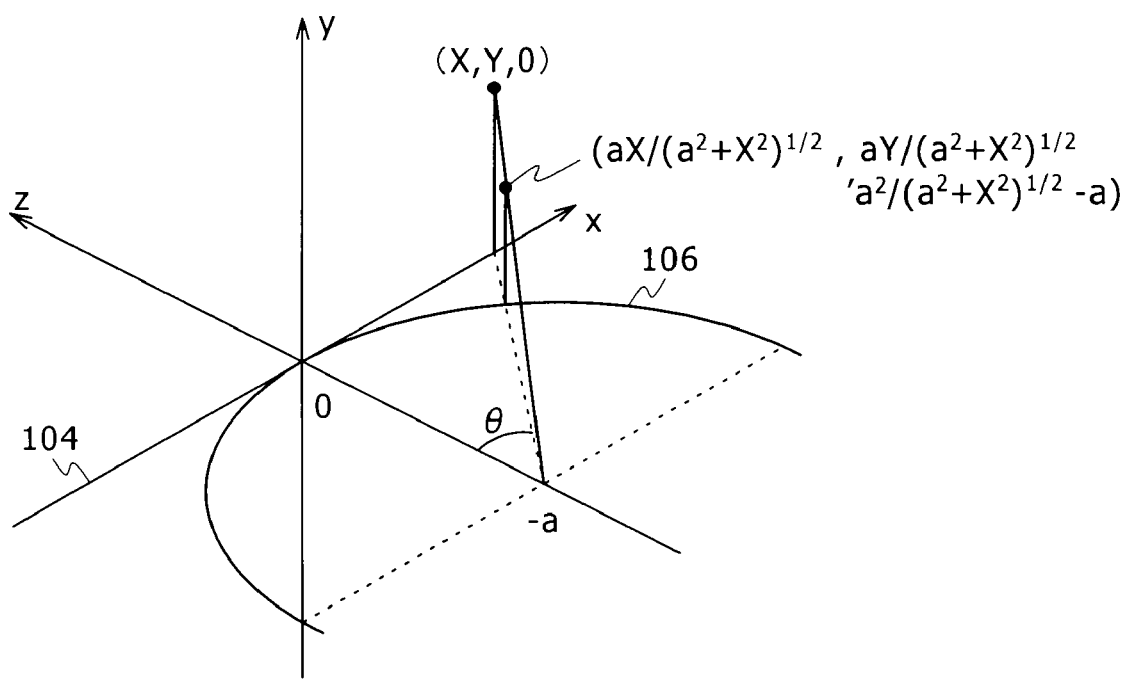
FIG. 22 diagrams correction of an image distortion.

As shown in FIG. 22, the data processing apparatus 102 maps each pixel based on the imaging result on the imaging screen 104 and detects the XY coordinate for an intersection point where a line connecting each pixel with the viewpoint (0, 0, −a) crosses the virtual imaging screen 106. The data processing apparatus 102 replaces the XY coordinate for each pixel on the imaging screen 104 with the XY coordinate for this intersection point and corrects the position of each pixel to perform a process of eliminating the image distortion.

Figure 23:
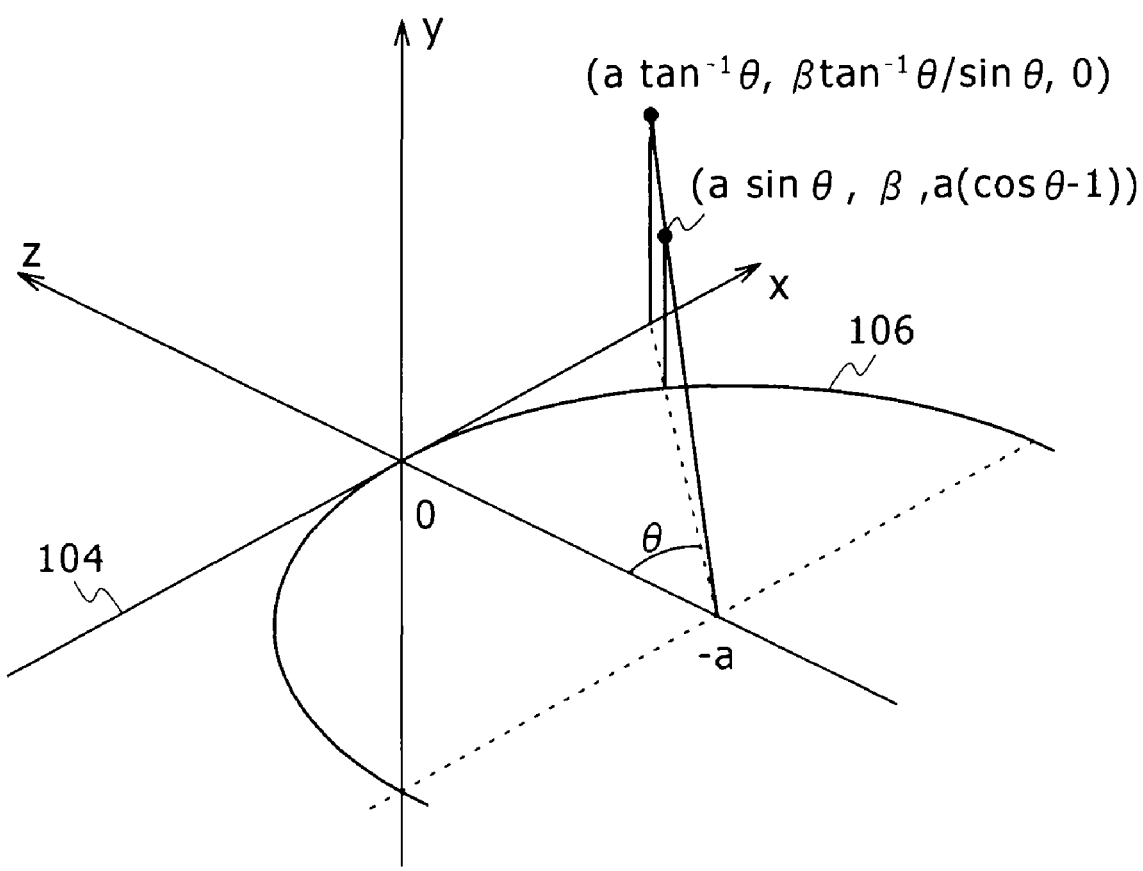
FIG. 23 diagrams correction of an image distortion.

Meanwhile, in this case, as shown in FIG. 23 compared to FIG. 22, processes based on the polar coordinate system may be used instead of the processes based on the three-dimensional coordinate system to perform this series of processes.

In this manner, the data processing apparatus 102 corrects the image distortion, generates a panorama's image (hereafter referred to as a "panoramic image"), then extracts partial images, and data-compresses image data of each partial image to generate multiple image data files. Further, the image data files containing partial images are collected correspondingly to each photographing spot to generate the panoramic image data D3. Moreover, at this time, the panoramic image data D3 is generated by appending the audio data D2 acquired at each photographing spot. Meanwhile, in this case, the audio data D2 may be provided as a separate data in association with the panoramic image data D3.

Figure 24:
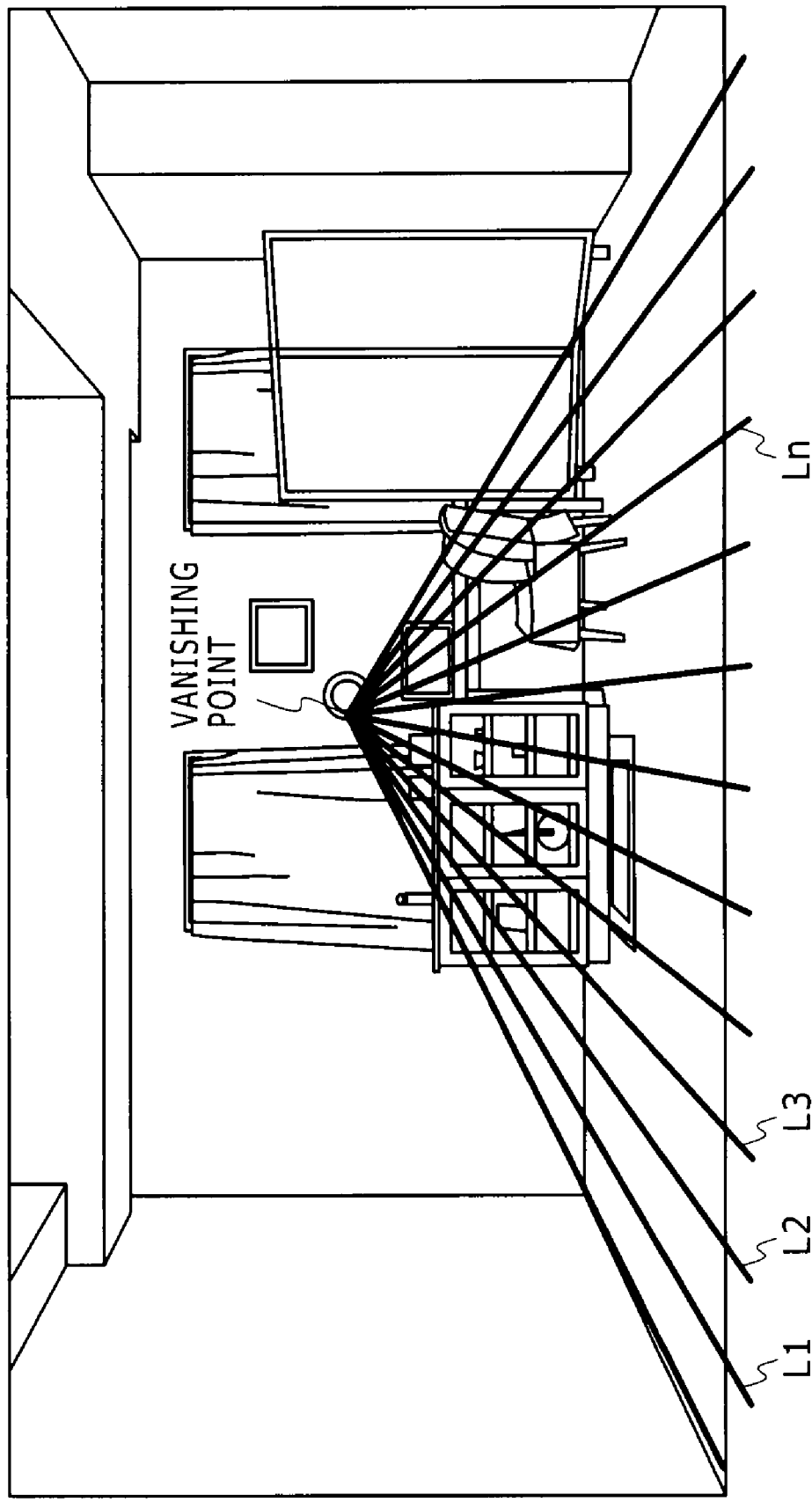
FIG. 24 illustrates a vanishing point.

In addition, the data processing apparatus 102 detects a vanishing point for each panoramic image data D3 and appends a Y-coordinate value of this vanishing point to each panoramic image data D3. As shown in FIG. 24, a perspective transformation is used to project parallel lines in a three-dimensional space on an image plane and the vanishing point signifies a point where lines L1, L2, . . . , Ln, . . . on a screen plane corresponding to the parallel lines converge. That is, the vanishing point is an "infinitely distant point" on a plane image where an actually dimensional space is projected. The vanishing point is recognized as a point of crossing extended lines for parallel lines in the depth direction (e.g., ridge lines of a room image) or as an infinitely distant point of converging extensions of planes extending in the depth direction (e.g., planes extending in the depth direction corresponding to a floor, wall, and ceiling of a room image). A line horizontally drawn from the vanishing point in the image is equivalent to the horizon.

The data processing apparatus 102 image-processes each image acquired at one photographing spot, detects horizontal lines in the depth direction, detects a Y-coordinate value of the intersection point for the parallel lines, and assumes it to be the vanishing point's coordinate value. An image process for the parallel line detection is performed by detecting feature points and statistically processing them. Further, the data processing apparatus 102 detects a vanishing point's Y-coordinate value for each combination of parallel lines, performs a statistic process, and detects one Y-coordinate value for one image. In addition, the data processing apparatus 102 further statistically processes Y-coordinate values detected for multiple images supplied for the panoramic image creation to detect a Y-coordinate value concerning the vanishing point for each panoramic image and appends this Y-coordinate value to each panoramic image data D3. Meanwhile, in this manner, a Y-coordinate value for the above-mentioned joint between the imaging screen 104 and the virtual imaging screen 106 in FIG. 21 is set to the vanishing point's Y-coordinate value detected as mentioned above. The statistic process concerning a series of these processes is equivalent to an averaging process, for example.

Further, the data processing apparatus 102 generates the panoramic image data D3 from the partial image in this manner by correcting a tone in each of multiple images so as to correct differences of irises between the images. In this manner, the data processing apparatus 102 uses an image photographed under the condition of constant iris to form the partial image based on the panoramic image data D3. Specifically, the data processing apparatus 102 detects a maximum value and a minimum value for pixel values concerning all images used for generation of the panoramic image data. The data processing apparatus 102 corrects the tone of each image so that the maximum value and the minimum value for these pixel values do not exceed a dynamic range and a luminance level does not change drastically at a joint between concatenate images. In this manner, the data processing apparatus 102 generates panoramic image data D3 for the photograph under the condition of constant iris.

Meanwhile, when an imaging result from the imaging apparatus can ensure a sufficient dynamic range, an imaging result used for generation of the panoramic image data may be photographed in accordance with the constant iris instead of correcting the tones of multiple images photographed under such auto-iris control as post-processing.

The image display system 101 supplies the panoramic image data D3 generated in this manner as well as the corresponding bird's-eye image data D4 to the image display apparatus 111 and records them in a media database 112.

Here, the bird's-eye image data D4 is image data for an bird's-eye image. Further, the bird's-eye image is an image of the photographing spot (location) concerning acquisition of the panoramic image data D3 from the above and is available as a photographed image, an illustrated image, a computer graphics image, etc. Moreover, the bird's-eye image is created so as to be able to confirm the photographing spot concerning acquisition of the panoramic image data D3 using a mark etc. or retrieve the corresponding panoramic image data D3. Specifically, the bird's-eye image is created by placing a mark at the photographing spot concerning acquisition of the panoramic image data D3 and providing each mark with link information for specifying the corresponding panoramic image data D3. Instead, the panoramic image data D3 is provided with similar link information so as to be able to mark the bird's-eye image with the photographing spot. The panoramic image data D3 and the bird's-eye image data D4 are read from various recording media such as an optical disk, magnetic disk, and memory card and are supplied to the image display apparatus 111. Alternatively, the panoramic image data D3 and the bird's-eye image data D4 are downloaded via a network such as the Internet and are supplied to the image display apparatus 111.

The media database 112 includes a high-capacity hard disk apparatus, for example. The media database 112 records and maintains the panoramic image data D3 and the bird's-eye image data D4 under control of the control section 113. Further, the media database 112 reproduces and outputs the panoramic image data D3 and the bird's-eye image data D4 maintained in this manner. Moreover, the media database 112 records and maintains the illumination control information D5 that is output from the control section 113 for illumination control. Furthermore, the media database 112 reproduces the maintained illumination control information D5 and outputs it to the control section 113.

The background image display section 115 is a large-screen display apparatus and displays an image based on video data DV1 output from the control section 113. This background screen display section 115 includes, for example, the inner wall 2 (screen unit 6C), the projector 10, etc. belonging to the above-mentioned audiovisual system. Here, this video data DV1 is video data generated based on the panoramic image data D. Using this, the image display apparatus 111 allows this background image display section 115 to display a landscape image at a photographing spot in a direction intended by a user.

The remote commander 116 displays a bird's-eye image and notifies the control section 113 of various user operations concerning this bird's-eye image etc. using radio communication etc. That is, the bird's-eye image display section 117 includes a liquid crystal display panel provided for the remote commander 116 and displays a bird's-eye image associated with the photographing spot for the image displayed on the background image display section 115. The touch panel 118 notifies the control section 113 of various user operations on this bird's-eye image display section 117. Meanwhile, this remote commander 116 is formed on the surface of a table placed in an audiovisual room as will be described later, for example.

The illumination controller 119 is a control means for controlling the illumination 120 in a room (audiovisual room) for placing this image display apparatus 111 and varies brightness and color temperature of the illumination 120 in accordance with an instruction from the control section 113.

The control section 113 is a computer for performing a series of processes related to this image display apparatus 111 and controls operations of the components by performing a program recorded in memory not shown. The control section 113 performs this program to provide various function blocks. According to the embodiment, the program related to the process of this control section 113 is provided by previously installed on this image display apparatus 111. Instead of such prior installation, the program may be provided by recording it on various storage media such as an optical disk, magnetic disk, and memory card as well as downloading it via a network such as the Internet.

Here, the display information selection section 113A selects images to be displayed on the bird's-eye image display section 117 and the background image display section 115 in accordance with a notification from the remote commander 116 and, based on this selection result, allows the media database 112 to output the image data D3 and D4, and the audio data D2. The image processing section 113B processes the image data D3 and D4 output from this media database 112, generates video data DV2 and DV1 used to drive the bird's-eye image display section 117 and the background image display section 115, and outputs them to the bird's-eye image display section 117 and the background image display section 115.

The acoustic field processing section 113C processes the audio data D2 output from the media database 112 and drives the speaker 122 used to generate a surround acoustic field. This speaker 122 includes the inner wall 2 (speaker unit 6A) in the above-mentioned audiovisual system.

At this time, the acoustic field processing section 113C varies sound image localization based on this audio data D2 correspondingly to an image displayed on the background image display section 115. The acoustic field processing section 113C drives the speaker 122 in accordance with the sound image localization corresponding to orientation of the image displayed on the background image display section 115. Meanwhile, such sound image localization is varied, for example, by changing audio signal channels for driving the speaker 122, roughly varying the localization, and then performing addition and subtraction operations between these channels to finely vary the localization.

The illumination information generation section 113D processes the image data D3 output from the media database 112, generates the illumination control information D5 needed to control the illumination 120, and records it in the media database 112. The illumination information selection section 113E selectively acquires the illumination control information D5 corresponding to an image displayed on the background image display section 115 from the illumination control information D5 generated by the illumination information generation section 113D in accordance with the notification from the remote commander 116 and recorded in the media database 112 and controls an operation of the illumination controller 119 based on the acquired illumination control information D5.

Figure 25:
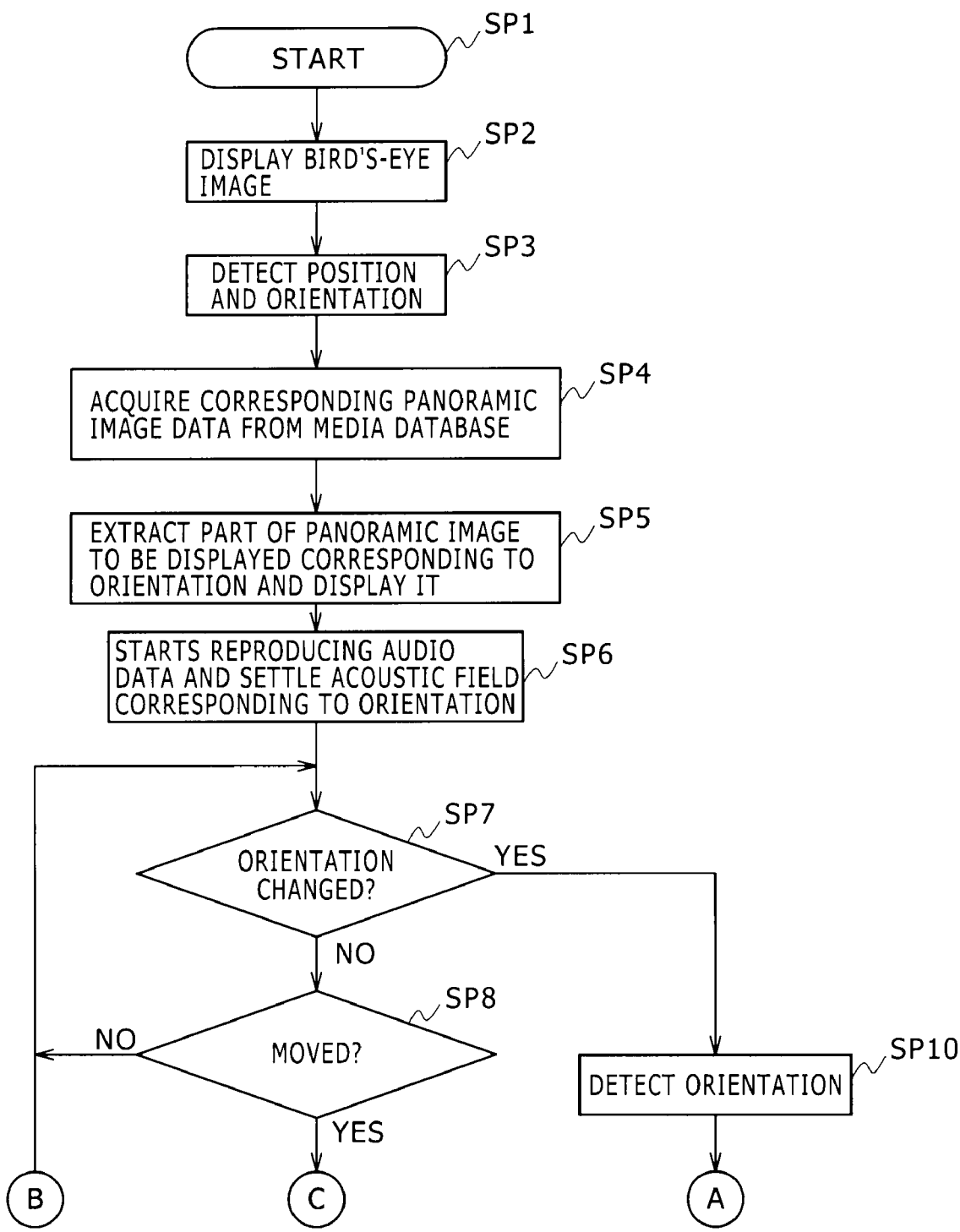
FIG. 25 is a flowchart showing a process of a control section in an image processing apparatus.

FIG. 25 is a flowchart showing a procedure concerning a basic process of the control section 113. When the power of the image display apparatus 111 is turned on, the control section 113 starts this procedure and proceeds to Step SP2 from Step SP1, and then displays a menu screen used to select a bird's-eye image from the record in the media database 112. Further, when the user makes a selection on this menu screen, the control section 113 accepts the selection of the bird's-eye image used for the display and acquires the bird's-eye image data D4 for this bird's-eye image from the media database 112.

As shown in FIG. 26(A1), the control section 113 displays a bird's-eye image 131 on the bird's-eye image display section 117 in accordance with the acquired bird's-eye image data D4. Further, at this time, the control section 113 uses marks M1 through M5 to indicate photographing spots for the panoramic image data D3 in the bird's-eye image 131. The bird's-eye images in FIG. 26 uses circles to represent the marks M1 through M5. Letters "A" and "B" denote actual buildings at places corresponding to the letters.

Next, the control section 113 proceeds to Step SP3 and detects a user operation on the touch panel 118. According to the user selection from the marks M1 through M5, the control section 113 allows the background image display section 115 to display an image photographed at the photographing spot indicated by any of the selected marks M1 through M5. In addition, by accepting a display orientation, the control section 113 allows the background image display section 115 to display an image viewed in accordance with the accepted display orientation at the selected photographing spot. As shown in FIG. 26(A1), when the user selects the mark, the control section 113 displays a mark MK on the selected mark to indicate that the mark is selected with the associated orientation. When the user operates the touch panel 118 to vary the orientation of this mark MK, the control section 113 accordingly accepts inputs for these photographing spots and orientations. Meanwhile, as shown in FIG. 26(A1), this embodiment uses a camera symbol for the mark MK that indicates the orientation and selection of the mark.

When accepting inputs of the photographing spot and the orientation, the control section 113 proceeds to Step SP4 and acquires the corresponding panoramic image data D3 from the media database 112 according to link information assigned to the selected mark M1.

At Step SP5 to follow, as shown in FIG. 27, the control section 113 selects partial images corresponding to the orientation settled at Step SP3 from multiple partial images based on this acquired panoramic image data D3 (FIG. 27(A)), concatenates the partial images (FIG. 27(B1)), extracts one screenful of image from the concatenated image in accordance with the orientation settled at Step SP3, and displays it on the background image display section 115 (FIG. 27(C1)). Meanwhile, the above-mentioned distortion correction process in FIGS. 21 through 23 may be performed along with the process at Step SP5 instead of during creation of the panoramic image data D3. Similarly, the above-mentioned process of correcting tones for the photograph under the condition of constant iris may be also performed along with the process at Step SP5 instead of during creation of the panoramic image data D3.

When one screenful of image is extracted and is displayed on the background image display section 115 in this manner, as shown in FIG. 28(A), the control section 113 compares a user's eye level settled by a serviceperson during installation of the background image display section 115 for appreciating images on the background image display section 115 with the Y-coordinate value for the vanishing point settled in the panoramic image data D3. As shown in FIG. 28(B), the control section 113 corrects the display position to display the image displayed on the background image display section 115 so that the position of the vanishing point for the image matches the user's eye level. The control section 113 displays the image in this manner to enable the user to appreciate a landscape etc. without a sense of incongruity.

After displaying the image based on the panoramic image data D3, the control section 113 proceeds to Step SP6, starts reproducing audio data associated with this panoramic image data D3, and drives the speaker 122. At this time, the control section 113 performs the process according to a function block of the above-mentioned acoustic field processing section 113C to vary the sound image localization and settle an acoustic field so that the sound image is localized at a position corresponding to the image displayed on the background image display section 115.

In accordance with these, when the user reaches the user-specified place with the user-specified orientation in the bird's-eye image, the control section 113 allows the background image display section 115 to display the landscape viewed by the user and allows the speaker 122 to reproduce various sounds heard by the user. According to the example in FIG. 26(A1), the background image display section 115 displays the image as shown in FIG. 26(A2).

After displaying the image and starting reproducing the audio data, the control section 113 proceeds to Step SP7 and determines whether or not the user operates the touch panel 118 to specify changing the orientation. When the negative result is acquired here, the control section 113 proceeds to Step SP8 and determines whether or not the user operates the touch panel 118 to select the other one of marks M1 through M4 and specify the move. When the negative result is acquired here, the control section 113 returns to Step SP7.

Figure 29:
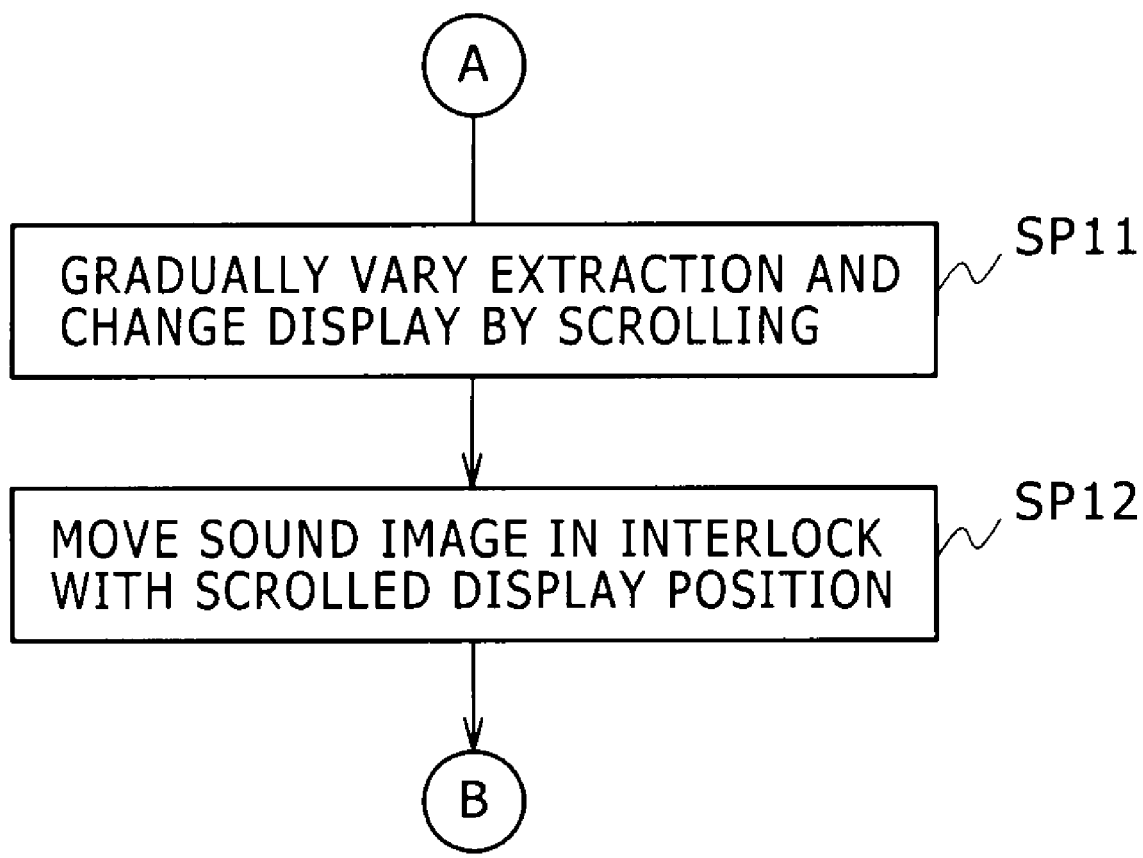
FIG. 29 is a flowchart showing a process of the control section in the image processing apparatus.

In this manner, the control section 113 waits for the user's specification to change the orientation and move. When the user specifies changing the orientation, the positive result is acquired at Step SP7. The control section 113 detects the orientation at Steps SP7 to SP10 and then returns to Step SP11 (FIG. 29). Here, as indicated by reference symbol B in FIG. 27(A), the control section 113 allows the background image display section 115 to gradually scroll the image for an amount equivalent to the orientation changed by the user. In this case, as shown in FIGS. 27(B2) and 27(C2) compared to FIGS. 27(B1) and 27(C1), the control section 113 gradually changes an area to be extracted by concatenating partial images as needed and accordingly performs the scroll process on the panoramic image based on the panoramic image data D3.

Further, at Step SP12 to follow, the control section 113 changes the process according to the function block of the acoustic field processing section 113C, gradually moves the position of the sound image generated by the speaker 122 so as to interlock with the scroll on the background image display section 115, and returns to Step SP7 in FIG. 25. Moreover, at this time, as shown in FIG. 26(B1) compared to FIG. 26(A1), the control section 113 varies the mark MK indicating the orientation so as to interlock with the scroll on the background image display section 115. In this manner, the example in FIG. 26(B1) allows the background image display section 115 to display a distant view of the building corresponding to reference symbol B as shown in FIG. 26(B2).

On the other hand, when the user specifies the move, the positive result is acquired at Step SP8. The control section 113 proceeds to Step SP13 (FIG. 30) from Step SP8. Here, the control section 113 detects the photographing spot (position) as a move destination based on the user-specified one of marks M1 through M5. At Step SP14 to follow, similarly to Steps SP11 and SP12 as mentioned above, the control section 113 changes the display of the background image display section 115 and the acoustic field setting in accordance with the orientation for the photographing spot as the move destination.

Further, at Step SP15 to follow, the control section 113 acquires the panoramic image data D3 from the media database 112 for this move destination similarly to Step SP4 as mentioned above. Moreover, at Step SP16 to follow, the control section 113 generates an image to be displayed at the move destination from the panoramic image data D3 acquired from this media database 112 similarly to Step SP5 as mentioned above.

At Step SP17 to follow, the control section 113 gradually zooms in on the image displayed on the background image display section 115 and uses a cross fade to change the previous display to the image generated at Step SP15. Meanwhile, the transition such as zoom in and cross fade can be replaced by transition using various effects such as mosaic as needed. Further, at Step SP18 to follow, the control section 113 responds to such display change, performs the cross fade or once performs the fade-out and then the fade-in, changes the acoustic field generated by the speaker 122 to the acoustic field generated by the audio data D2 corresponding to the move destination, and returns to Step SP7

In this manner, as shown in FIG. 26(B1), the control section 113 allows the background image display section 115 to display a north landscape corresponding to the mark M1 specified by the user. In this state, when the move to the mark M2 northwest is specified, the control section 113 changes the display of the background image display section 115 and the acoustic field so as to change the orientation to the mark M2 as shown in FIG. 26(A1). As shown in FIGS. 26(C1) and 26(C2), the control section 113 changes the display of the background image display section 115 and the acoustic field so as to move to the mark M2 and provides the user with the image and the acoustic field positioned at the mark M2. Further, the control section 113 varies the position and the orientation of the mark MK displayed in the bird's-eye image so as to interlock with these display changes.

According to these, this image display apparatus 111 provides images and audios so as to be able to feel walk-through using photographed images.

Meanwhile, in the real world, a move may be made between places by identifying a target other than the forward direction. When the user specifies a move in this manner, the background image display section 115 changes displays so as to make the move by redirecting the direction toward the move destination. In such series of processes, it may be preferable to omit the process of redirecting the direction toward the move destination. In this case, an image provided after the move may correspond to the orientation immediately before the move or the user-specified target orientation. In such case, the scroll process in the move direction may be performed concurrently with the zoom process during the transition for changing displays. Further, the display transition may be made to change the displays by once changing the display to the bird's-eye image for the transition.

Figure 31:
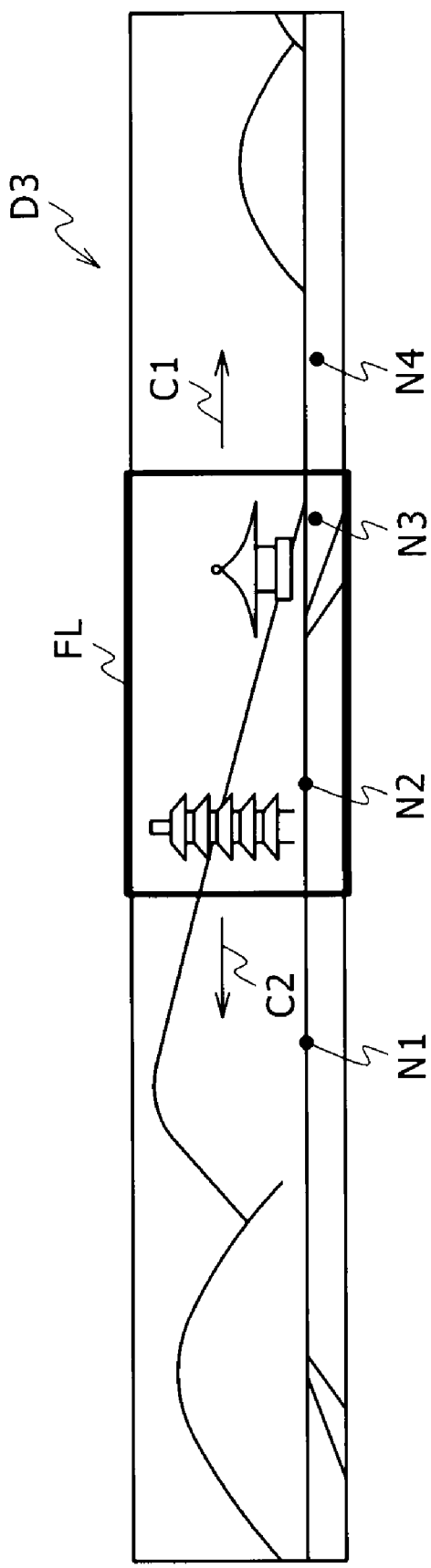
FIG. 31 illustrates input for display on the background image display section.

FIG. 31 is a schematic diagram used to describe the display on the background image display section 115 when the user specifies the transition on the background image. When the user operates the touch panel 118 to specify the transition on the background image, the control section 113 allows the background image display section 115 to display marks N1 through N4 corresponding to the marks M1 through M5 displayed in the bird's-eye image on the images for a specified time period. In terms of the marks N1 through N4 concerning the display on the background image display section 115, the data processing apparatus 102 appends display position information about the marks N1 through N4 to the panoramic image data D3 when generating the panoramic image data D3. The marks N1 through N4 are displayed based on this position information. In this case, the control section 113 may display the marks N1 through N4 by calculating their display positions on the images generated from the panoramic image data D3 based on the marks M1 through M5 assigned to the corresponding bird's-eye image.

After the marks N1 through N4 are displayed, the control section 113 allows the bird's-eye image display section 117 to display a menu for selecting focuses on these marks N1 through N4, a menu for submission, and a menu for specifying the horizontal scroll. When the user operates these menus to select any of the marks N1 through N4, the control section 113 acquires the panoramic image data D3 corresponding to the marks N1 through N4 and changes the display of the background image display section 115 similarly to FIGS. 25, 29, and 30 as mentioned above.

When the display is changed, the previous display scrolls and zooms in so as to display the user-selected mark at the center of the screen. The cross fade is used to change the display to the image associated with the mark selected by the user. After the display is changed, the image is displayed in accordance with the orientation from the photographing spot corresponding to the original image to the photographing spot corresponding to the user-selected mark.

By contrast, when the user selects the scroll menu, the area used for the display changes as indicated by arrows C1 and C2. The control section 113 gradually changes the area for displaying an extraction from the panoramic image in a user-specified direction. In this manner, the control section 113 scrolls the display in the background image display section 115. Meanwhile, the control section 113 changes the acoustic field also in these processes so as to correspond to the display in the background image display section 115, thus ensuring realistic sensation.

In this manner, the control section 113 can not only select a move destination on the displayed image without the need for identifying the current position on the bird's-eye image but also feel walk-through by changing orientations, thus furthermore improving the immersive sense.

Figure 30:
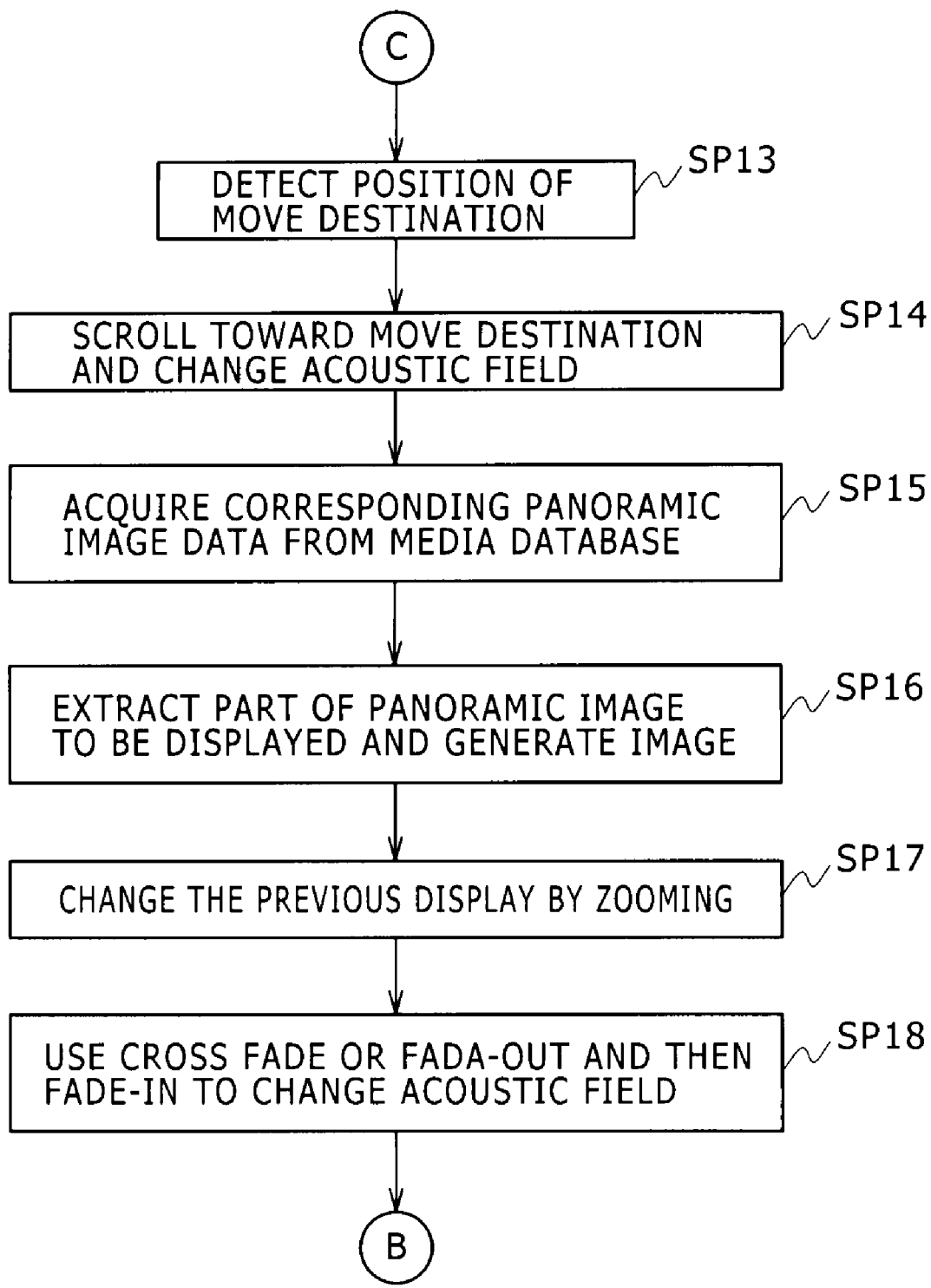
FIG. 30 is a flowchart showing a process of the control section in the image processing apparatus.

Meanwhile, the processes in FIGS. 25, 29, and 30 have been described so that only the bird's-eye image is displayed in the bird's-eye image display section 117. Further, the user may select a mark and specify a photographing spot to be displayed in a state of displaying the bird's-eye image (hereafter referred to as a "bird's-eye mode") to enable a state of displaying the same image as that displayed on the background image display section 115 (hereafter referred to as an "immersive mode"). In this immersive mode, the user may make a return operation to re-enable the bird's-eye mode. In this manner, the display state of the bird's-eye image display section 117 may be freely switchable between the bird's-eye mode and the immersive mode as mentioned above.

Figure 32A:
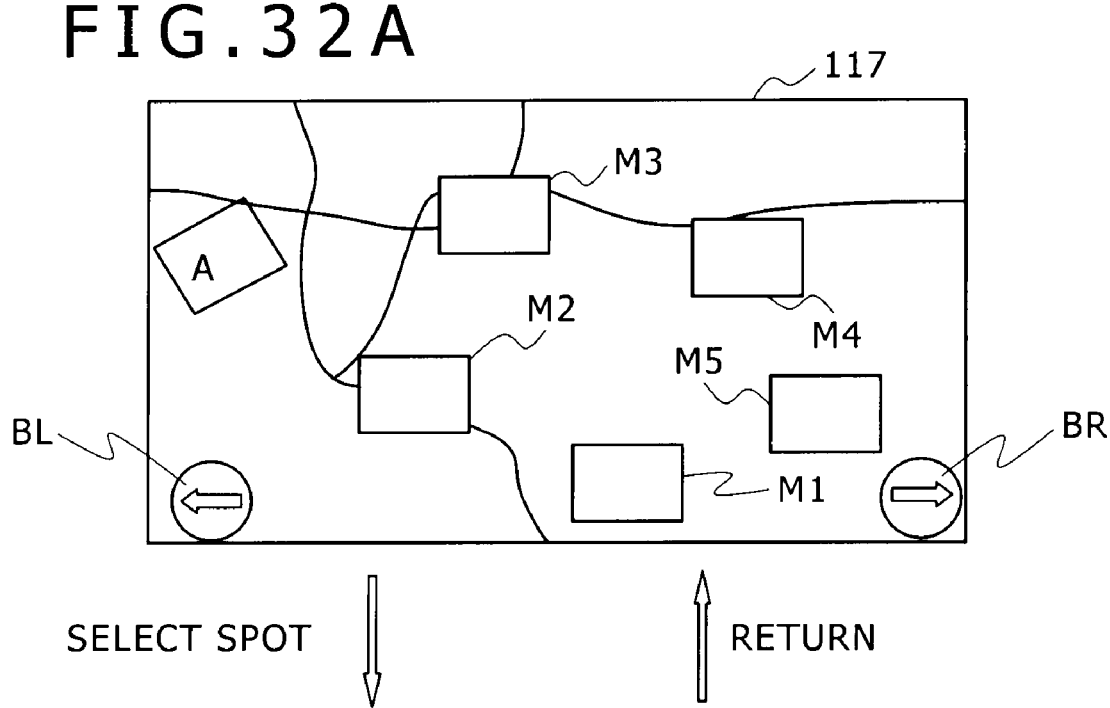
FIGS. 32A and 32B schematically show display examples of the bird's-eye image display section in a bird's-eye mode and an immersive mode.
Figure 32B:
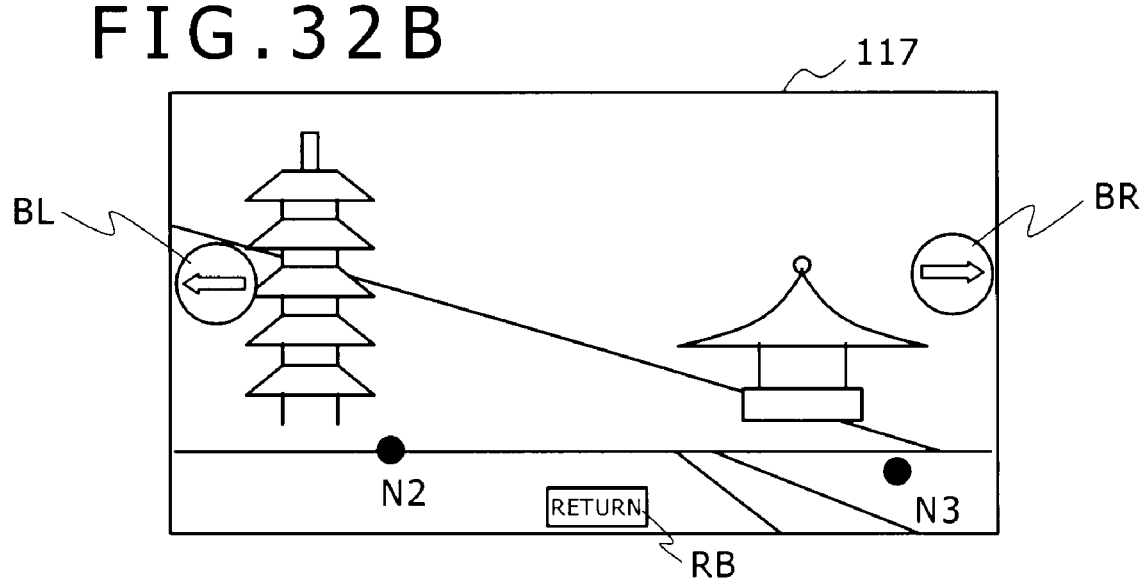

FIG. 32A shows a display example of the bird's-eye image display section 117 in the bird's-eye mode. FIG. 32B shows a display example of the bird's-eye image display section 117 in the immersive mode. In the bird's-eye mode of FIG. 32A, the bird's-eye image display section 117 displays a bird's-eye image. Rectangular display areas D1 through D5 are provided correspondingly to the photographing spots M1 through M5 for the panoramic images in the bird's-eye image. Though these display areas D1 through D5 in FIG. 32A are blank, each display area actually displays an image at the corresponding spot in the current orientation.

In this bird's-eye mode, the bird's-eye image display section 117 displays orientation selection buttons BL and BR in overlap with the bird's-eye image. The user can select any orientation by operating the selection buttons BL and BR on the touch panel 118. Selecting the orientation not only changes the orientation of the bird's-eye image displayed on the bird's-eye image display section 117, but also accordingly changes images displayed in the display areas D1 through D5.

Here, the bird's-eye image can be changed by reading the bird's-eye image data from the media database 112 in accordance with the orientation as mentioned above. In this case, the media database 112 stores the bird's-eye image data D4 corresponding to the respective orientations. Meanwhile, a coordinate conversion can also change the bird's-eye image. A display image in each display area can be changed by changing a portion extracted from the panoramic image at each spot in accordance with the orientation as mentioned above.

In this bird's-eye mode, the user can select the photographing spot by touching any of the photographing spots M1 through M5 on the touch panel 118. In this manner, the panoramic image data D3 corresponding to the selected spot is read from the media database 112. The background image display section 115 displays the image at the selected photographing spot in accordance with the orientation selected in the bird's-eye mode. At this time, the display state of the bird's-eye image display section 117 enters the immersive mode as shown in FIG. 32B to enable the state that displays the same image as that displayed on the background image display section 115.

In this immersive mode, the bird's-eye image display section 117 displays orientation selection buttons BL and BR in overlap with the image. The user can select any orientation by operating the selection buttons BL and BR on the touch panel 118. Selecting the orientation not only changes the image displayed on the background image display section 115, but also accordingly changes images displayed on this bird's-eye image display section 117. The image can be changed by changing a portion extracted from the panoramic image at the selected spot as mentioned above.

Further, in this immersive mode, the bird's-eye image display section 117 displays marks N2 and N3 indicating the other photographing spots existing in the image in overlap with the image. The user can directly select the other photographing spot by touching the mark corresponding to the photographing spot on the touch panel 118. When the other photographing spot is selected in the immersive mode as mentioned above, the panoramic image data D3 for the photographing spot is read from the media database 112. The background image display section 115 displays the image for that photographing spot in the orientation at the time of the selection. In this case, the image displayed on the bird's-eye image display section 117 is changed to that for the photographing spot.

Further, in this immersive mode, the bird's-eye image display section 117 displays a return button RB in overlap with the image. The user operates this return button RB on the touch panel 118 to shift from the immersive mode to the bird's-eye mode. The state is restored so that the bird's-eye image display section 117 displays the bird's-eye image as shown in FIG. 32A.

Figure 33:
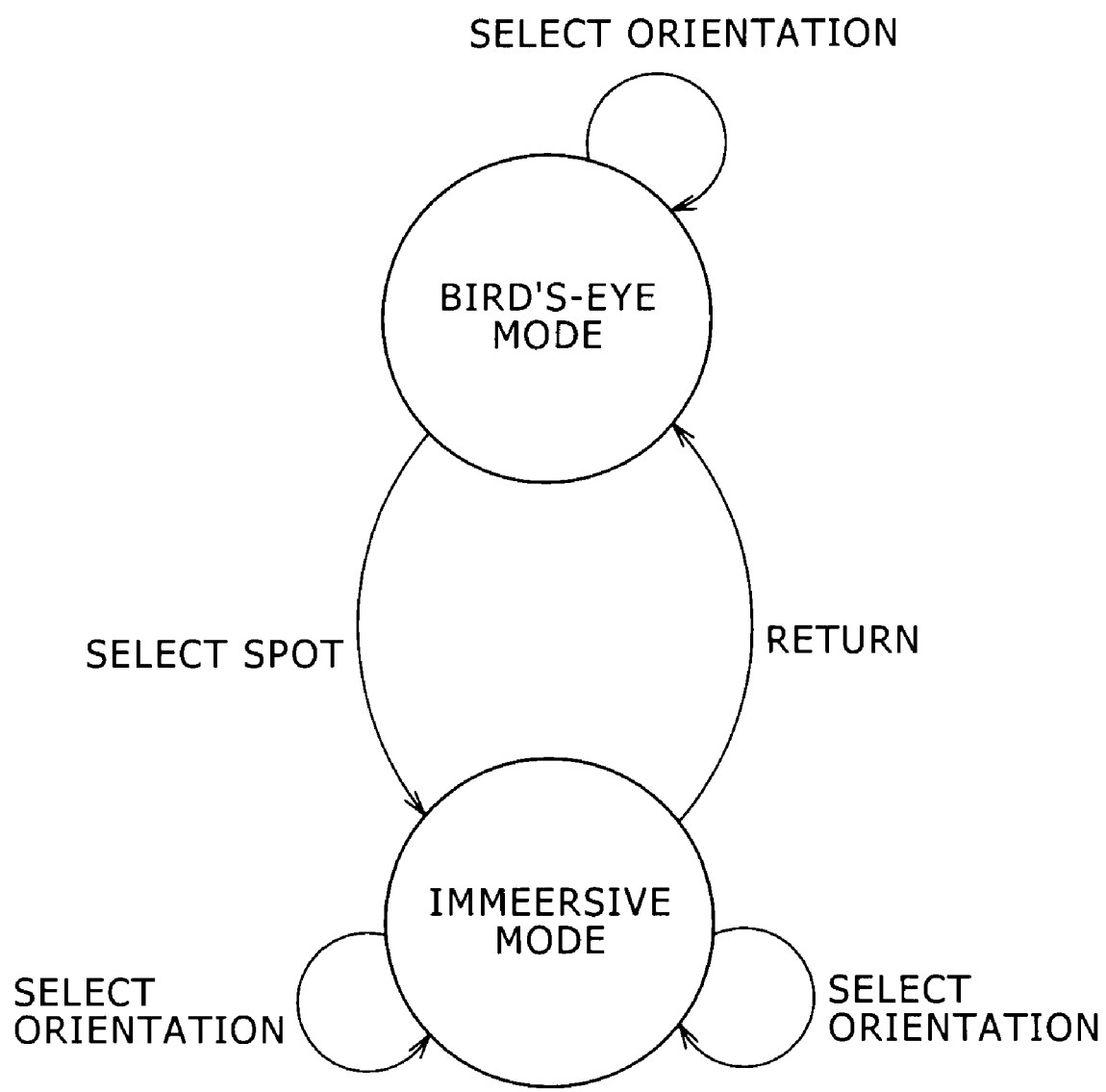
FIG. 33 is a state transition diagram showing display state transition of the bird's-eye image display section.

FIG. 33 shows a state transition diagram for display states of the bird's-eye image display section 117 as mentioned above. The bird's-eye mode can change the orientation without changing the mode. When a spot is selected in this bird's-eye mode, the immersive mode is enabled. The immersive mode can change the orientation without changing the mode. Further, this immersive mode can select a spot without changing the mode. Operating the return in this immersive mode enables the bird's-eye mode.

Incidentally, when the bird's-eye image is used to display famous sightseeing areas, theme parks, etc., it is expected to densely place marks. Because of this, an image for the intended place may not be simply displayed depending on bird's-eye images. In this case, when the move uses marks on the display screen of the above-mentioned background image display section 115, the marks may be densely displayed and therefore an image for the intended place may not be simply displayed depending on bird's-eye images also in this case.

Figure 34:
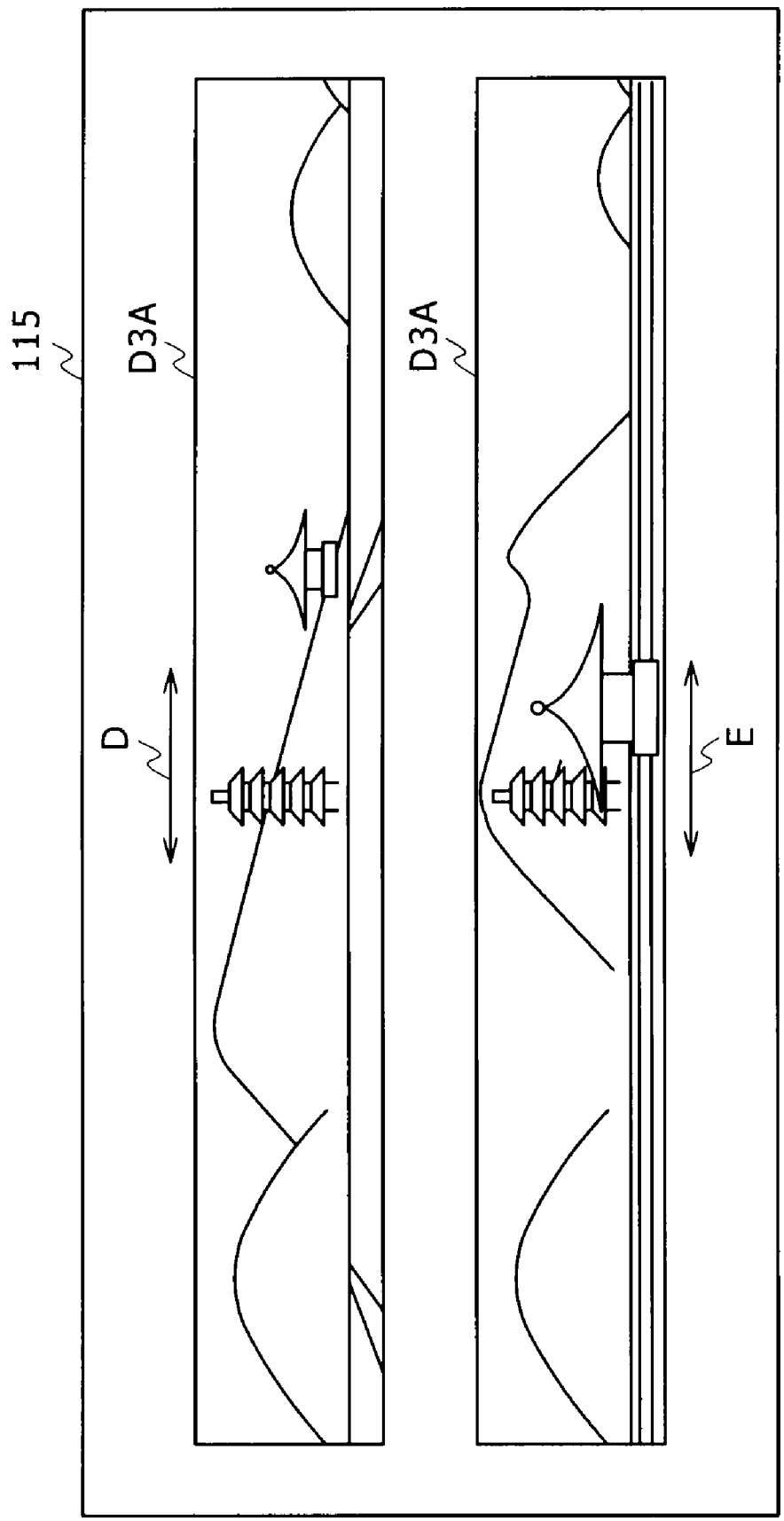
FIG. 34 shows parallel display of panoramic images.

For this reason, when the user operates the touch panel 118 to specify parallel display of panoramic images, the control section 113 allows the background image display section 15 to parallel display all panoramic images D3A associated with two user-specified photographing spots as shown in FIG. 34. Meanwhile, in this case, the point is to vertically display all panoramic images associated with the two photographing spots in parallel. It may be preferable to display only part of the panoramic image in a range displayable on the background image display section 115. The background image display section 115 and the bird's-eye image display section 117 each may display one of the two images. The bird's-eye image display section 117 may display them all at a time. Further, a third display apparatus may be provided to display them. The control section 113 scrolls this display in accordance with the user specification and accepts the input for the moved destination.

Figure 35:
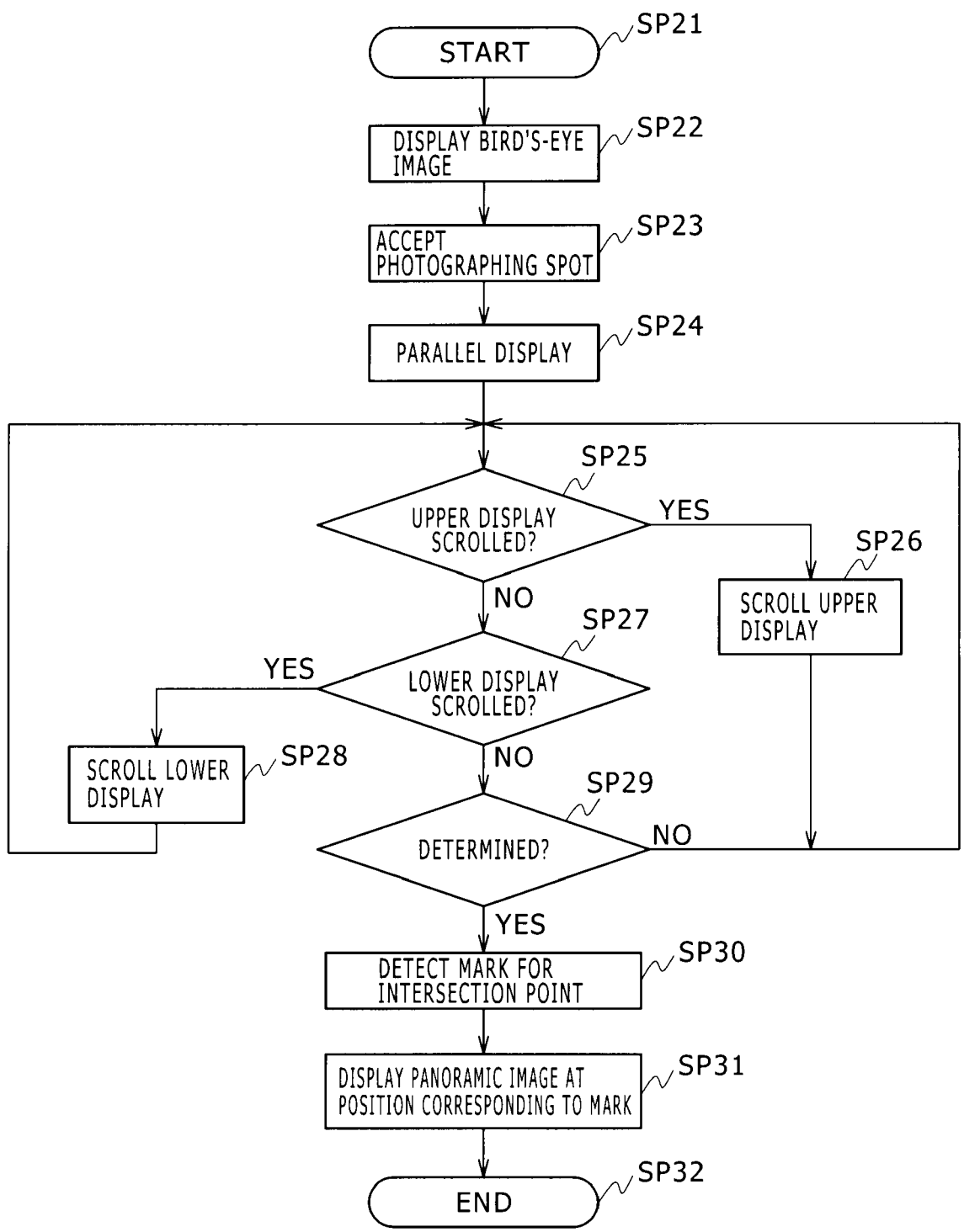
FIG. 35 is a flowchart showing a process of the control section concerning parallel display of panoramic images.

That is, FIG. 35 is a flowchart showing a procedure of the control section 113 concerning this parallel display of panoramic images. When starting this procedure, the control section 113 proceeds to Step SP22 from Step SP21 and allows the bird's-eye image display section 117 to display a bird's-eye image. At Step SP23 to follow, the control section 113 detects selection of the marks M1 through M5 displayed in this bird's-eye image according to the touch panel 118 and accepts the photographing spot specified by the user. At this time, the control section 113 accepts the selection of two marks out of M1 through M5 to accept the selection of the photographing spots corresponding to the two images used for the parallel display in this manner.

The control section 113 then proceeds to Step SP24 and reads two panoramic image data D3 concerning the photographing spots acquired at Step SP23 from the media database 112. The control section 113 vertically displays panoramic images D3A based on the two read panoramic image data D3 as shown in FIG. 34.

The control section 113 then proceeds to Step SP25 and determines whether or not the user operates the touch panel 118 to specify the scroll of an upper panoramic image displayed. When the positive result is acquired here, the control section 113 proceeds to Step SP26, scrolls the upper panoramic image D3A as indicated by an arrow D in FIG. 34, and returns to Step SP25. When the negative result is acquired at Step SP25, however, the control section 113 proceeds to Step SP27 from Step SP25 and determines whether or not the user operates the touch panel 118 to specify the scroll of a lower panoramic image D3A displayed. When the positive result is acquired here, the control section 113 proceeds to Step SP28 from Step SP27, scrolls the lower panoramic image as indicated by an arrow E in FIG. 34, and returns to Step SP25.

When the negative result is acquired at Step SP27, however, the control section 113 proceeds to Step SP29 and determines whether or not the user operates the touch panel 118 to operate the submit menu. When the negative result is acquired here, the control section 113 returns to Step SP25 from Step SP29. According to these steps, the control section 113 scrolls each of the vertically displayed panoramic images D3A in accordance with the user operation.

Figure 36:
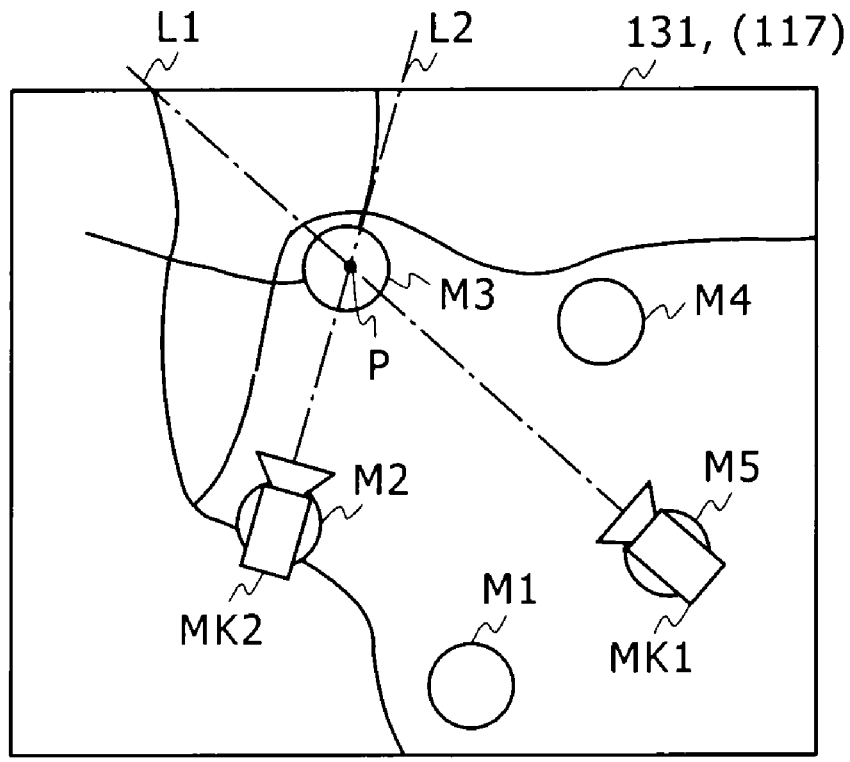
FIG. 36 illustrates mark detection of an intersection point.

When the positive result is acquired at Step SP29, however, the control section 113 proceeds to Step SP30. Here, the control section 113 detects to which directions for multiple photographing spots the horizontal center of the vertically displayed panoramic images D3A corresponds. Further, based on this detection result, the control section 113 detects an intersection point P of lines L1 and L2 extending in the directions detected at the respective photographing spots as shown in the bird's-eye image 131 of FIG. 36. The control section 113 detects the photographing spot nearest to this intersection point P (the photographing spot indicated by the mark M3 in this case). In this manner, the control section 113 detects the move destination intended by the user. At Step SP31 to follow, the control section 113 acquires the panoramic image data D3 associated with this move destination, displays it on the background image display section 115, and returns to Step SP32 to terminate this procedure.

In this manner, the control section 113 scrolls the display of the two panoramic images so that the move destination is centered on the panoramic images displayed in full screen. These two panoramic images are used to accept an input for the move destination, change the display, and further improve the usability.

Meanwhile, instead of such scroll for the move destination direction setting, a cursor may be displayed and moved on the panoramic image to accept the move destination direction setting. When the bird's-eye image display section 117 parallel displays the panoramic images, the touch panel 118 may be operated to accept the move destination direction setting.

Concurrently with a series of such processes for the image display on the background image display section 115, the control section 113 controls the illumination controller 119 to diversely vary the illumination 120 in accordance with images displayed on the background image display section 115.

Accordingly, when acquiring the first panoramic image data D3 during a series of the above-mentioned processes, the control section 113 generates the illumination control information D5 about this panoramic image data D3 and records it in the media database 112.

Figure 37:
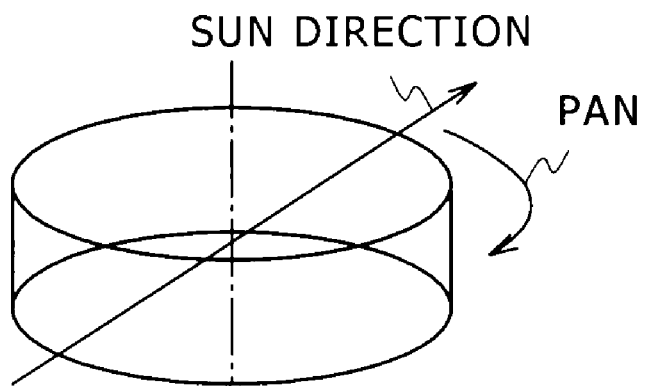
FIG. 37 illustrates relationship between a sun direction and a photograph direction.

That is, the control section 113 calculates an average value of pixel values included in each of partial images included in the panoramic image data D3 and accordingly detects an average luminance level for each partial image. Here, as shown in FIG. 37, the imaging apparatus photographs a partial image based on a sequential pan at one photographing spot. The photograph against the sun direction can give an imaging result at a high luminance level. On the contrary, the photograph toward the sun direction is subject to so-called backlight and gives an imaging result at a low luminance level.

Consequently, as shown in FIG. 38, the average luminance level detected in this manner sinusoidally varies in accordance with positions of the partial image with reference to the sun direction. The control section 113 generates the illumination control information D5 so as to vary the illumination 120 in accordance with the thus detected average luminance levels for parts of the panoramic image.

Specifically, according to the embodiment, the illumination control information D5 for each partial image is generated so that the brightness of the illumination 120 is proportional to the average luminance level detected for each partial image. Further, the illumination control information D5 for each partial image is generated so that the color temperature of the illumination is proportional to the average luminance level detected for each partial image. Based on these, the illumination 120 is configured to be brighter according as the background image display section 115 displays a brighter image. An apparent contrast is increased for the image displayed on the background image display section 115. That is, in this case, a portion having a high luminance level is made to appear brighter. In this manner, an apparent contrast is increased. Moreover, a color temperature is increased for a portion having a high luminance level. In this manner, the image having a higher luminance level is made to appear to be an image subject to the sunlight. Also in this manner, an apparent contrast is increased.

As shown in FIG. 39, the control section 113 records and maintains the thus generated illumination control information D5, along with an image ID as an identification code for identifying the corresponding partial image, in the media database 112. According to portions of the panoramic image to be displayed on the background image display section 115, the control section 113 retrieves the illumination control information D5 recorded in this media database 112 and detects the corresponding illumination control information D5. According to the detected illumination control information D5, the illumination controller 119 provides control to control the brightness and the color temperature of the illumination 120.

Figure 40:
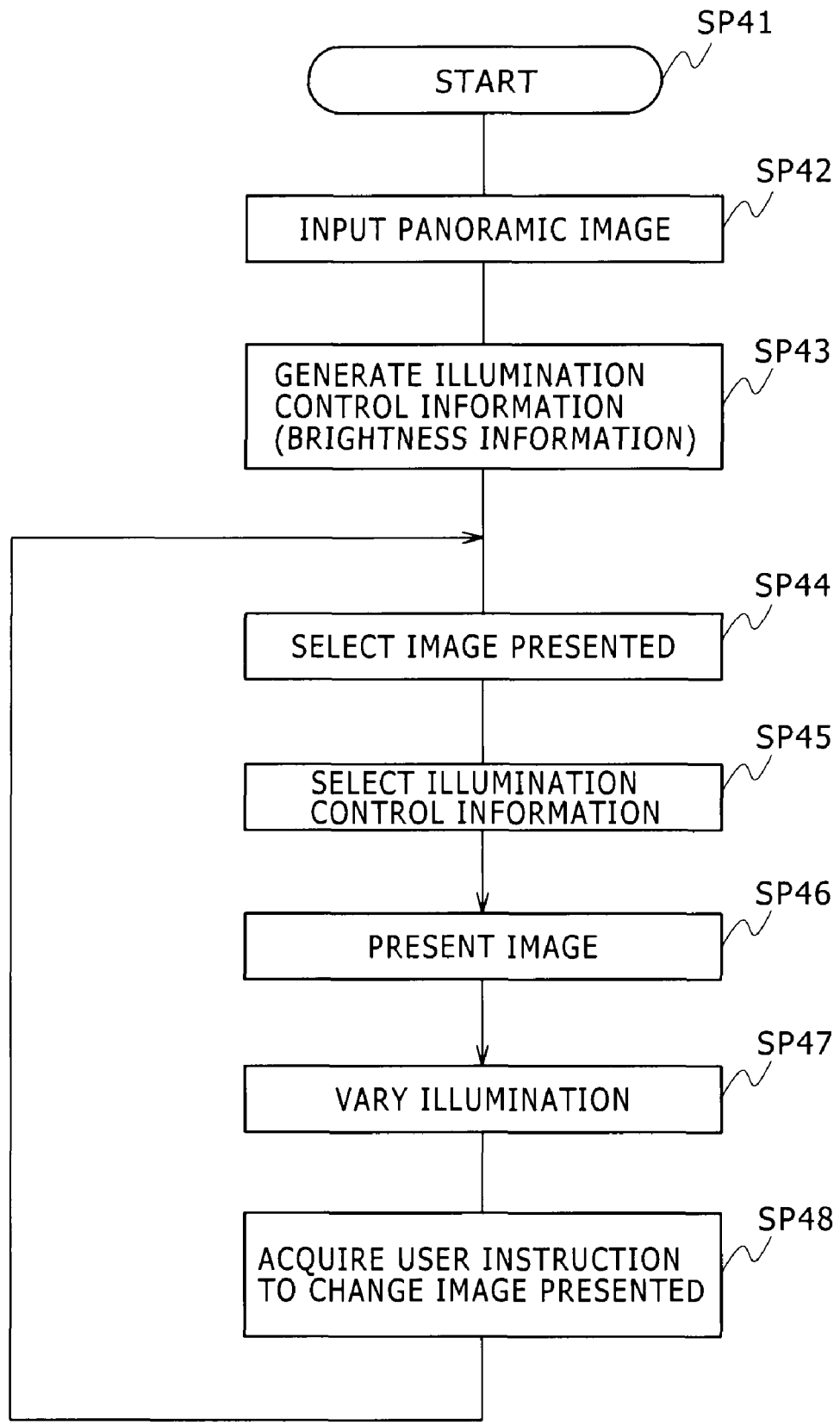
FIG. 40 is a flowchart showing a procedure of the control section for processing the illumination control information.

FIG. 40 is a flowchart showing a procedure of the control section 113 concerning this control of the illumination 120. When starting this procedure, the control section 113 proceeds to Step SP42 from Step SP41 and acquires a panoramic image. At Step SP43 to follow, the control section 113 generates the illumination control information D5 from the acquired panoramic image as mentioned above, records and maintains it in the media database 112.

Further, at Step SP44 to follow, the control section 113 selects an image to be displayed on the background image display section 115. At Step SP45 to follow, the control section 113 acquires the illumination control information D5 corresponding to the image to be displayed from the media database 112. At Step SP46 to follow, the control section 113 allows the background image display section 115 to display the image selected at Step SP44. At Step SP47 to follow, the control section 113 controls the illumination 120 based on the illumination control information D5 acquired at Step SP45. Moreover, at Step SP48 to follow, the control section 113 acquires a user instruction to change the image displayed on the background image display section 115 and then returns Step SP44.

Meanwhile, when the control section 113 can ensure sufficient throughput, for example, the illumination control information may be generated realtime, not previously as mentioned above. Further, adversely, the illumination control information may be generated during generation of the panoramic image data D3 and may be supplied along with the panoramic image data D3.

According to the above-mentioned construction, the user operates the bird's-eye image, changes the wide-angle image display at different photographing spots, and scrolls this image display. The display of photographed images can ensure an increased immersive sense than the prior art.

Further, the wide-angle image display is changed in accordance with audio data corresponding to a wide-angle image. The audio data supplied to the user is changed in interlock with the scroll to vary sound image locations. In this manner, the audio can also improve the realistic sensation and provide more increased immersive sense.

Moreover, a user input for a wide-angle display image changes the wide-angle image display and scrolls this image display. In this manner, it is possible to improve the usability for users.

Furthermore, wide-angle images are parallel displayed. The display is changed to an image related to a photographing place corresponding to a user-specified direction. In this manner, it is also possible to improve the usability for users.

Still further, the room illumination varies in interlock with the change of the display on the background image display section and the scroll of the wide-angle image. In this manner, it is possible to vary the atmosphere and the contrast depending on images and further improve the immersive sense.

Specifically, varying the illumination signifies varying either or both the brightness and the color temperature. In addition, varying the illumination signifies increasing the brightness and the color temperature in accordance with luminance levels. Accordingly, it is possible to further improve the immersive sense.

Meanwhile, contrary to the above-mentioned illumination control, the illumination control information D5 may be generated for each partial image so that the illumination's brightness and color temperature are inversely proportional to the average luminance level detected for each partial image.

That is, the illumination 120 is configured to be dark according as the background image display section 115 displays a bright image. An apparent contrast is increased for the image displayed on the background image display section 115. That is, in this case, a portion having the low luminance level is made to appear darker to increase the apparent contrast. Further, a color temperature is increased for the portion having the low luminance level. Consequently, the image having a lower luminance level is made to appear to be an image subject to the sunlight. Also in this manner, an apparent contrast is increased.

Varying the brightness and the color temperature concerning the illumination signifies decreasing the brightness and the color temperature in accordance with luminance levels for images displayed on the background image display section. Also in this manner, it is possible to vary the atmosphere and the contrast depending on images and further improve the immersive sense.

Moreover, depending on images to be displayed, it may be preferable to switch between proportion control for making the illumination's brightness and color temperature proportional to the average luminance level detected for each partial image and inverse proportion control for making the illumination's brightness and color temperature inversely proportional to the average luminance level detected for each partial image. Consequently, the illumination control is switched in accordance with an image to be displayed. Specifically, for example, the proportional control is used to control the illumination for displaying a seaside landscape. The inverse proportional control is used to control the illumination for displaying an image photographed in the room. In this manner, the illumination control is switched depending on images to be displayed. It is also possible to further improve the immersive sense.

Further, the sun direction may be recorded and maintained when photographing an image used to generate the panoramic image data. The panoramic image data D3 may be provided with information that specifies the sun direction. The image display apparatus 111 uses the information for specifying the sun direction to vary the illumination' brightness and color temperature in accordance with the direction of the sun for photographing an image displayed on the background image display section 115. In this manner, the illumination' brightness and color temperature are varied in accordance with the direction of the sun for photographing an image displayed on the background image display section 115. Accordingly, it is possible to further improve the immersive sense.

Further, the panoramic image data D3 may be provided with photographing time information for specifying the photograph time. This photograph time information may be used to control the illumination. Specifically, when the photographing time belongs to the evening, the illumination's brightness and color temperature are decreased. When the photographing time belongs to the night, the illumination's brightness and color temperature are further decreased. When the photographing time belongs to the daytime, the illumination's brightness and color temperature are increased. In this manner, the illumination varies with the time to photograph images to be displayed on the background image display section 115. It is also possible to improve the immersive sense.

Figure 41:
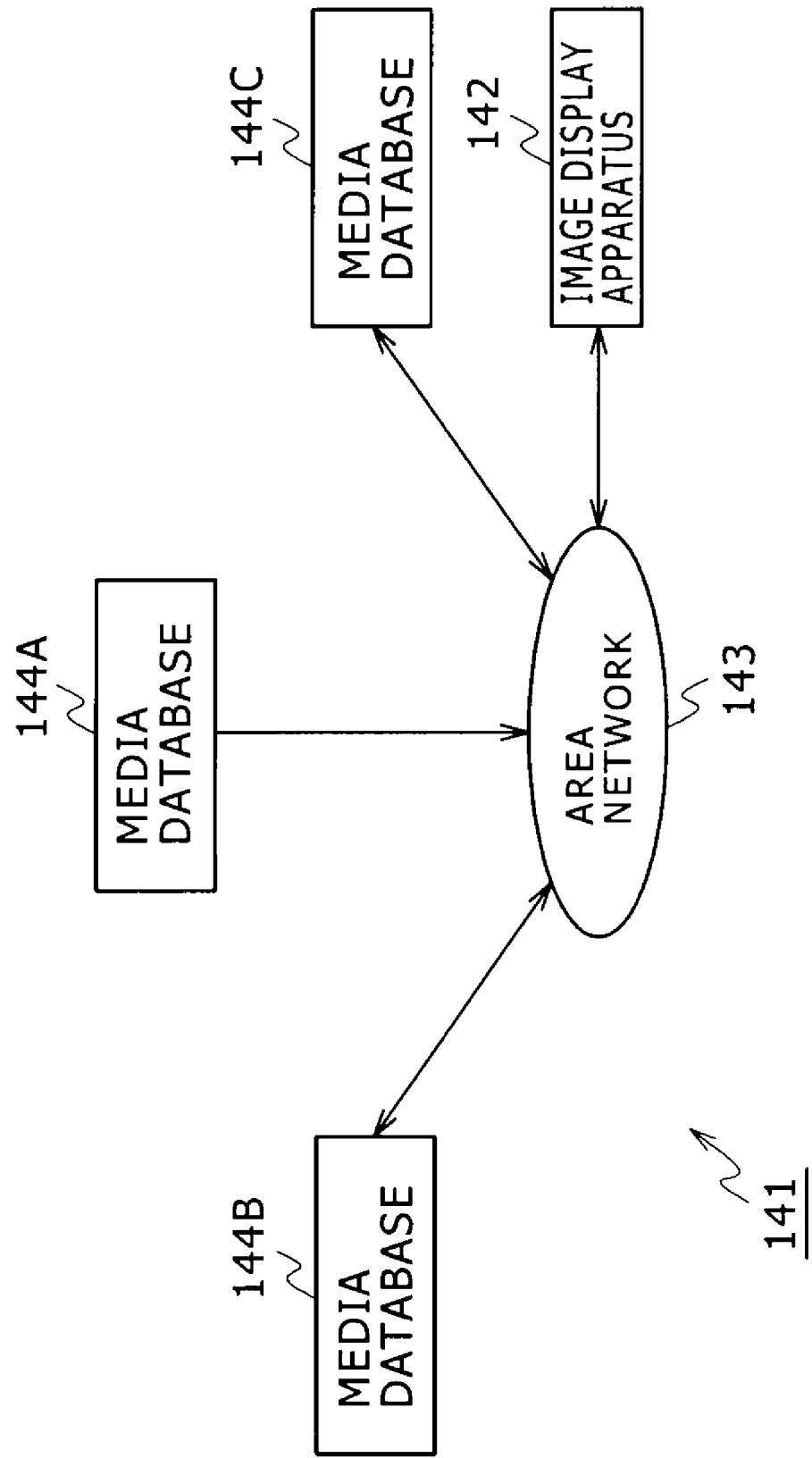
FIG. 41 is a block diagram showing another construction of the image display system.

FIG. 41 is a block diagram showing the construction of another image display system 141. This image display system 141 maintains the panoramic image data and the bird's-eye image data in media databases 144A through 144C as servers on a network. Accordingly, in this image display system 141, an image display apparatus 142 is constructed equally to the above-mentioned image display apparatus 111 (see FIG. 19) except that the media databases 144A through 144C are accessed via a broadband network 143 to acquire the panoramic image data and the bird's-eye image data. In this manner, it is possible to provide the same effect as that for the above-mentioned embodiment even when an image data recording and reproducing section is networked.

Meanwhile, while the above-mentioned embodiment has described the case of generating partial images from the panoramic image to provide the whole image data, the present invention is not limited thereto. Images files for images based on original imaging results may construct the whole image data. Further, one panoramic image may construct the panoramic image data.

Moreover, the above-mentioned embodiment has described the case of using a still picture for displaying images. The present invention is not limited thereto and is widely applicable to a case of using a motion picture for displaying images. In this case, a network as mentioned above with reference to FIG. 41 may be used to connect with a sever that supplies the panoramic image data. Furthermore, the server can provide multiple imaging results in motion pictures to be used for generating the above-mentioned panoramic image data. The image display apparatus can synthesize images as an imaging result in motion pictures, diversely vary orientations, and display a motion picture video on the background image display section.

Further, a dedicated imaging mechanism for panoramically imaging motion pictures can be used to acquire and provide an imaging result in motion pictures, process images as the imaging result in motion pictures, diversely vary orientations, and display a motion picture video on the background image display section. Such dedicated imaging mechanism for panoramically imaging motion pictures uses a curved mirror or a pyramid mirror, for example. In this case, the image display apparatus needs to convert images of the transmitted imaging result depending on the imaging mechanism.

Moreover, the above-mentioned embodiment has described the case of using the panoramic image as a wide-angle image hardly displayable on one screen. The present invention is not limited thereto and is widely applicable to display of images having various dimensions such as only the front part of an image as needed.

Further, the above-mentioned embodiment has described the case of applying the invention to display of a horizontally extending wide-angle image. The present invention is not limited thereto and is widely applicable to display of a vertically extending wide-angle image instead thereof or in addition thereto.

Furthermore, the above-mentioned embodiment has described the case of controlling the illumination's brightness and color temperature. The present invention is not limited thereto and may control the illumination distribution. That is, for example, a backlight image is displayed by lightening the image's display side and darkening the reverse side. In this manner, the illumination distribution makes it possible to feel the sun direction and further improve the realistic sensation. Conversely, an image photographed through exposure to the sunlight is displayed by lightening the background. In this manner, the illumination distribution makes it possible to feel the sun direction and further improve the realistic sensation.

Still further, the above-mentioned embodiment has described the case of using the audio and the illumination to increase the immersive sense. The present invention is not limited thereto and may further control the wind, temperature, etc. to moreover increase the immersive sense.

(3) Examples of Installing the Projector

The following describes various examples of installing the projector in the audiovisual room (room) having the space between the ceiling and the under-the-roof portion, the space between the floor and the under-the-floor portion, or the space between the inner wall and the outer wall as mentioned above.

Figure 42:
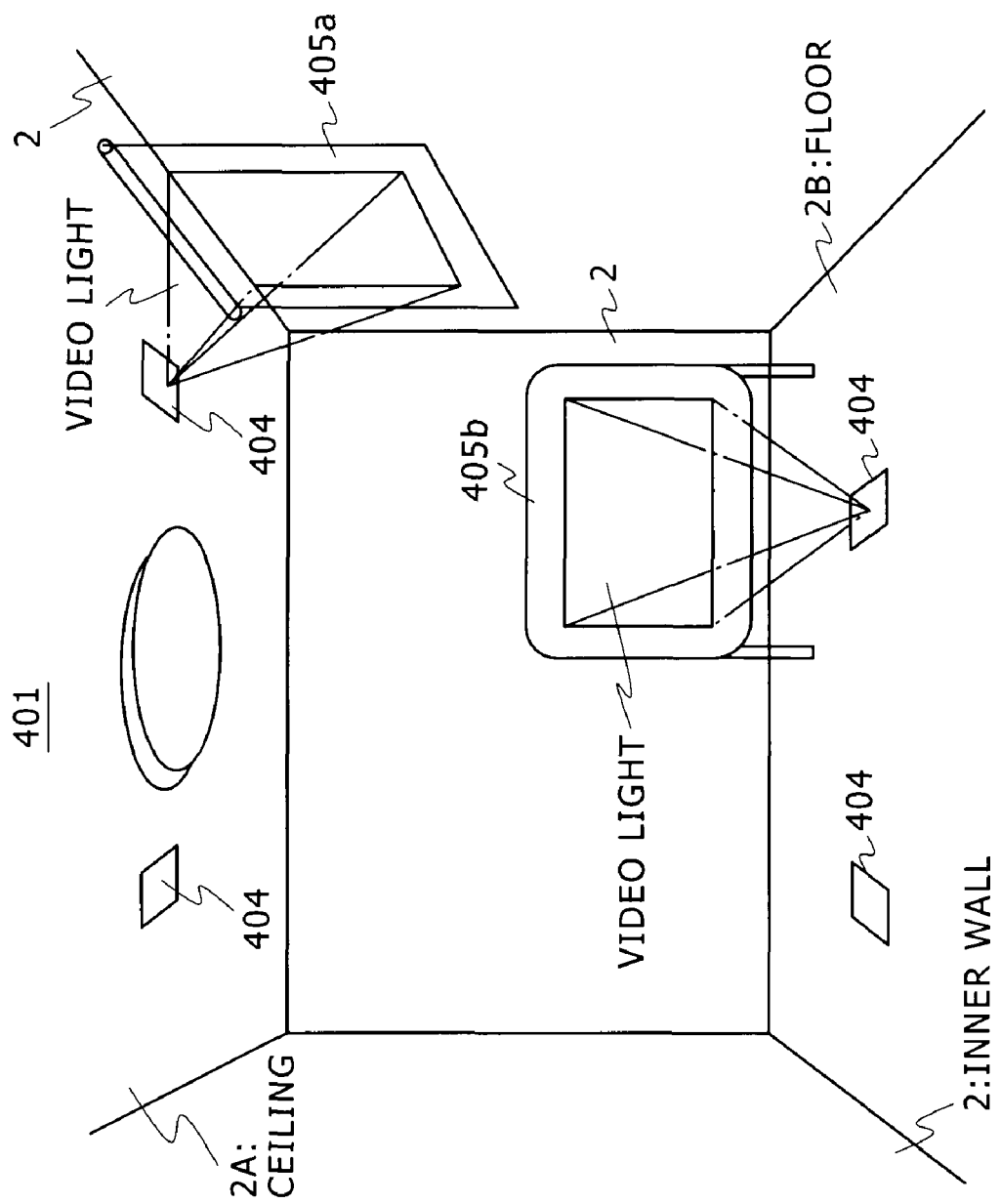
FIG. 42 is a perspective view showing a state (radiating video light to a screen) inside an audiovisual room (room) surrounded by an inner wall, a ceiling, and a floor.

FIG. 42 shows an inside of an audiovisual room (room) 401 surrounded by the inner wall 2, the ceiling 2A, and the floor 2B. This audiovisual room 401 is provided with a projection window 404 as an opening section at multiple locations, i.e., two locations according to the example in the drawing, each on the ceiling 2A and the floor 2B. Here, the projection window 404 is formed as an opening section or the same provided with a transparent plate material such as glass so as to be able to radiate video light to a screen etc. provided in the room from a projector 402 (not shown in FIG. 42) installed in the space between the ceiling 2A and the under-the-roof portion 3A (see FIGS. 15 and 16) or the space between the floor 2B and the under-the-floor portion 3B (see FIG. 16). Meanwhile, the projection window 404, when simply formed as the opening section, is provided with a cover (not shown) and is covered with this cover when not used.

The projector 402 installed between the ceiling 2A and the under-the-roof portion 3A selectively moves along the surface of the ceiling 2A to a position corresponding to any of the projection windows 404 formed in this ceiling 2A. The projector 402 radiates video light to a specified position in the audiovisual room 401 through the projection window 404 and displays a video at the specified position. Similarly, the projector 4021 installed between the floor 2B and the under-the-floor portion 3B selectively moves along the surface of the floor 2B to a position for any of the projection windows 404 formed in this floor 2B. The projector 402 radiates video light to a specified position in the audiovisual room 401 through the projection window 404 and displays a video at the specified position. In this manner, the projector 402 is constructed to radiate the video light to a specified position in the room through the projection window 404. When used, the projector 402 is not placed in the room and does not disorder a room atmosphere at the point of use.

For example, a guide member is provided between these two projection windows 404 so that the projector 402 can selectively move to the positions of the two projection windows 404. In this case, the guide member guides the projector 402 and is also used as a power supply line for supplying the power to the projector 402. As mentioned above, the projector 402 has a position detection mechanism so as to selectively move to the positions of the two projection windows 404 guided by the guide member and correctly move to the positions corresponding to the projection windows 404. This position detection mechanism detects whether or not the position is reached by detecting a position detection member provided at the position for each projection window 404.

When position detection mechanism uses an optical technique, for example, a reflective sheet etc. as the position detection member is bonded to the rear of the ceiling 2A, or to the guide member, etc. When the position detection mechanism uses an IC tag, for example, the IC tag is attached to the rear of the ceiling 2A, or to the guide member, etc. In this manner, various position detection members are provided to the rear of the ceiling 2A etc. in accordance with the position detection technique the position detection mechanism uses.

Figure 43:
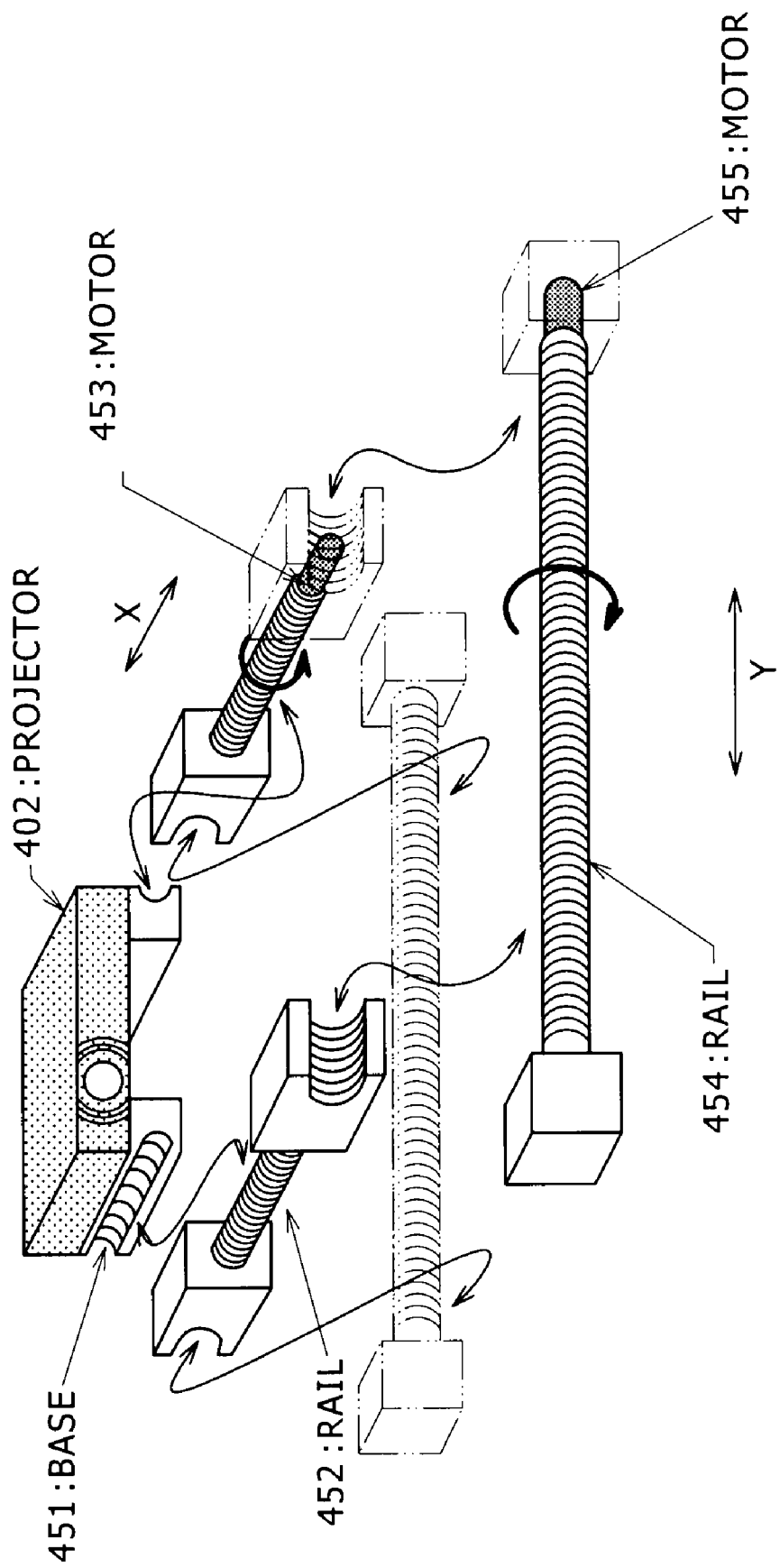
FIG. 43 is an exploded perspective view showing a construction of a transferring mechanism of the projector.

FIG. 43 exemplifies a transferring mechanism of the projector 402. Two screwed bases 451 support both bottom ends of the projector 402. The bases 451 are provided so as to be respectively engaged with two screwed rails 452. Motors 453 synchronously rotate the two rails 452 to move the projector back and forth (X direction).

Both ends of the two rails 452 are also structured to be screwed and are provided to be engaged with two screwed rails 454. Motors 455 synchronously rotate the two rails to move the projector 402 left and right (Y direction).

The transferring mechanism for the projector 402 as shown in FIG. 43 uses, for example, the rail 452 or the rail 454 as the guide member for guiding the projector 402 to the positions of the two projection windows 404 as mentioned above.

Figure 44:
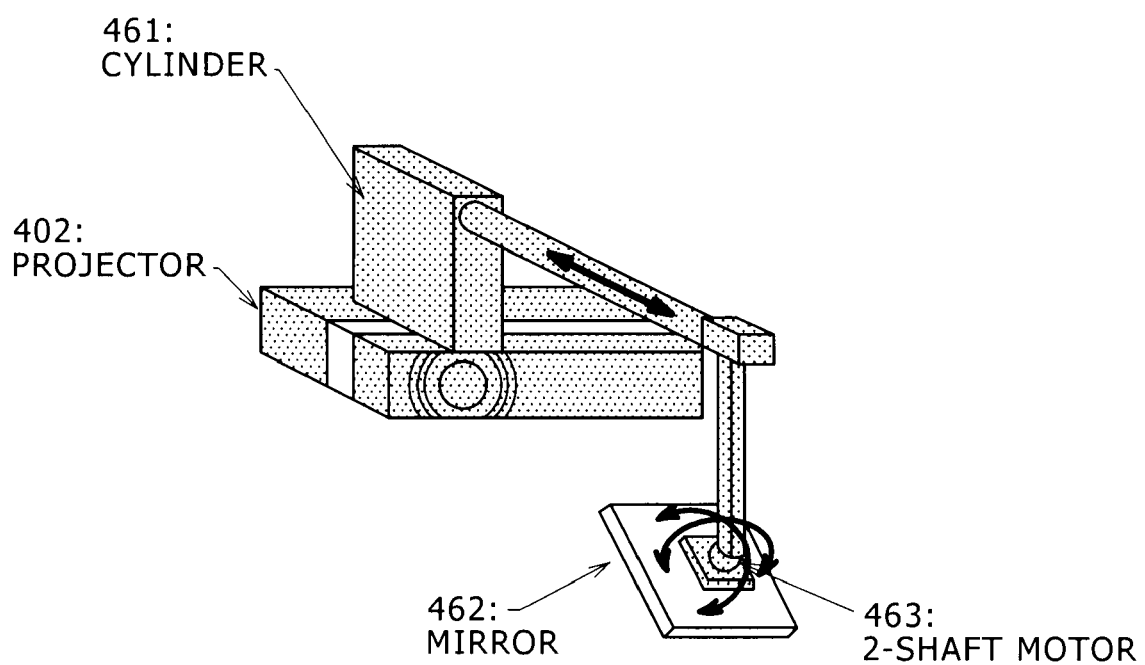
FIG. 44 is a perspective view showing a mirror moving mechanism of the projector.

Further, the projector 402 includes: a mirror that reflects video light emitted from a projection mechanism in a specified direction; and a mirror moving mechanism that varies the mirror's positions and angles. FIG. 44 shows an example of the mirror moving mechanism. A cylinder 461 is attached to the top surface of the projector 402. A mirror 462 is attached to the tip of this cylinder 461. The cylinder 461 enables adjustment of a distance between the mirror 462 and the projector 402.

Further, a 2-shaft motor 463 is provided to a position for attaching the mirror 462 to the cylinder 461. The 2-shaft motor 463 enables adjustment of the mirror 462. In this manner, the cylinder 461 and the 2-shaft motor 463 can vary positions and angles of the mirror 462. This makes it possible to adjust a direction of the video light emitted from the projection mechanism of the projector 402, i.e., a position for projecting a video in the room. It is possible to increase the freedom of selecting video display positions.

Now referring back to FIG. 42, the audiovisual room 401 is provided with screens 405a and 405b corresponding to one of the projection windows 404 provided for the ceiling 2A and the floor 2B respectively by means of prior installation or setup by the user on a case-by-case basis.

Figure 45:
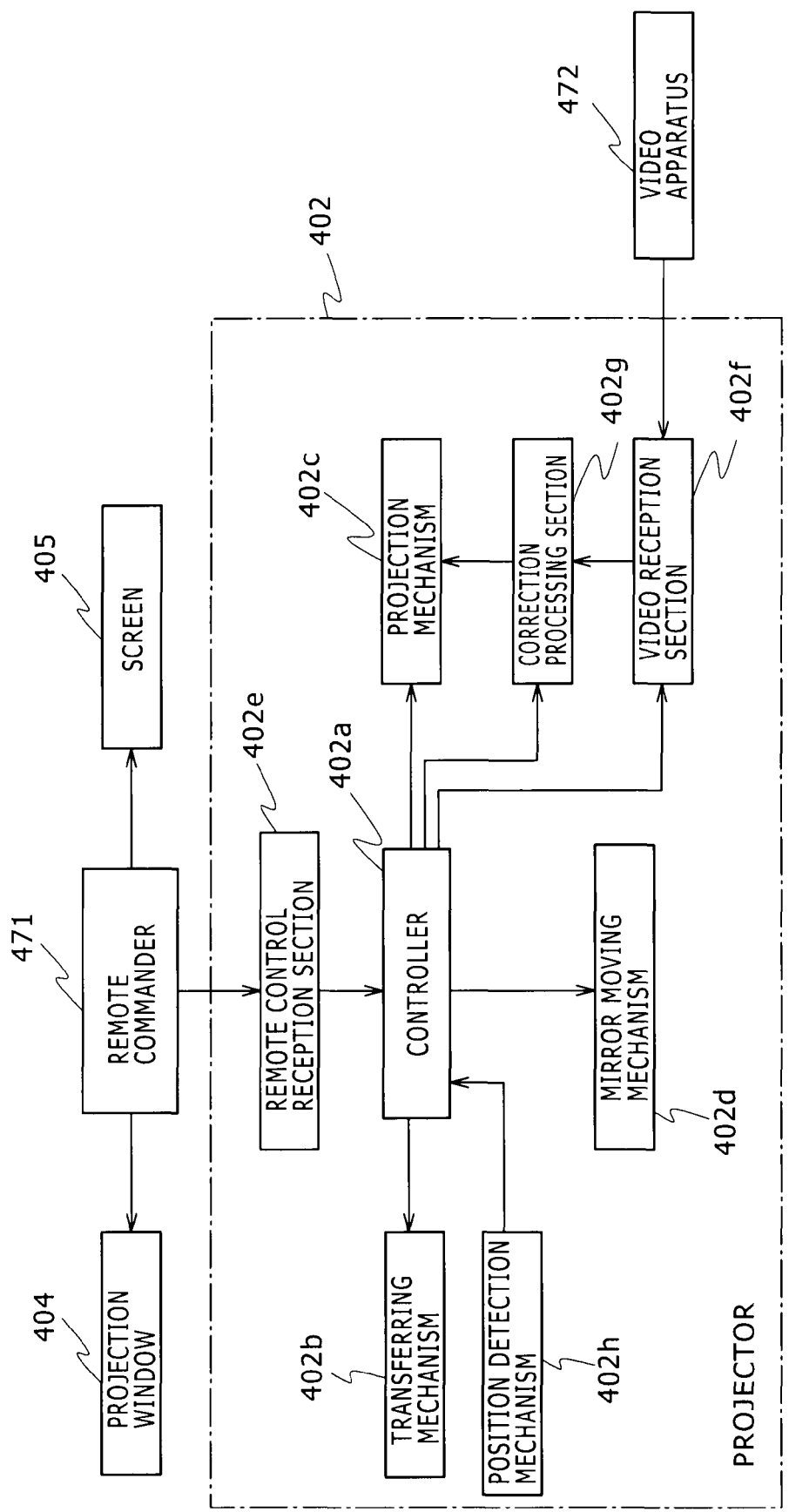
FIG. 45 is a block diagram showing a construction of the projector.

FIG. 45 shows a construction of the above-mentioned projector 402. The projector 402 includes: a controller 402a for controlling the entire operation; the above-mentioned transferring mechanism 402b (see FIG. 43); a mirror moving mechanism 402d (see FIG. 44); a projection mechanism 402c for projecting video light; a remote control reception section 402e that receives a control signal wirelessly transmitted from a remote commander 471; a video reception section 402f that receives a video signal wirelessly transmitted from a video apparatus 472 such as a DVD player, personal computer, and television tuner; a correction processing section 402g that performs a correction process on a video signal received by this video reception section 402f so as to correct distortion such as trapezoidal distortion of a video projected by the projection mechanism 402c to a specified position in the room; and a position detection mechanism 402h. For example, the video apparatus 472 is housed in the space between the inner wall 2 and the outer wall 3.

Meanwhile, the remote control reception section 402e receives a control signal wirelessly transmitted from the remote commander 471. Further, the video reception section 402f receives a video signal wirelessly transmitted from the video apparatus 472. A wireless connection is made between the projector 402 and the video apparatus 472 and between the projector 402 and the remote commander 471. There is no hindrance to movement of the projector 402 in the space due to a cable.

The projection mechanism 402c generates and emits video light based on the video signal received by the video reception section 402f. That is, similarly to the prior art, this projection mechanism 402c includes: a light source; an optical space modulation element such as a liquid crystal display that uses a video signal to space-modulate light emitted from this light source and generate video light; and an optical system that emits this video light.

The remote control reception section 402e receives a control signal from the remote commander 471 and notifies it to the controller 402a. The position detection mechanism 402h detects the above-mentioned position detection member to detect movement of this projector 402 to the position for installing the projection window 404 and notifies the movement to the controller 402. Under control of the controller 402a, the transferring mechanism 402b rotates the screw (see FIG. 43) due to the motor's driving force and accordingly moves this projector 402 along the rail provided in the space over the ceiling or under the floor.

Operations of the projector 402 in FIG. 45 will be described briefly. The description covers a case where the user operates the remote commander 471 to generate a control signal to instruct that the projector 402 installed in a specified space radiates video light to a specified position in the room through the specified projection window 404.

In this case, the remote control reception section 402e receives the control signal from the remote commander 471. The control signal is supplied to the controller 402a. The controller 402a receives this control signal and controls the transferring mechanism 402b to start moving the projector 402 to a position corresponding to the above-mentioned specified projection window 404. When the position detection mechanism 402h detects movement of the projector 402 to the position of the specified projection window 404, the controller 402a controls the transferring mechanism 402b to stop moving the projector 402.

Figure 46:
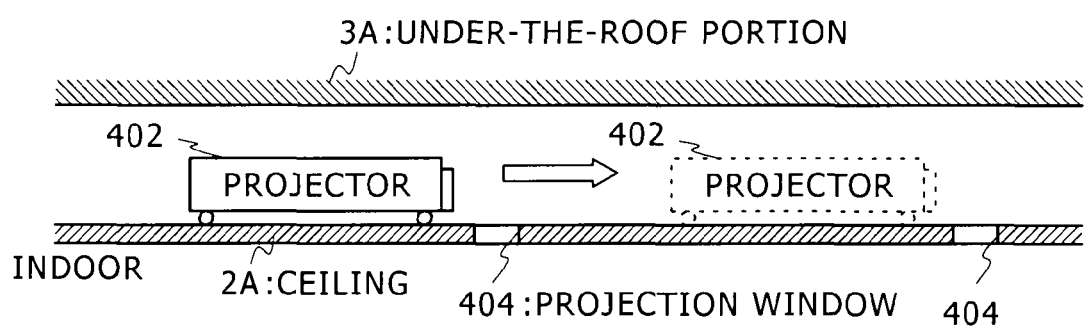
FIG. 46 illustrates movement of the projector placed in a space between the ceiling and an under-the-roof portion along a ceiling surface.
Figure 47:
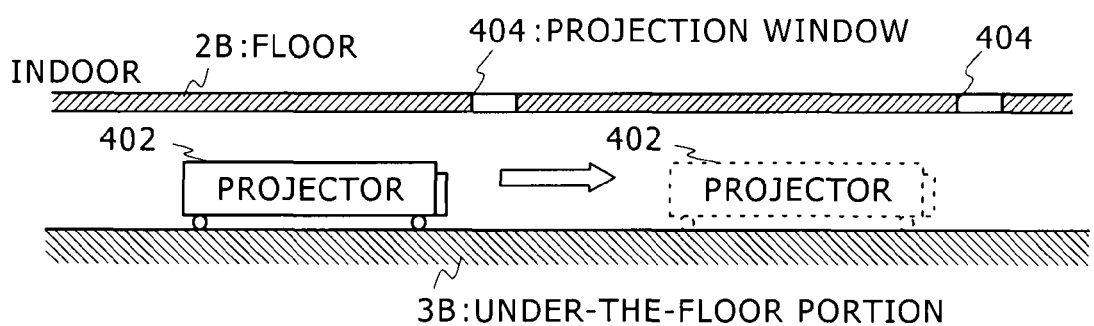
FIG. 47 illustrates movement of the projector placed in a space between the floor and an under-the-floor portion along a floor surface.

In this case, as shown in FIG. 46, the projector 402 installed, for example, in the space between the ceiling 2A and the under-the-roof portion 3A, follows a user instruction to move from the position of the projection window 404 for previous positioning to the position of the next projection window (the specified projection window 404) along the ceiling surface. Further, in this case, as shown in FIG. 47, the projector 402 installed, for example, in the space between the floor 2B and the under-the-floor portion 3B, follows a user instruction to move from the position of the projection window 404 for previous positioning to the position of the next projection window (the specified projection window 404) along the floor surface.

When the projector 402 moves to the position of the specified projection window 404 in this manner, the controller 402a controls the mirror moving mechanism 402d and adjusts a mirror 463, i.e., the position and the angle of a mirror 402d so that the video light passes through the specified projection window 404 and is radiated to a specified position in the room.

When the projector 402 moves to the specified projection window 404 in this manner, the controller 402a starts operations of the projection mechanism 402b, the correction processing section 402g, and the video processing section 402f. The video reception section 402f receives a video signal from the video apparatus 472 and supplies this video signal to the projection mechanism 402c via the correction processing section 402g.

In this manner, the projection mechanism 402c emits the video light based on the video signal. The video light is reflected on the mirror 402d and is radiated to a specified position in the room. The specified position in the room consequently displays a video based on the video signal supplied to the video reception section 402f from the video apparatus 472.

Further, while the video is displayed at the specified position in the room in this manner, the controller 402a adjusts the focus or the zoom factor for the video reception section 402f in accordance with the user's focus or zoom operation based on a notification from the remote control reception section.

Figure 48:
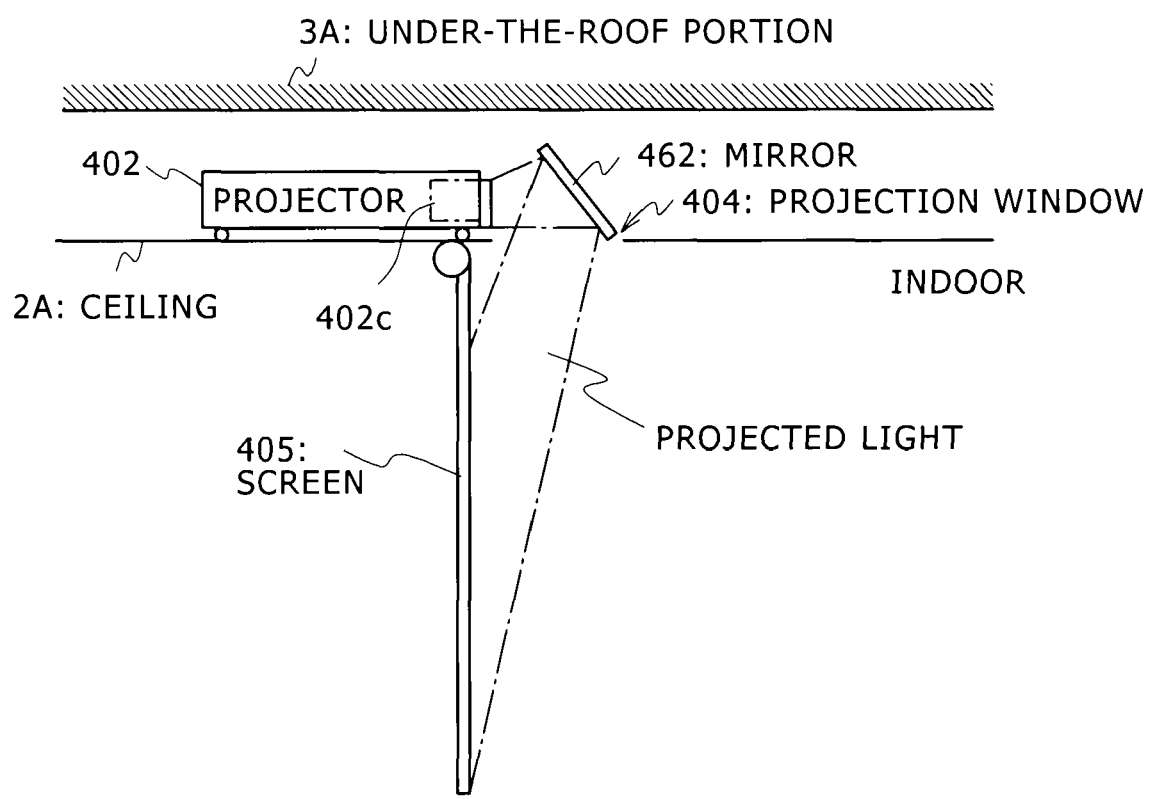
FIG. 48 shows an example of projecting video light from the projector placed in the space between the ceiling and the under-the-roof portion.

Here, as shown in FIG. 48, the projector 402 is placed in the space between the ceiling 2A and the under-the-roof portion 3A. The mirror 462 is placed along the light path for the video light emitted from the projection mechanism 402c and bends the light path of the video light emitted to the ceiling surface. The projector 402 radiates the video light to a screen 405 in the room through the projection window 404 provided in the ceiling 2A. In this case, the radiation position can be adjusted by varying the gradient of the mirror 462.

Figure 49:
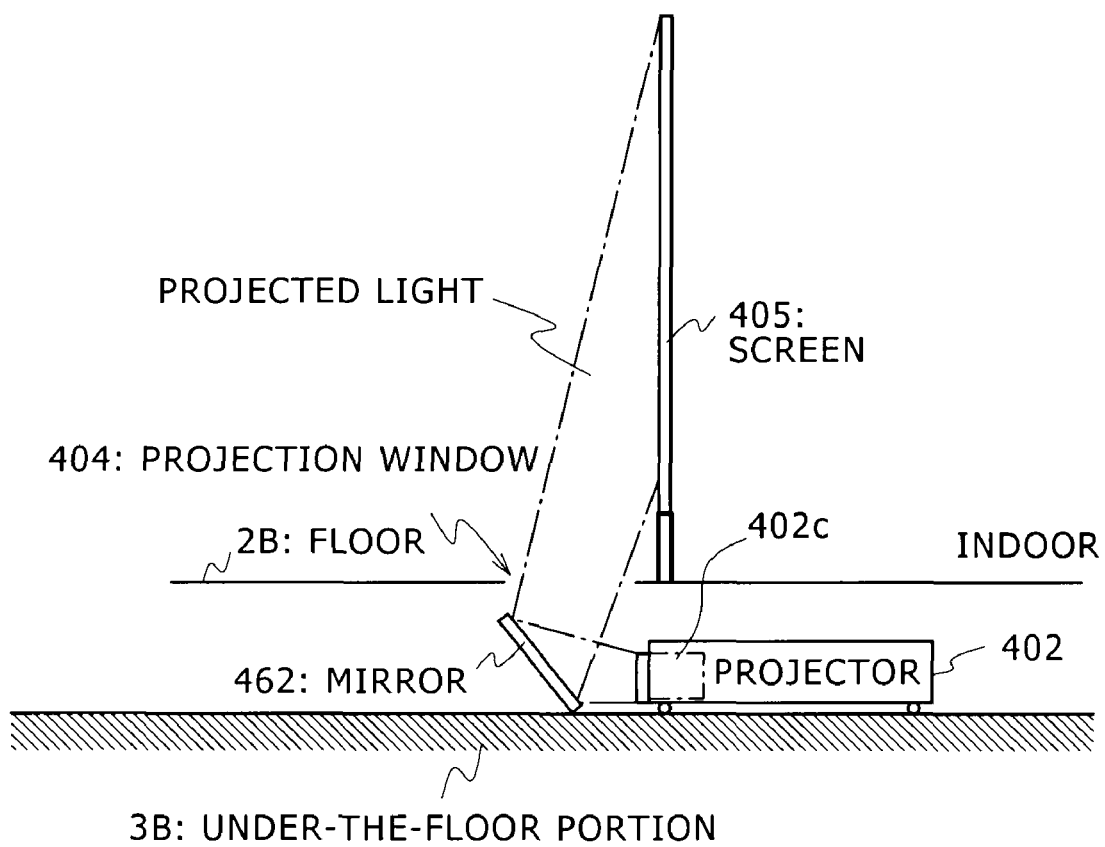
FIG. 49 shows an example of projecting video light from the projector placed in the space between the floor and the under-the-floor portion.

Here, as shown in FIG. 49, the projector 402 is similarly placed in the space between the floor 2B and the under-the-floor portion. The mirror 462 is placed along the light path for the video light emitted from the projection mechanism 402c and bends the light path of the video light emitted to the floor surface. The projector 402 radiates the video light to the screen 405 through the projection window 404 provided on the floor 2B.

Meanwhile, these constructions as shown in FIGS. 48 and 49 obliquely radiate the video light to the screen 405, causing a trapezoidal distortion etc. For this reason, the correction processing section 402g of the projector 402 performs a process on a video signal so as to prevent this trapezoidal distortion etc.

Meanwhile, as mentioned above, the correction processing section 402g performs the correction process on a video signal received by the video reception section 402f and supplies the video signal to the projection mechanism 402c so as to correct the distortion of a video projected by the projection mechanism 402c to the specified position in the room. In this manner, an excellent video without distortion is displayed at the specified position in the room.

When the projection window 404 has a cover, the remote commander 471 controls opening and closing of the projection window 404. That is, as mentioned above, a control signal may be transmitted to the remote control reception section 402e of the projector 402 to instruct the projector 402 to radiate the video light to the specified position in the room through the specified projection window 404. In such case, the control signal is supplied to instruct the specified projection window 404 to open the cover.

Further, as mentioned above, the video light may be radiated to the specified position in the room, i.e., the screen 405 that is normally wound. In such case, the remote commander 471 controls opening and closing of the screen 405. That is, as mentioned above, the control signal may be transmitted to the remote control reception section 402e of the projector 402 and instruct the projector 402 to radiate the video light to the specified position in the room through the specified projection window 404. In this case, the control signal is supplied to open the screen 405.

As mentioned above, the projector 402 is placed in the space between the ceiling 2A and the under-the-roof portion 3A, the space between the floor 2B and the under-the-floor portion 3B, or the space between the inner wall 2 and the outer wall 3. The projector 402 is not placed in the audiovisual room 401 and does not disorder a room atmosphere. Further, the projector 402 can selectively move to multiple positions in the space in accordance with user operations and radiate the video light in the room. The user can appreciate the video at multiple positions in the room.

In comparison with FIG. 42 mentioned above, FIG. 50 shows a state in the audiovisual room (room) 401. While a video is projected on the screen 405 in FIG. 42, a video is projected on the ceiling 2A and the floor 2B in FIG. 50. That is, a video light from the projector 402 placed in the space between the ceiling 2A and the under-the-roof portion 3A is radiated to the floor 2B through the projection window 404 provided in the ceiling 2A. Further, a video light from the projector 402 placed in the space between the floor 2B and the under-the-floor portion 3B is radiated to the ceiling 2A through the projection window 404 provided in the floor 2B. Meanwhile, FIG. 50 does not show the projector 402, the under-the-roof portion 3A, or the under-the-floor portion 3B.

Figure 51:
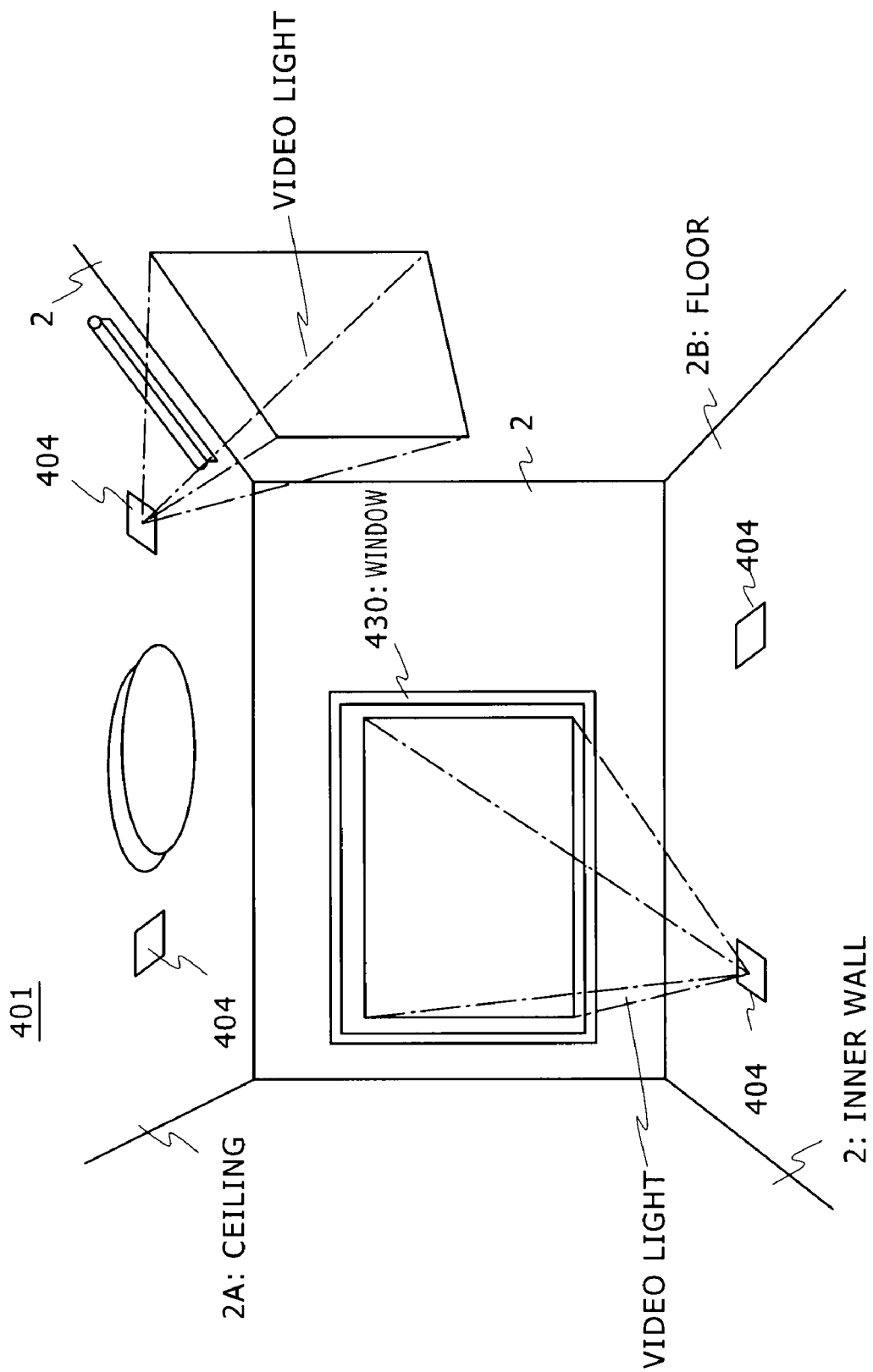
FIG. 51 is a perspective view showing a state (radiating video light to the wall and a window) inside the audiovisual room (room) surrounded by the inner wall, the ceiling, and the floor.

In comparison with FIG. 42 mentioned above, FIG. 51 shows a state in the audiovisual room (room) 401. While a video is projected on the screen 405 in FIG. 42, a video is projected on the inner wall 2 and a window 430 in FIG. 51. That is, a video light from the projector 402 placed in the space between the ceiling 2A and the under-the-roof portion 3A is radiated to the inner wall 2 through the projection window 404 provided in the ceiling 2A. Further, a video light from the projector 402 placed in the space between the floor 2B and the under-the-floor portion 3B is radiated to the window 430 formed in the inner wall 2 through the projection window 404 provided in the floor 2B. Meanwhile, FIG. 51 does not show the projector 402, the under-the-roof portion 3A, or the under-the-floor portion 3B.

In comparison with FIG. 42 mentioned above, FIG. 52 shows a state in the audiovisual room (room) 401. While a video is projected on the screen 405 in FIG. 42, a video is projected on a table 420 in FIG. 50. That is, a video light from the projector 402 placed in the space between the floor 2B and the under-the-floor portion 3B is radiated to the table 420 through the projection window 40 provided in the floor 2B. Meanwhile, FIG. 52 does not show the projector 402 or the under-the-floor portion 3B.

Figure 52:
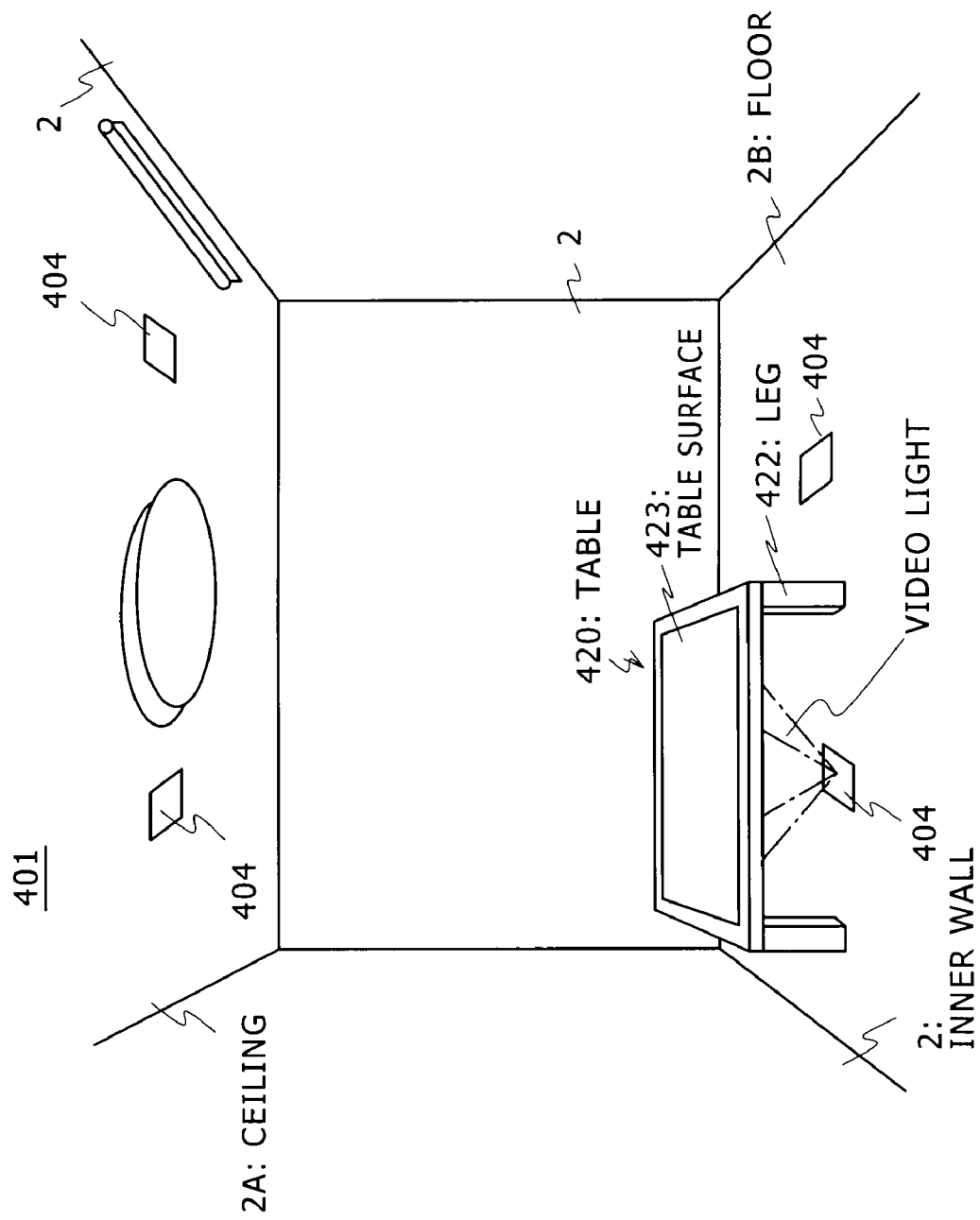
FIG. 52 is a perspective view showing a state (radiating video light to a table surface from the floor) inside the audiovisual room (room) surrounded by the inner wall, the ceiling, and the floor.
Figure 53:
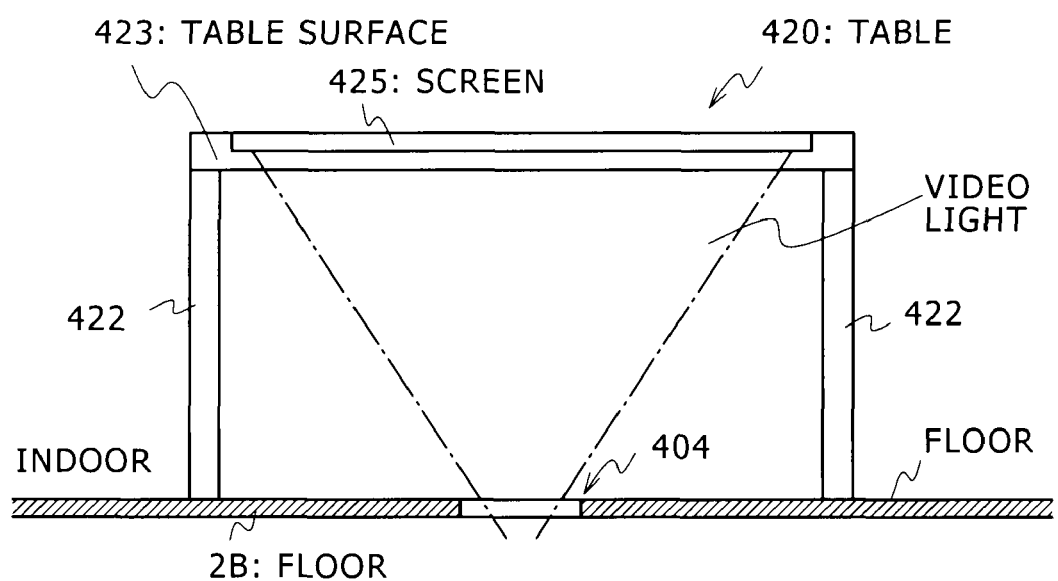
FIG. 53 shows a construction of a table to which video light is radiated.

Here, as shown in FIG. 52, the table 420 is structured to have an approximately square table surface 423 viewed from the top and to use a leg 422 to support each of four corners of this table surface 423. As shown in FIG. 53, the table surface 423 is made of a transparent plate material such as reinforced glass, for example. Further, a screen 425 for rear projection is placed almost entirely on the table surface 423. Consequently, the table 420 uses this screen 425 to receive the video light through the projection window 404 provided in the floor 2B and displays a video from the projector 402 placed in the space between the floor 2B and the under-the-floor portion 3B.

Figure 54:
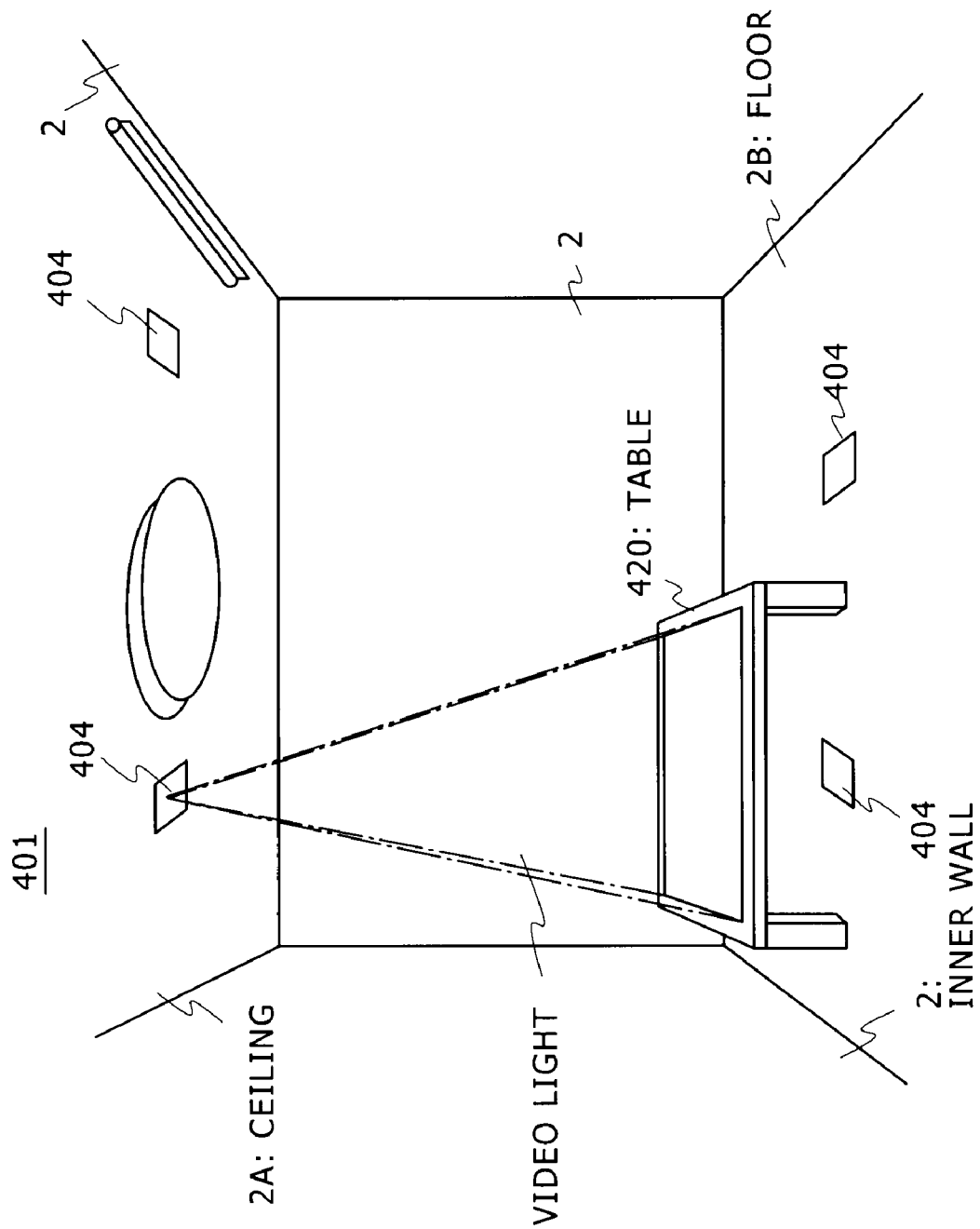
FIG. 54 is a perspective view showing a state (radiating video light from the ceiling to a table surface) inside the audiovisual room (room) surrounded by the inner wall, the ceiling, and the floor.

In comparison with FIG. 42 mentioned above, FIG. 54 shows a state in the audiovisual room (room) 401. While a video is projected on the screen 405 in FIG. 42, a video is projected on the table 420 in FIG. 54. That is, a video light from the projector 402 placed in the space between the ceiling 2A and the under-the-roof portion 3A is radiated to the table 420 through the projection window 404 provided in the ceiling 2A. Meanwhile, FIG. 54 does not show the projector 402 or the under-the-roof portion 3A.

Figure 55:
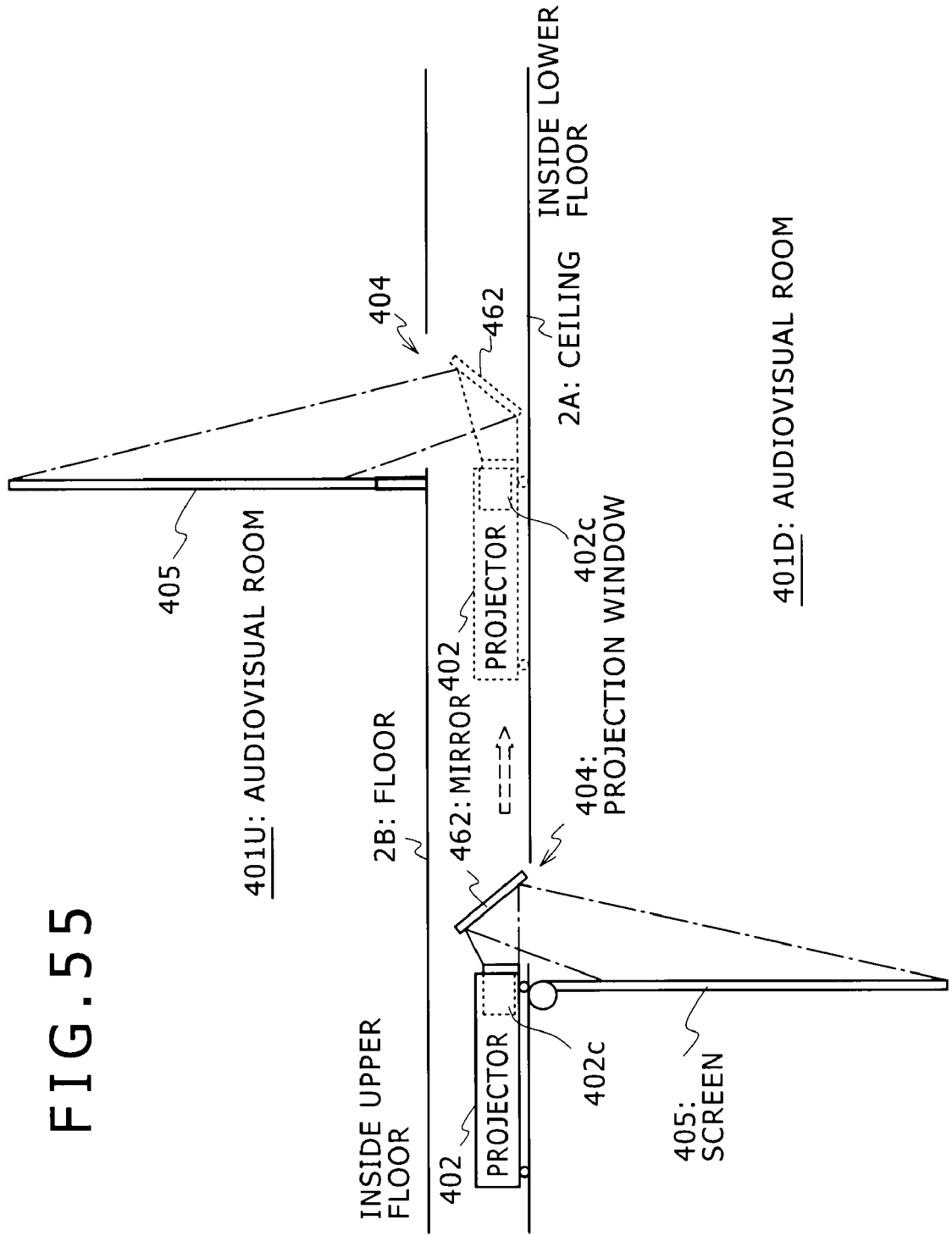
FIG. 55 partially shows a construction of an audiovisual room system that uses one projector to display video on screens in two up-and-down (vertically) adjacent audiovisual rooms (rooms)
Figure 56:
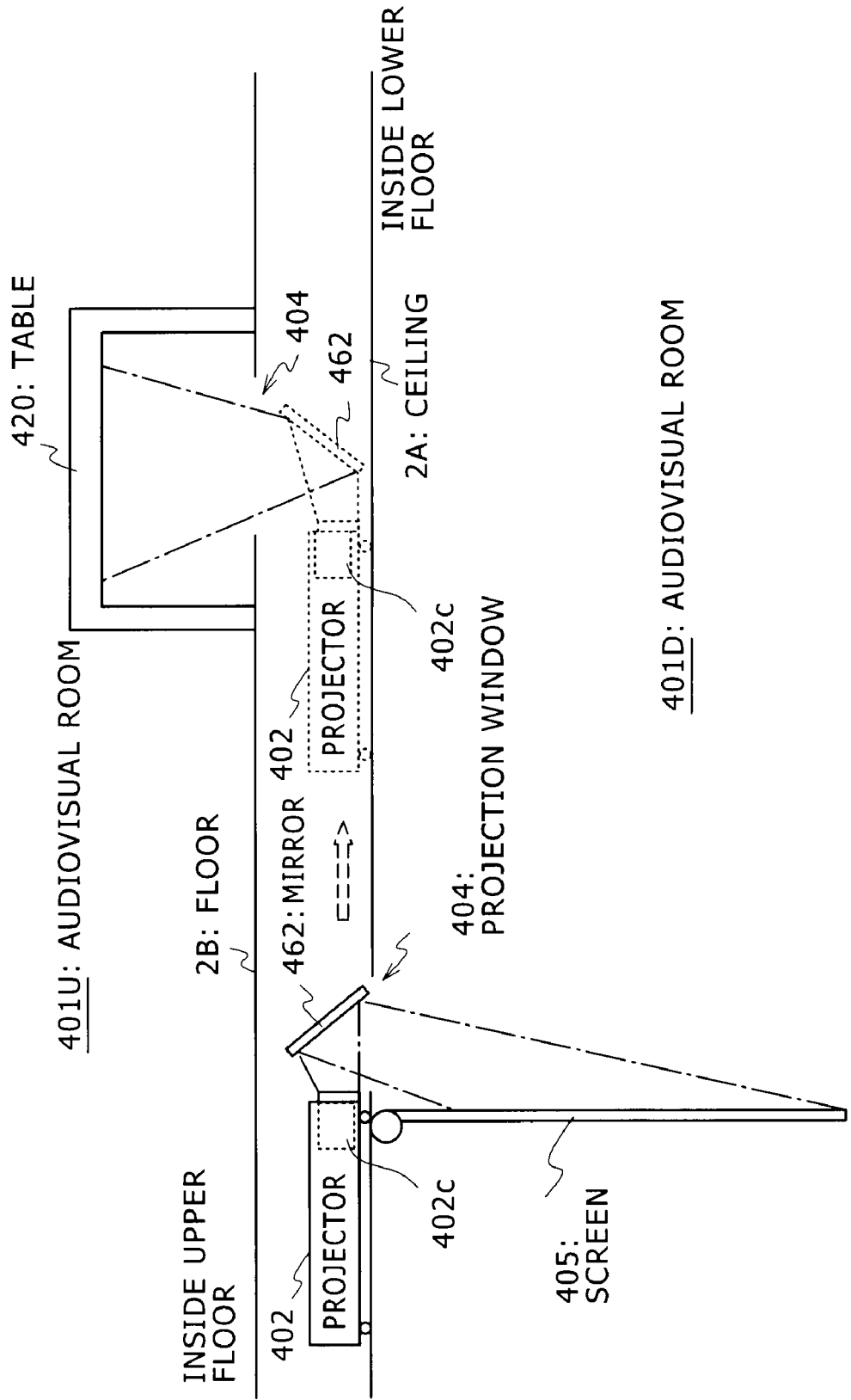
FIG. 56 partially shows a construction of an audiovisual room system that uses one projector to display video on a screen and a table in two up-and-down (vertically) adjacent audiovisual rooms (rooms)

In comparison with FIGS. 48 and 49 mentioned above, FIGS. 55 and 56 partially show constructions of the audiovisual room system. This audiovisual system uses one projector 402 to display a video in two contiguous audiovisual rooms (rooms) 401U and 401D in an up-down direction (vertical direction). Meanwhile, FIG. 55 shows an example of displaying a video on the screen 405 in the lower audiovisual room 401D and also displaying a video on the screen 405 in the upper audiovisual room 401U. On the other hand, FIG. 56 shows an example of displaying a video on the screen 405 in the lower audiovisual room 401D and displaying a video on the table surface of the table 420 in the upper audiovisual room 401U.

That is, the projector 402 is placed in the space between the ceiling 2A of the lower audiovisual room 401D and the floor 2B of the upper audiovisual room 410U. In addition, this projector 402 can selectively move to the position of the projection window 404 provided in the ceiling 2A of the lower audiovisual room 401D or the position of the projection window 404 provided in the floor 2B of the upper audiovisual room 401D. In this case, though not shown in the drawings, the space contains the guide member (see the rail in FIG. 43) for guiding the projector 402 to the positions of these projection windows 404.

The projector 402 moves to the position of the projection window 404 provided in the ceiling 2A of the lower audiovisual room 401D in accordance with an operation on the remote commander 471 in the audiovisual room 401D. Further, the projector 402 moves to the position of the projection window 404 provided in the floor 2B of the upper audiovisual room 401U in accordance with an operation on the remote commander 471 in the audiovisual room 401U.

When the projector 402 moves to the position of the projection window 404 provided in the ceiling 2A of the lower audiovisual room 401D, the direction of the mirror 462 is changed so as to display the video at a specified position in the audiovisual room 401D through this projection window 404. When the projector 402 moves to the position of the projection window 404 provided in the ceiling 2A of the lower audiovisual room 401D, the direction of the mirror 462 is changed so as to display the video at a specified position in the audiovisual room 401D through this projection window 404.

According to the constructions in FIGS. 55 and 56, the two audiovisual rooms 401U and 401D can share one projector 402. The constructions can be simplified.

Figure 57:
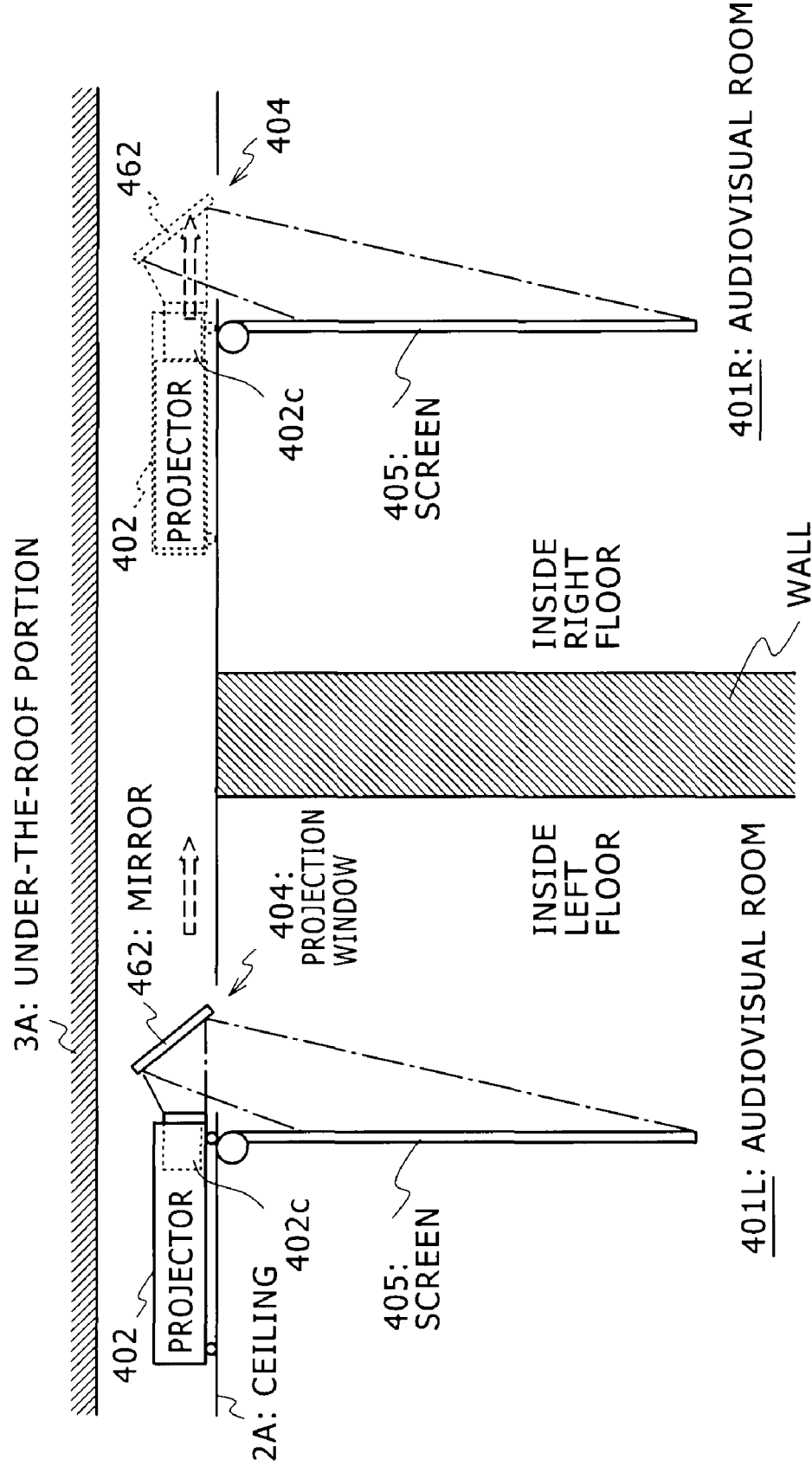
FIG. 57 partially shows a construction of an audiovisual room system that uses one projector to display video in two left-and-right (horizontally) adjacent audiovisual rooms (rooms)

In comparison with FIGS. 55 and 56, FIG. 57 partially shows a construction of the audiovisual room system. This audiovisual system uses one projector 402 to display the video in two contiguous audiovisual rooms (rooms) 401L and 401R in a left-right direction (vertical direction).

That is, the projector 402 is placed in the space between the ceiling 2A and the under-the-roof portion 3A of the audiovisual rooms 401L and 401R. In addition, this projector 402 can selectively move to the position of the projection window 404 provided in the ceiling 2A of the left audiovisual room 401L or the position of the projection window 404 provided in the ceiling 2A of the right audiovisual room 401R. In this case, though not shown in the drawing, the space contains the guide member (see the rail in FIG. 43) for guiding the projector 402 to the positions of these projection windows 404.

The projector 402 moves to the position of the projection window 404 provided in the ceiling 2A of the left audiovisual room 401L in accordance with an operation on the remote commander 471 in the audiovisual room 401L. Further, the projector 402 moves to the position of the projection window 404 provided in the ceiling 2A of the right audiovisual room 401R in accordance with an operation on the remote commander 471 in the audiovisual room 401R.

When the projector 402 moves to the position of the projection window 404 provided in the ceiling 2A of the left audiovisual room 401L, the direction of the mirror 462 is changed so as to display the video at a specified position in the audiovisual room 410L through this projection window 404. Further, when the projector 402 moves to the position of the projection window 404 provided in the ceiling 2A of the right audiovisual room 401R, the direction of the mirror 462 is changed so as to display the video at a specified position in the audiovisual room 410R through this projection window 401R.

According to the construction in FIG. 57, the two audiovisual rooms 401L and 401R can share one projector 402. The construction can be simplified. Meanwhile, it is obvious that much more horizontally constructed audiovisual rooms can similarly share one projector. While the projector 402 is placed in the space between the ceiling 2A and the under-theroof portion 3A in FIG. 57, the projector can be also constructed to be placed in the space between the floor and the under-the-floor portion.

Figure 50:
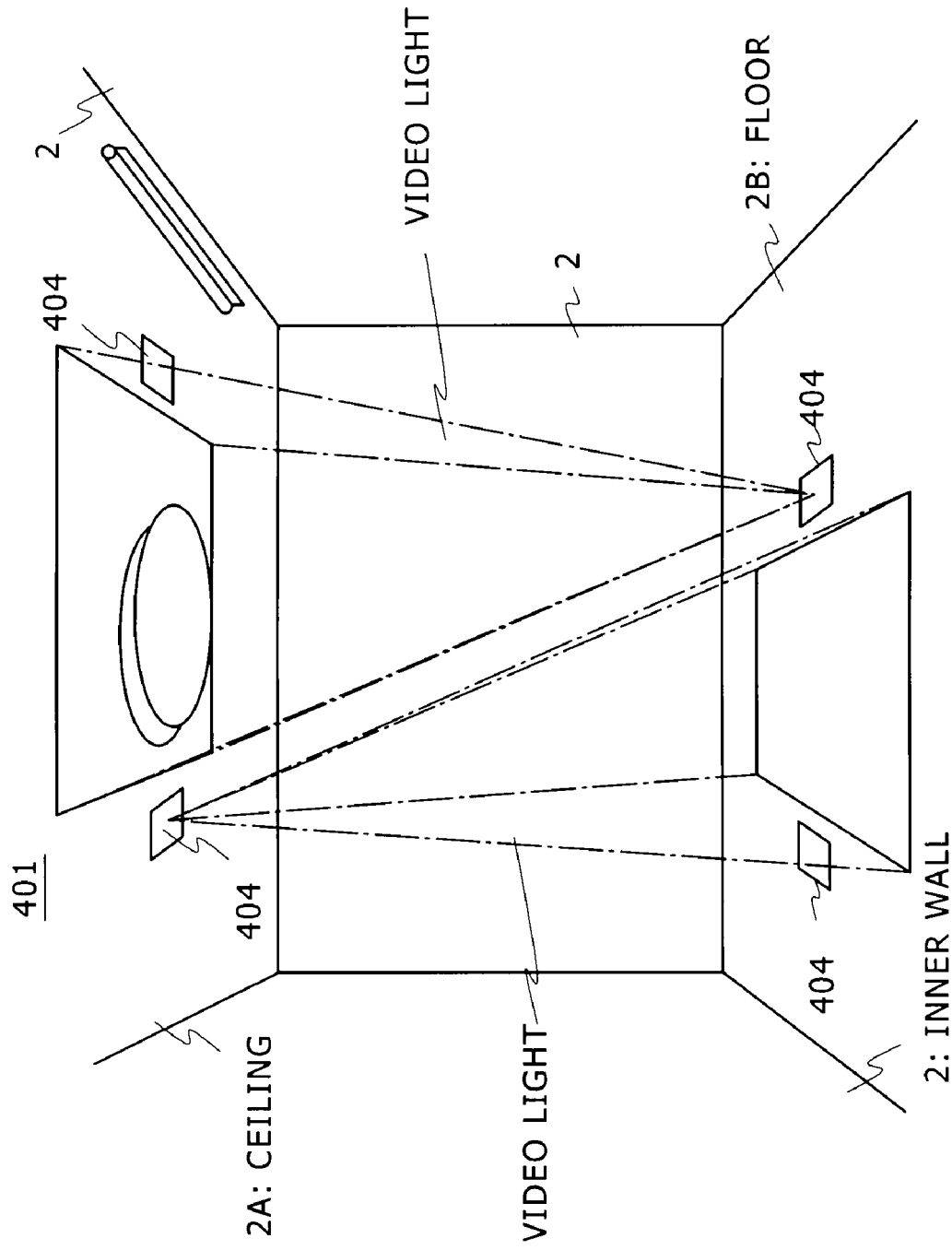
FIG. 50 is a perspective view showing a state (radiating video light to the ceiling and the floor) inside the audiovisual room (room) surrounded by the inner wall, the ceiling, and the floor.
Figure 58:
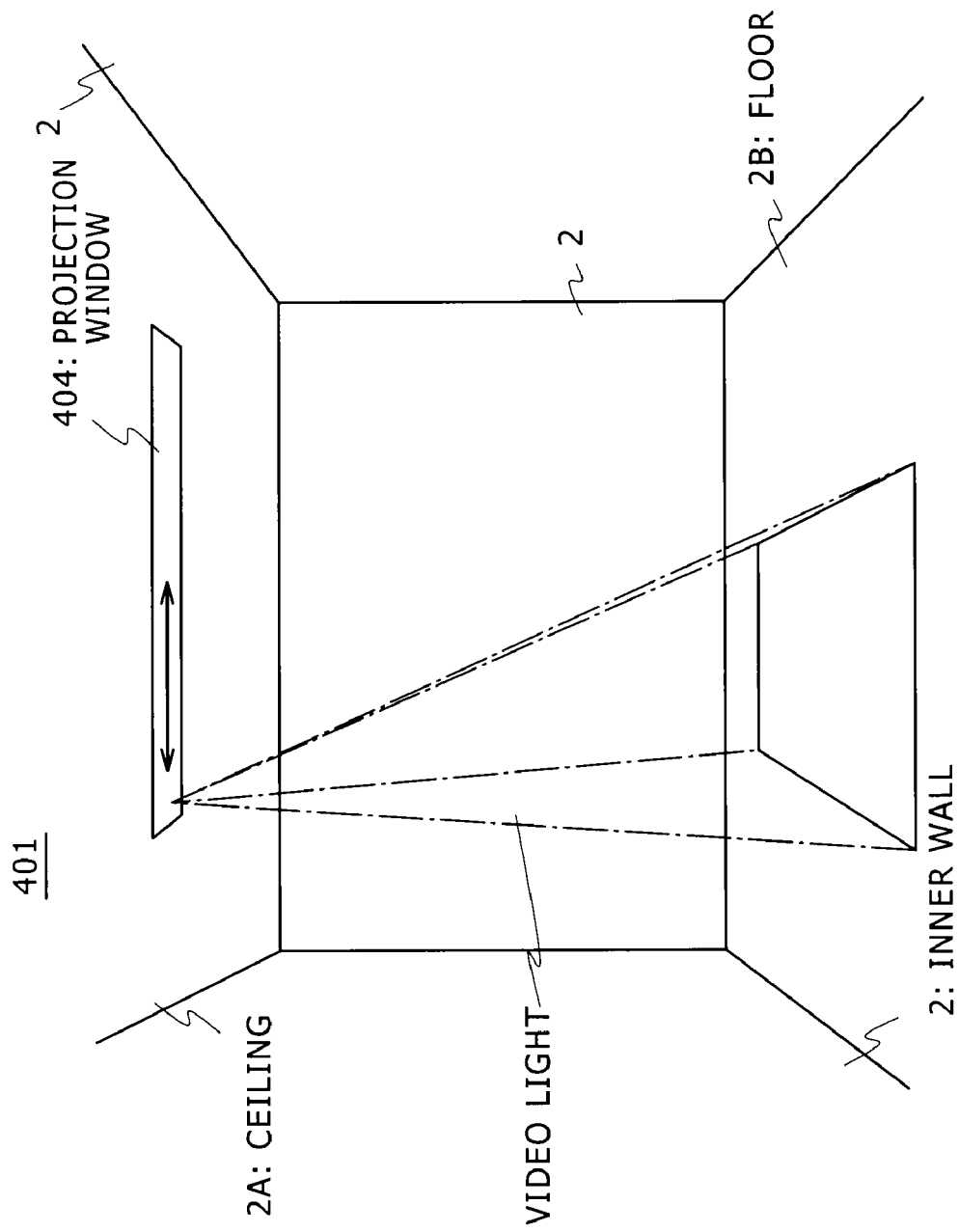
FIG. 58 is a perspective view showing a state (radiating video light to a floor through a zonal projection window of a ceiling) inside the audiovisual room (room) surrounded by the inner wall, the ceiling, and the floor.

In comparison with FIG. 50, FIG. 58 shows a state in the audiovisual room (room) 401. While the ceiling 2A is provided with two projection windows 404 in FIG. 50, the ceiling 2A is provided with one zonal projection window 404 in FIG. 58. This projection window 404 is fabricated so as to be covered with a transparent glass, for example. In this case, the projector 402 can be moved to portions of the zonal projection window 404 to variously change positions for projecting the video.

Figure 59:
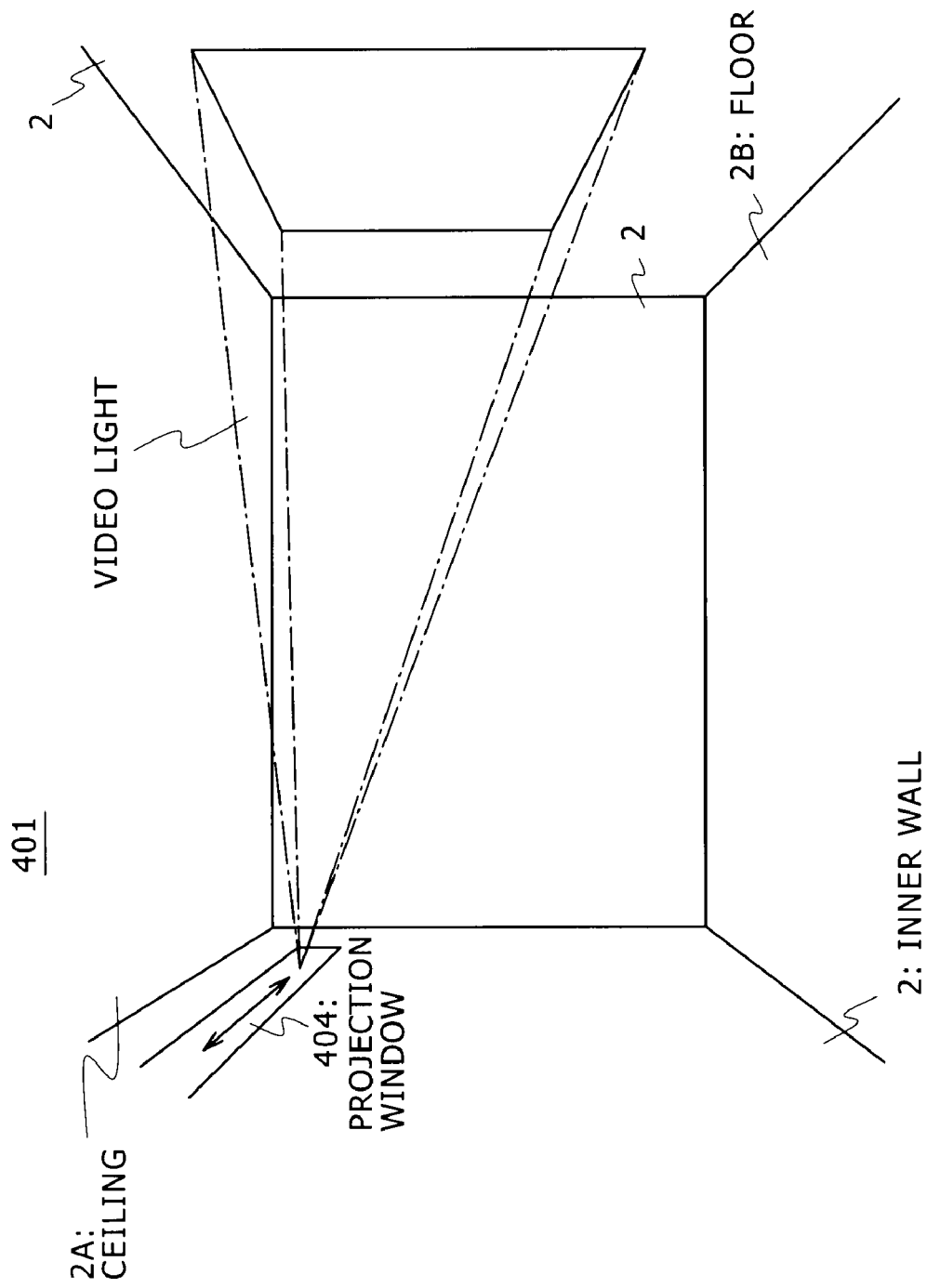
FIG. 59 is a perspective view showing a state (radiating video light to an opposite inner wall through a zonal projection window of an inner wall) inside the audiovisual room (room) surrounded by the inner wall, the ceiling, and the floor.

In comparison with FIG. 58, FIG. 59 shows a state in the audiovisual room (room) 401. While the ceiling 2A is provided with one zonal projection window 404 in FIG. 58, the inner wall 2 is provided with one zonal projection window 404 in FIG. 59. This projection window 404 is fabricated so as to be covered with a transparent glass, for example. In this case, the projector 402 placed in the space between the inner wall 2 and the outer wall 3 can be moved to portions of the zonal projection window 404 to variously change positions for projecting the video on the opposite inner wall 2.

Meanwhile, while the above-mentioned embodiment has shown the rail as the guide member for the projector 402, the present invention is not limited thereto. Various techniques can be widely applied.

Further, while the above-mentioned embodiment has shown the cases of projecting the video on the screen 405, the table 420, the floor 2B, the ceiling 2A, and the inner wall 2, the present invention is not limited thereto. It is possible to settle various projection places such as the other furniture than the table, for example.

Moreover, while the above-mentioned embodiment forms the ceiling, floor, and wall in a dual structure, the present invention is not limited thereto. In short, the projector may be placed at the rear of the ceiling, floor, or wall so as to be able to move along the surface of the ceiling, floor, or wall. The invention can be widely applied to variously structured audiovisual rooms.

(4) Construction Examples of the Remote Commander

The following describes a remote commander available as the remote commander 116 in the above-mentioned image display system 101 or the remote commander 471 for controlling the above-mentioned projector 402.

Figure 60:
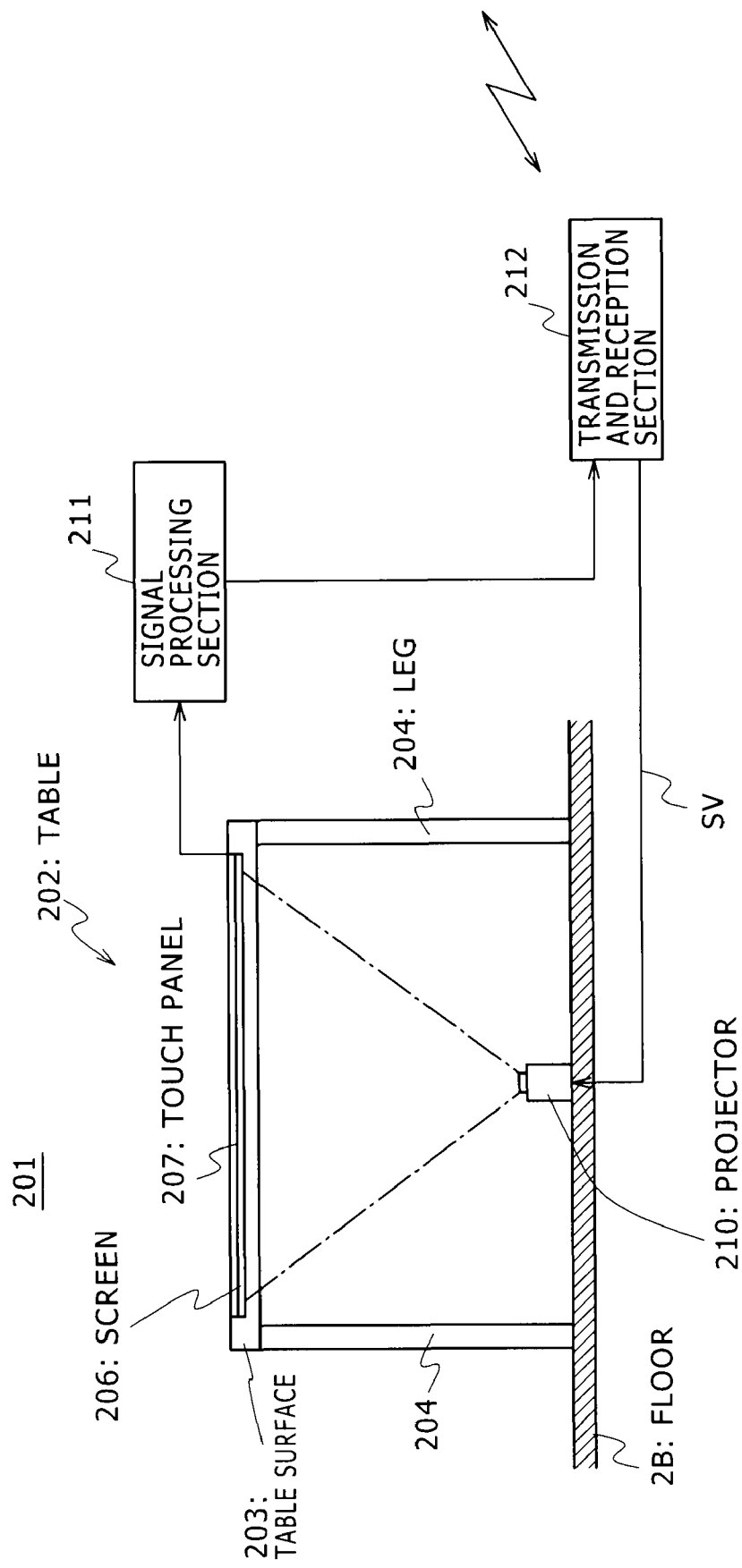
FIG. 60 shows a construction of a remote commander (placing the projector on the floor)
Figure 61:
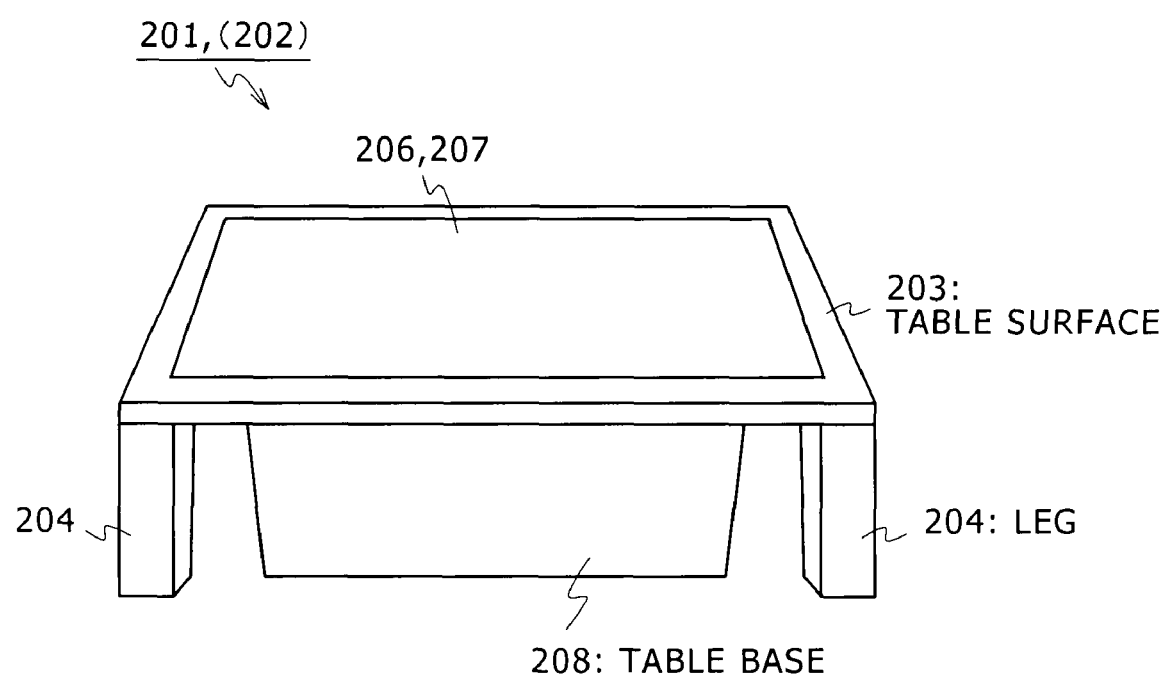
FIG. 61 is a perspective view showing a table included in the remote commander.

FIG. 60 is a schematic diagram showing the construction of a remote commander 201. This remote commander 201 uses a table 202 to accept user operations. Here, as shown in FIG. 61, the table 202 has an approximately square table surface 203 viewed from the top and is structured to support each of four corners of this table surface 203 using a leg 204. This table surface 203 is formed of a transparent plate material such as reinforced glass. A screen 206 as a rear-projection projector and a transparent touch panel 207 are layered in this order almost entirely over this table surface 203. The touch panel 207 constitutes a sensing section for detecting an instruction based on a user operation. Here, the table surface 203 may be entirely transparent or may be partially transparent at least corresponding to the screen 206.

Figure 62A:
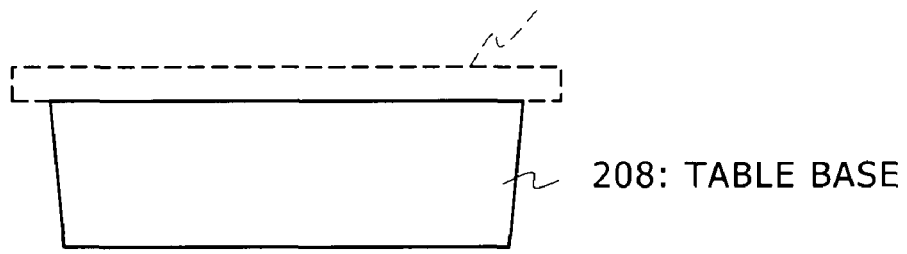
FIGS. 62A and 62B are a side view and a bottom view of a table base included in the table.
Figure 62B:
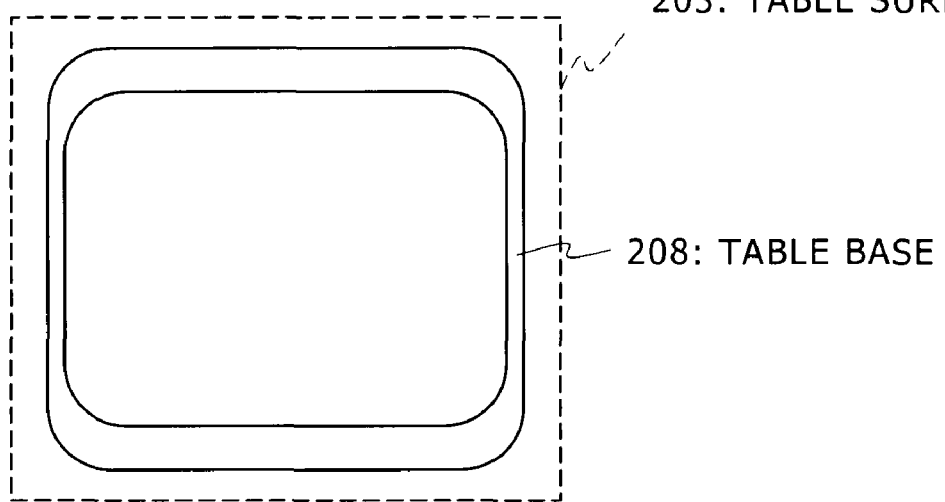

Further, as shown in FIG. 61, the table 202 includes a table base 208 under the table surface 203 and inside the legs 204. As indicated by a side view and a bottom view in FIGS. 62A and 62B, the table base 208 is formed in a rectangular cylinder so as to almost entirely cover the lower part of the table surface 203. As will be described later, a projector 210 is placed at a lower position of the table 202 and is covered by this table base 208. Meanwhile, here, this table base 208 may support the whole of the table surface 203 to omit the legs 204.

Figure 63:
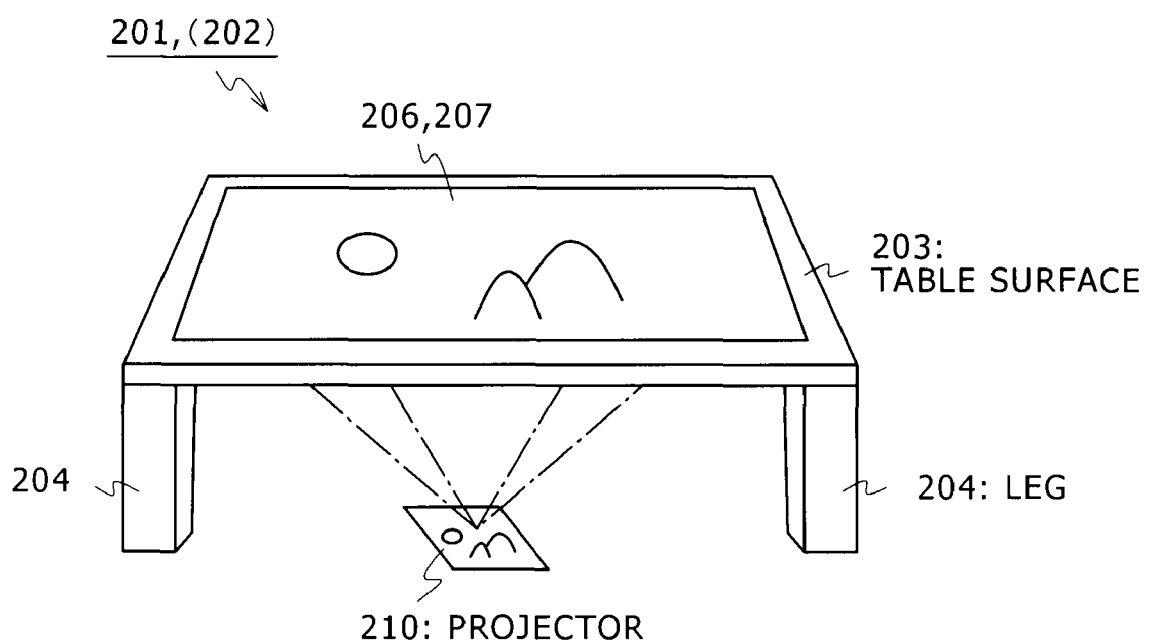
FIG. 63 shows a state of displaying video on a screen provided for the table surface by radiating video light from the projector.

Here, the projector 210 is a rear-projection projector and upwards emits video light based on a video signal SV that is wirelessly transmitted from a video apparatus (not shown) such as a DVD player, video tape recorder, television tuner, etc. and is received by a transmission and reception section 212. In this manner, as schematically shown in FIG. 63, the screen 206 provided for the table surface 203 displays a vide based on the video signal SV.

A signal processing section 211 detects an instruction corresponding to a user operation on the touch panel 207 and notifies this instruction to the transmission and reception section 212. The transmission and reception section 212 wirelessly transmits this instruction based on the user operation to the video apparatus. Further, the transmission and reception section 212 wirelessly communicates with the video apparatus, receives the video signal SV from the video apparatus, and supplies it to the projector 210.

Operations of the remote commander 201 as shown in FIG. 60 will be described. When the user touches the outside of an effective screen of the touch panel 207, for example, the signal processing section 211 detects a menu screen request instruction. This menu screen request instruction is transmitted to the video apparatus via the transmission and reception section 212.

The transmission and reception section 212 then receives a video signal for the menu screen transmitted from the video apparatus based on this menu screen request instruction. This video signal SV is supplied to the projector 210. The projector 210 emits the video light corresponding to this video signal SV and is radiated to the screen 206 provided for the table surface 203. In this manner, the screen 206 displays the menu screen.

When the user operates the touch panel 207 with the menu screen displayed on the screen 206 in this manner, the signal processing section 211 detects a specified menu selection instruction. This menu selection instruction is transmitted to the video apparatus via the transmission and reception section 212. In this manner, various operations of the video apparatus can be controlled. The operations of the video apparatus include an operation to transmit a specified video signal to the remote commander 201.

Further, the operations of the video apparatus include operations of the control section 113 of the image display system in FIG. 19 mentioned above. In this case, the screen 206 constitutes the bird's-eye image display section 117 and displays the operation screens in the bird's-eye mode and the immersive mode as shown in FIGS. 32A and 32B, for example. Meanwhile, in this case, the above-mentioned menu screen is not displayed. The screen provides a display in the bird's-eye mode first and then displays an operation screen either in the bird's-eye mode or the immersive mode depending on a subsequent user operation. Each time the screen content changes, a video signal related to such operation screen is wirelessly transmitted from the video apparatus (equivalent to the image processing section 113B in FIG. 19) and is received by the transmission and reception section 212.

In this manner, the remote commander 201 in FIG. 60 displays a video on the screen 206 provided for the table 202 as furniture. The touch panel 207 as a sensing section detects an instruction based on a user operation on the screen 206. Unlike a conventional remote commander, the remote commander 201 is free from being lost when needed and can improve the usability for users.

Figure 64:
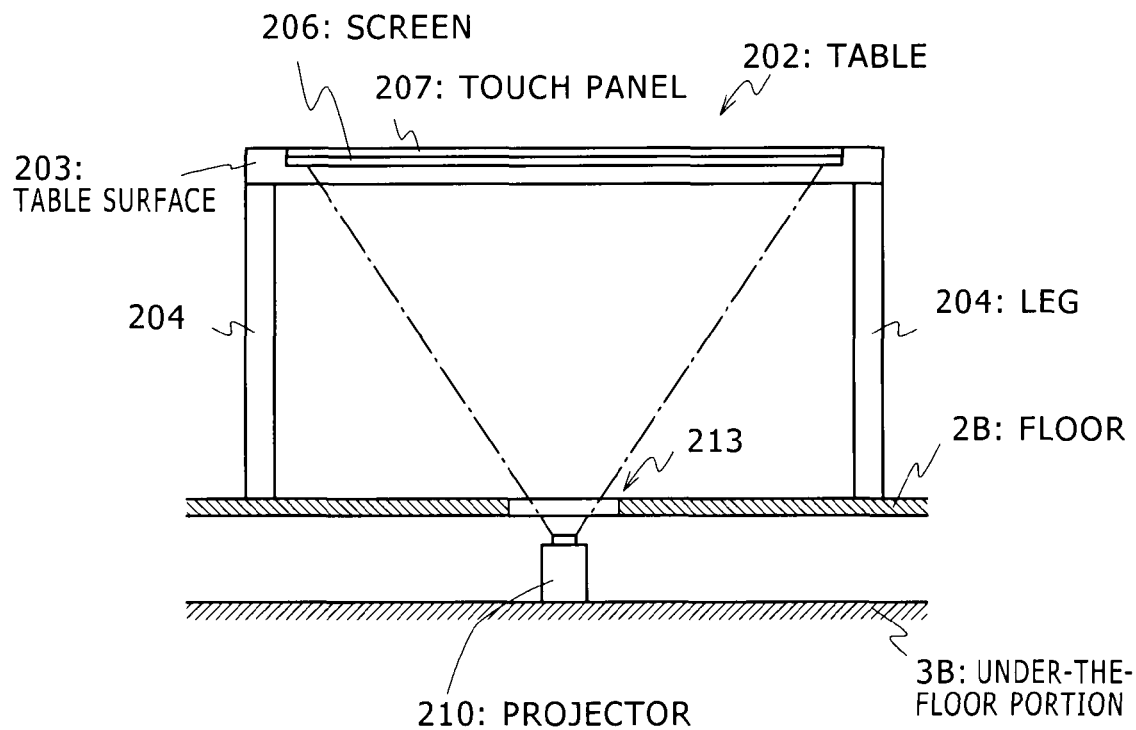
FIG. 64 shows another construction of the remote commander (placing the projector in the space between the floor and the under-the-floor portion)

In comparison with FIG. 60, FIG. 64 partially shows a remote commander 201A. The mutually corresponding parts in FIGS. 64 and 60 are designated by the same reference numerals. According to this remote commander 201A, the table 202 is fixed to a specified position of the floor 2B. A projection window 213 is provided for passing video light from the projector 210 at the position of the floor 2B for fixing the table 202.

This projection window 213 may be formed by forming an opening or providing the opening with a transparent plate material such as transparent glass. Further, a cover (not shown) may be provided correspondingly to this projection window 213 and may be opened only when used.

The projector 210 is placed in the space between the floor 2B and the under-the-floor portion 3B correspondingly to the above-mentioned projection window 213. The video light is emitted from the projector 210 and is radiated to the screen 206 provided for the table surface 203 of the table 202 through the projection window 213 provided in the floor 29. The video is displayed on this screen 206.

This remote commander 201A is constructed similarly to the remote commander 201 as shown in FIG. 60 except the construction concerning the above-mentioned position for placing the projector 210. This remote commander 201A can provide the same effect as that of the remote commander 201. In addition, since the projector 210 is placed in the space between the floor 2B and the under-the-floor portion 3B and is not placed in the room, the remote commander 201A can eliminate the table base 208 for covering the projector 210 as used for the remote commander 201 as shown in FIG. 60 above. Since the projector 210 is placed in the space between the floor 2B and the under-the-floor portion 3B, the remote commander 201A can ensure a light path from the projector 210 to the screen 206. It is possible to thin a lower construction of the table 202 and enable video display on a large screen.

Figure 65:
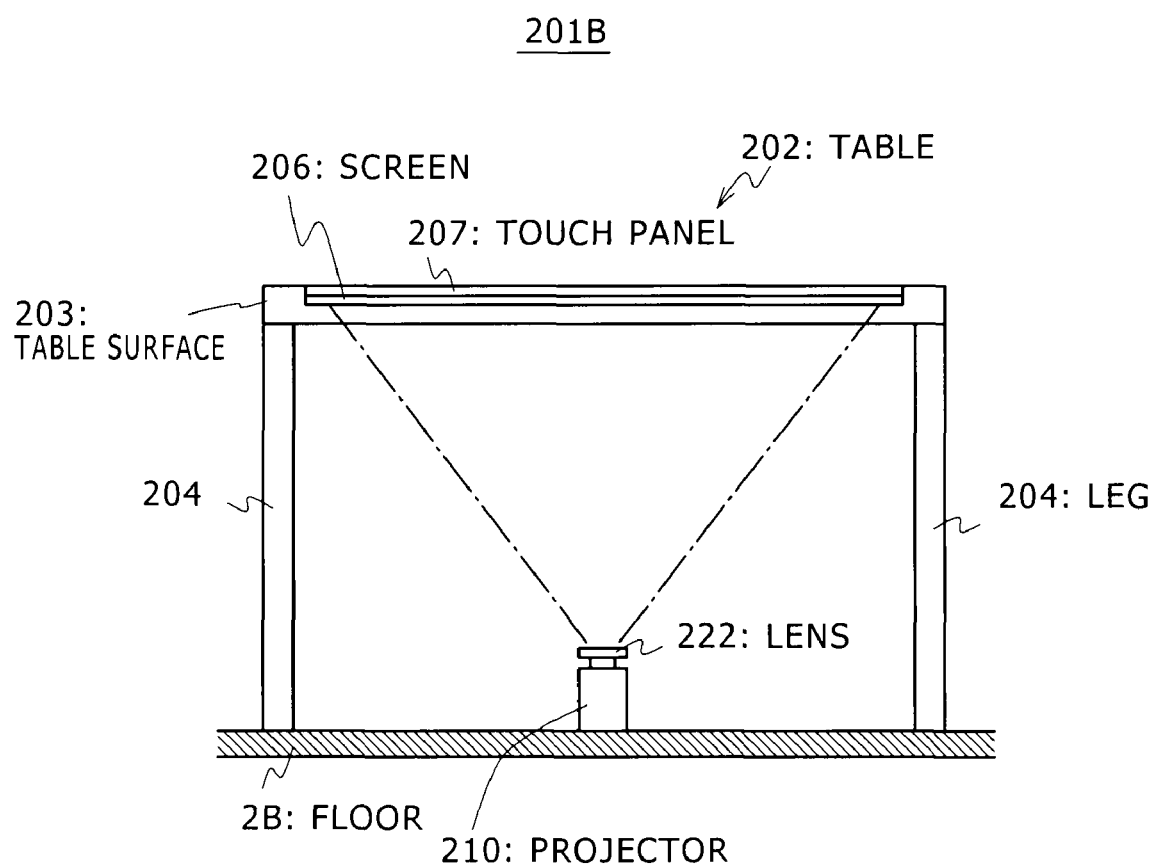
FIG. 65 shows still another construction of the remote commander (placing the projector on the floor and using a light path shortening lens)

In comparison with FIG. 60, FIG. 65 partly shows a remote commander 201B. The mutually corresponding parts in FIGS. 65 and 60 are designated by the same reference numerals. According to this remote commander 201B, the projector 210 is placed on the floor 2B. In addition, a light path shortening lens 222 is provided along a light path for the projector 210. In this case, the video light is emitted from the projector 210 and is radiated to the screen 206 through the lens 222.

This remote commander 201B is constructed similarly to the remote commander 201 as shown in FIG. 60 except the construction concerning the lens 222 as mentioned above. This remote commander 201B can provide the same effect as that of the remote commander 201. In addition, since the lens 222 shortens the light path from the projector 210 to the screen 206, the remote commander 201B can thin the lower construction of the table 202 and enable video display on a large screen.

Figure 66:
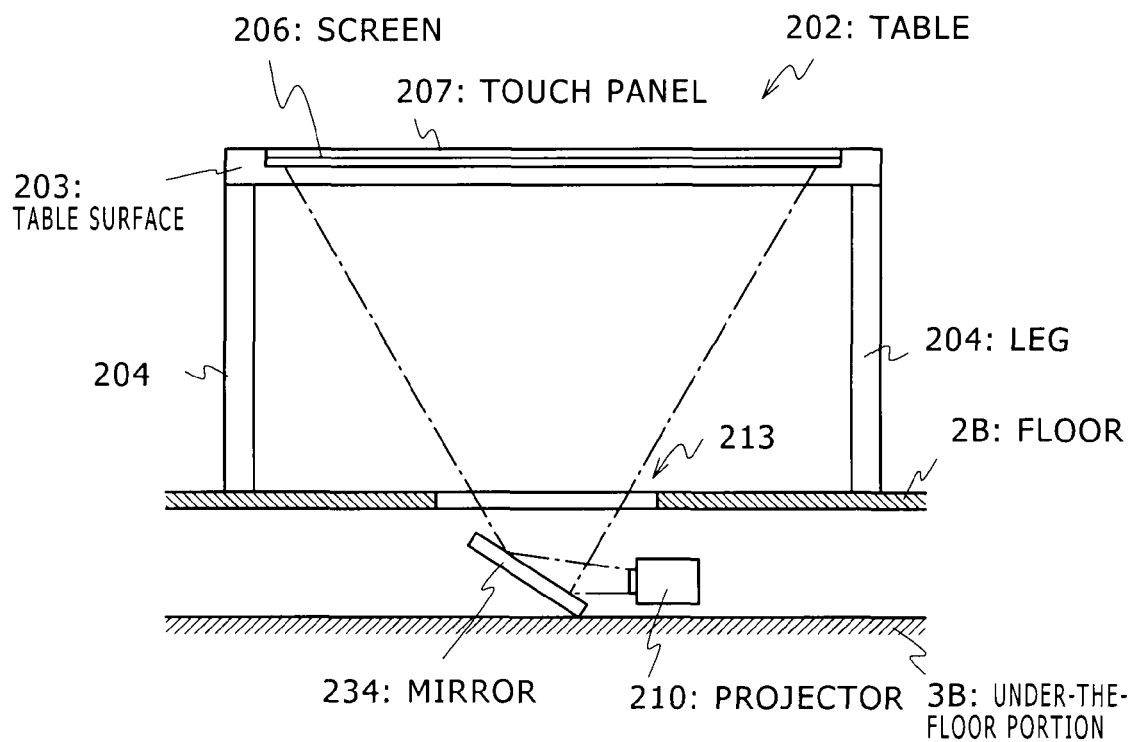
FIG. 66 shows yet another construction of the remote commander (placing the projector in the space between the floor and the under-the-floor portion and using a mirror to bend a light path)

In comparison with FIG. 64, FIG. 66 partly shows a remote commander 201C. The mutually corresponding parts in FIGS. 66 and 64 are designated by the same reference numerals. According to this remote commander 201C, the projector 210 is placed in the space between the floor 2B and the under-the-floor portion 3B and is provided with a mirror 234 for bending a light path for the video light emitted from the projector 210.

In this case, the projector 210 is placed so that the video light is emitted in a direction along the floor surface. The video light emitted from the projector 210 is reflected on the mirror 234 in an orthogonal direction and is radiated to the screen 206 through the projection window 213 provided in the floor 2B.

This remote commander 201C is constructed similarly to the remote commander 201A as shown in FIG. 64 except the construction concerning the mirror 234 as mentioned above. This remote commander 201C can provide the same effect as that of the remote commander 201A. In addition, the remote commander 201C uses the mirror 234 to bend the light path. Even when the lower construction of the table 202 is thinned, the remote commander 201C can sufficiently ensure the light path for the video light radiated to the screen 206 and enable video display on a large screen.

Figure 67:
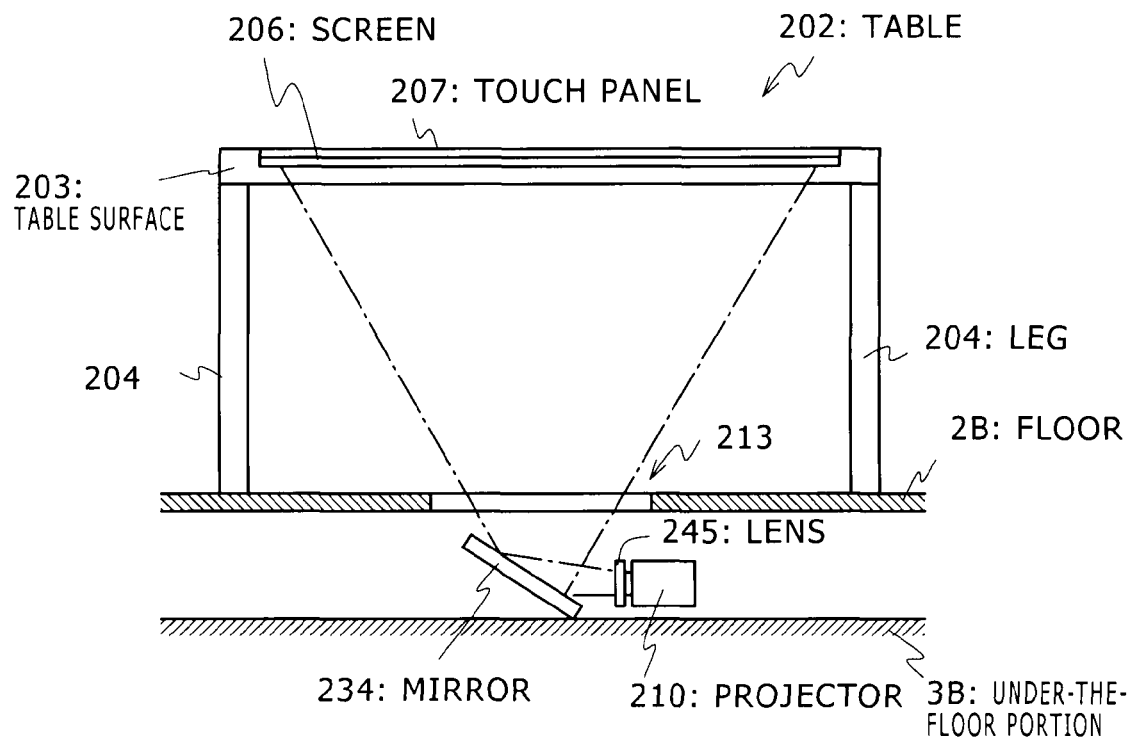
FIG. 67 shows still yet another construction of the remote commander (placing the projector in the space between the floor and the under-the-floor portion, using a mirror to bend a light path, and using the light path shortening lens)

In comparison with FIG. 66, FIG. 67 partly shows a remote commander 201D. The mutually corresponding parts in FIGS. 67 and 66 are designated by the same reference numerals. According to this remote commander 201D, a light path shortening lens 245 is provided along the light path for the projector 210. In this case, the video light emitted from the projector 210 is radiated to the screen 206 through the lens 245 and the mirror 234.

This remote commander 201D is constructed similarly to the remote commander 201C as shown in FIG. 66 except the construction concerning the lens 245 as mentioned above. This remote commander 201D can provide the same effect as that of the remote commander 201C. In addition, since the lens 245 shortens the light path from the projector 210 to the screen 206, the remote commander 201D can thin the lower construction of the table 202 and enable video display on a large screen.

In comparison with FIGS. 60 and 61, FIGS. 68 and 69 show a state in the audiovisual room (room) 401 to which a remote commander 201E is provided. The mutually corresponding parts in FIGS. 68, 69, 60, and 61 are designated by the same reference numerals. Here, the audiovisual room 401 is surrounded by the inner wall 2, the ceiling 2A, and the floor 2B. The table 202 included in a remote commander 201E is placed on the floor 2B.

A liquid crystal film 206A and the transparent touch panel 207 are layered in this order almost entirely over the table surface 203 of the table 202. The table surface 203 is made of a transparent plate material. That is, this remote commander 201E uses the liquid crystal film 206A instead of the screen 206 for the rear-projection projector in the remote commander 201 as shown in FIGS. 60 and 61.

This liquid crystal film 206A is a sheet material formed by sandwiching liquid crystal between two transparent films having a transparent electrode. This liquid crystal film 206A greatly varies the transparency in a thickness direction depending on a voltage applied to the transparent electrode. Here, for example, operating a switch provided to the side of the table 202 can change a voltage applied to this liquid crystal film 206A for selectively changing the liquid crystal film 206A to transparent and to translucent enough to be usable as a screen for the projector 210.

Figure 68:
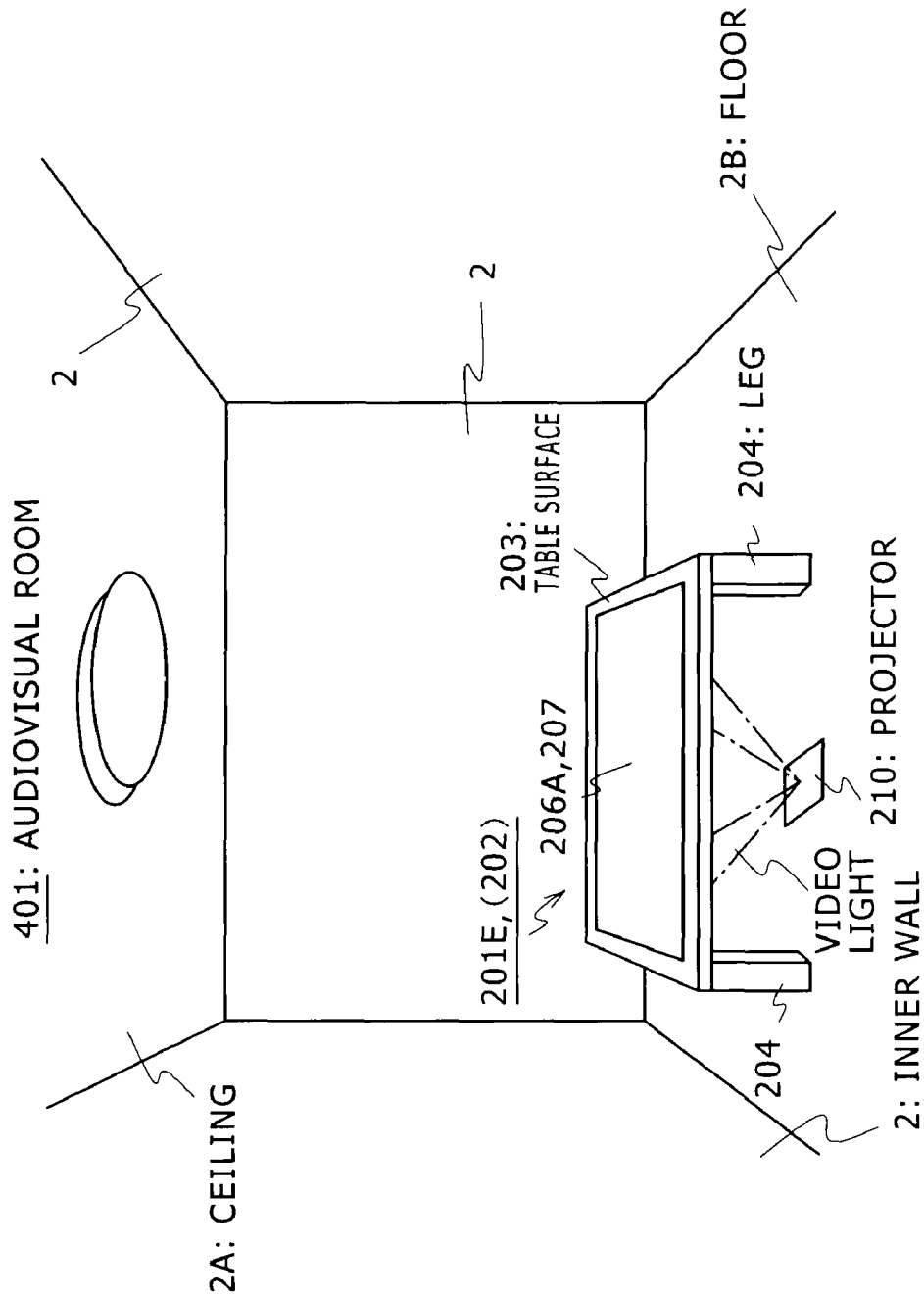
FIG. 68 is a perspective view showing a state (using a screen including a translucent liquid crystal film) inside an audiovisual room including a remote commander using a table.
Figure 69:
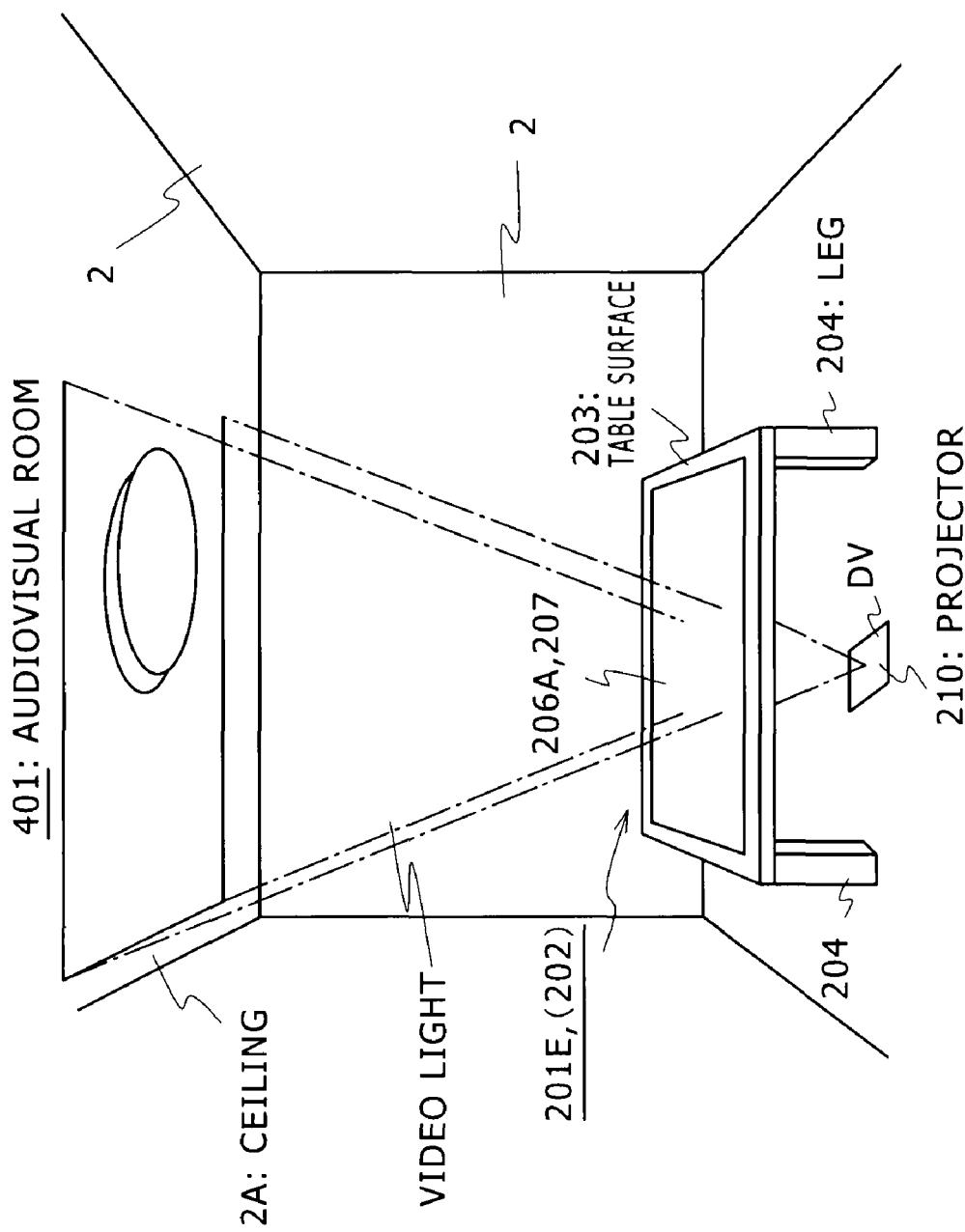
FIG. 69 is a perspective view showing a state (using a screen including a transparent liquid crystal film) inside the audiovisual room including the remote commander using the table.

In this case, as shown in FIG. 68, the projector 210 radiates the video light to the liquid crystal film 206A changed to translucent. In this manner, the video can be displayed on the table surface 203 (liquid crystal film 206A) of the table 202. Further, as shown in FIG. 69, the projector radiates the video light to the ceiling 2A through the liquid crystal film 206A changed to transparent. The video can be displayed on the ceiling 2A. Meanwhile, the projector 210 is constructed to be able to adjust the focus depending on such switching between the objects to which the video light is radiated.

This remote commander 201E is constructed similarly to the remote commander 201 except the construction concerning the liquid crystal film 206A as mentioned above. This remote commander 201E can provide the same effect as that of the remote commander 201. In addition, the remote commander 201E can display the video on the ceiling 2A by making the liquid crystal film 206A transparent and can further improve the usability for users.

Figure 70:
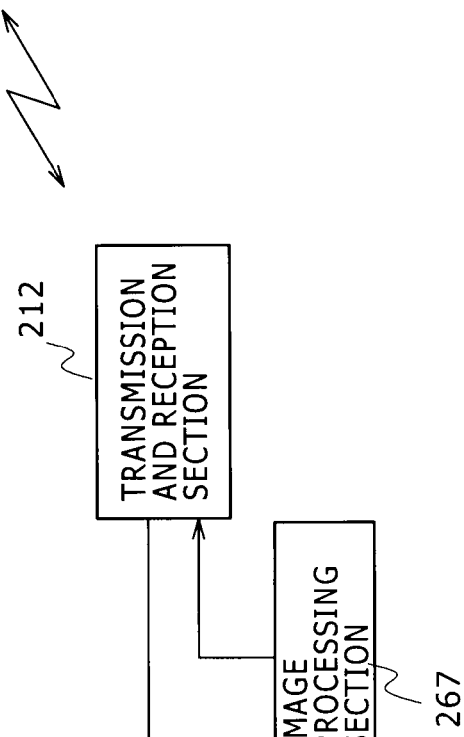
FIG. 70 shows yet still another construction of the remote commander (using a sensing section including an imaging apparatus etc. and placing the projector on the floor)

In comparison with FIG. 60, FIG. 70 shows a remote commander 201F. The mutually corresponding parts in FIGS. 70 and 60 are designated by the same reference numerals. This remote commander 201F is provided with an imaging apparatus (camera) 266 and an image processing section 267 instead of the touch panel 207 and the signal processing section 211 in the remote commander 201. The imaging apparatus 266 and the image processing section 267 are included in the sensing section that detects an instruction based on a user operation.

Here, the imaging apparatus 266 is placed adjacently to the projector 210. The imaging apparatus 266 images a user operation by fingers etc. on the screen 206 along with the video displayed on the screen 206 and outputs video data as an imaging result to the image processing section 267. The image processing section 267 processes this video data, detects an instruction corresponding to the user operation by fingers etc. on the screen 206, and notifies this instruction to the transmission and reception section 212. The transmission and reception section 212 wirelessly transmits this instruction corresponding to the user operation to the video apparatus.

This remote commander 201F is constructed similarly to the remote commander 201 as shown in FIG. 60 except the construction concerning the above-mentioned sensing section. This remote commander 201F can provide the same effect as that of the remote commander 201. In addition, this remote commander 201F provides an additional effect of eliminating the need for placing the touch panel 207 for user operations on the table surface 203.

Figure 71:
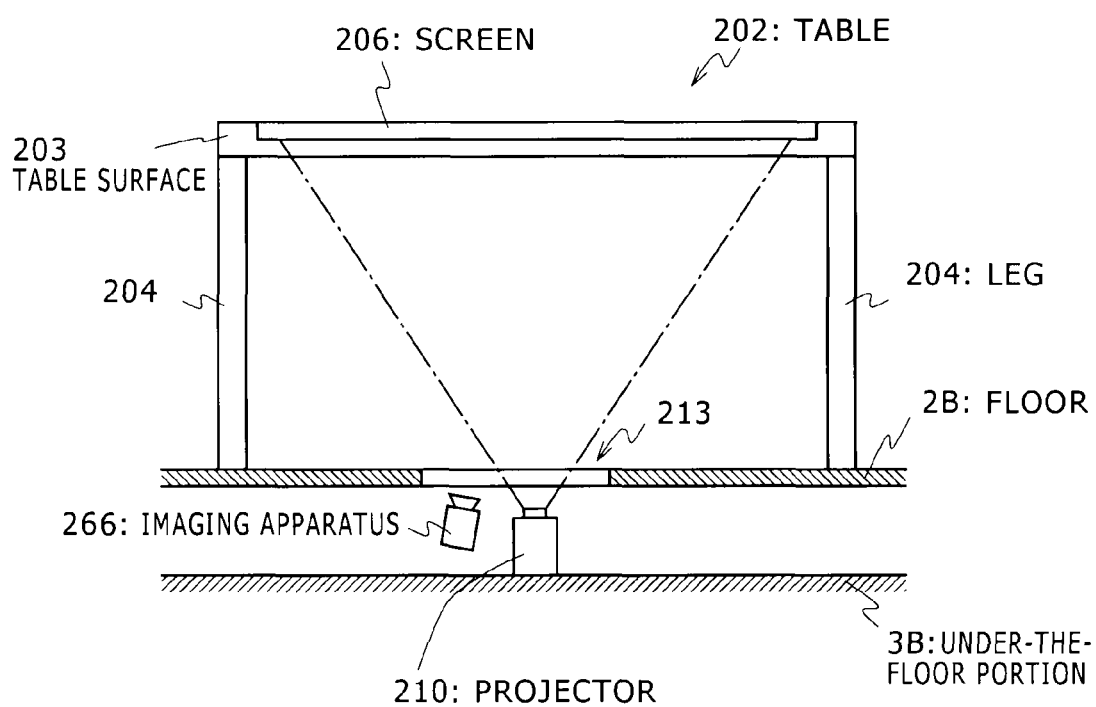
FIG. 71 shows still yet another construction of the remote commander (using the sensing section including the imaging apparatus etc. and placing the projector in the space between the floor and the under-the-floor portion)

In comparison with FIG. 70, FIG. 71 partly shows a remote commander 201G. The mutually corresponding parts in FIGS. 71 and 70 are designated by the same reference numerals. According to this remote commander 201G, the table 202 is fixed to a specified position of the floor 2B. Similarly to the remote commander 201A in FIG. 64, a projection window 213 is provided for passing video light from the projector 210 at the position of the floor 2B for fixing the table 202.

The projector 210 and the imaging apparatus 266 are placed in the space between the floor 2B and the under-the-floor portion 3B correspondingly to the above-mentioned projection window 213. The video light is emitted from the projector 210 and is radiated to the screen 206 provided for the table surface 203 of the table 202 through the projection window 213 provided in the floor 2B. The video is displayed on this screen 206. Further, the imaging apparatus 266 images the user operation by fingers etc. on the screen 206 along with the video displayed on the screen 206 through the projection window 213 provided in the floor 2B.

This remote commander 201G is constructed similarly to the remote commander 201F as shown in FIG. 70 except the construction concerning positions for placing the projector 210 and the imaging apparatus 266 as mentioned above. This remote commander 201G can provide the same effect as that of the remote commander 201F. In addition, the remote commander 201G does not disorder a room atmosphere because the projector 210 and the imaging apparatus 266 are placed in the space between the floor 2B and the under-the-floor portion 3B and are not placed in the room.

Figure 72:
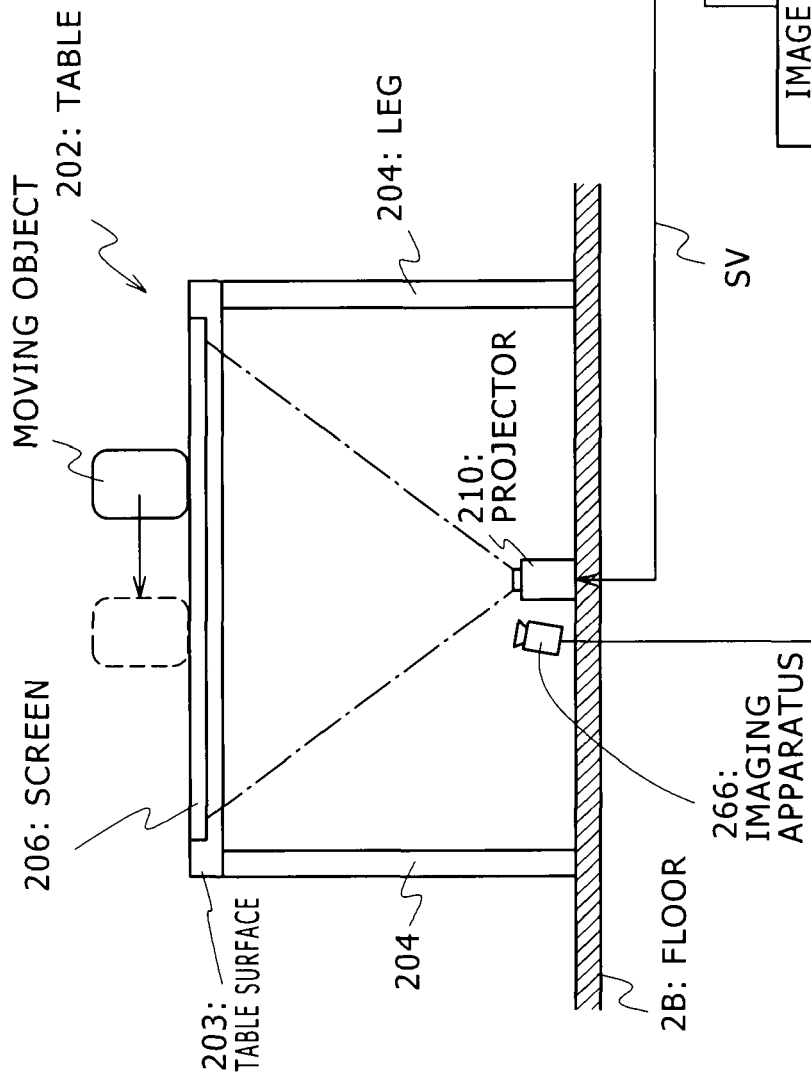
FIG. 72 shows yet still another construction of the remote commander (using the sensing section including the imaging apparatus etc. and detecting a drag of a moving object)

In comparison with FIG. 70, FIG. 72 partially shows a remote commander 201H. The mutually corresponding parts in FIGS. 71 and 70 are designated by the same reference numerals. According to this remote commander 201H, an image processing section 267A processes video data from an imaging apparatus 266, detects an instruction caused by dragging a moving object on the screen 206 in distinction from an instruction simply caused by touching the screen 206, and notifies that instruction to the transmission and reception section 212.

This remote commander 201H is constructed similarly to the remote commander 201F as shown in FIG. 70 except the construction concerning the image processing section 267A. This remote commander 201H can provide the same effect as that of the remote commander 201F. In addition, the remote commander 201H detects an instruction simply caused by touching the screen 206 in distinction from an instruction caused by dragging a moving object and can increase types of instructions corresponding to user operations.

While the above-mentioned embodiment provides the screen 206 for the table surface 203 made of the transparent plate material, the screen 206 itself may form the table surface 203. While the above-mentioned embodiment has described the remote commander using the table, the respective constructions may be combined accordingly.

While the above-mentioned embodiment has described the case of using the rear-projection projector 210 for video projection, the present invention is not limited thereto and may use a front-projection projector for video projection. Meanwhile, in this case, the projector is placed on the ceiling etc. instead of under the floor etc.

While the above-mentioned embodiment has shown the table as the furniture, an equivalent remote commander can be embodied on the other furniture such as a bookshelf, desk, and a chest of drawers, for example. While the above-mentioned embodiment has described the remote commander for the video apparatus, the present invention is not limited thereto and may be widely applied to remote commanders for various devices.

(5) Display on the Bird's-Eye Image Display Section

According to the above-mentioned image display system 101 in FIG. 19, for example, the bird's-eye image display section 117 included in the remote commander 116 simultaneously displays a bird's-eye image and a photographed image photographed at a photographing spot (photographing location) specified on this bird's-eye image (see FIG. 32A). The following describes in detail the image process for this display.

Figure 73:
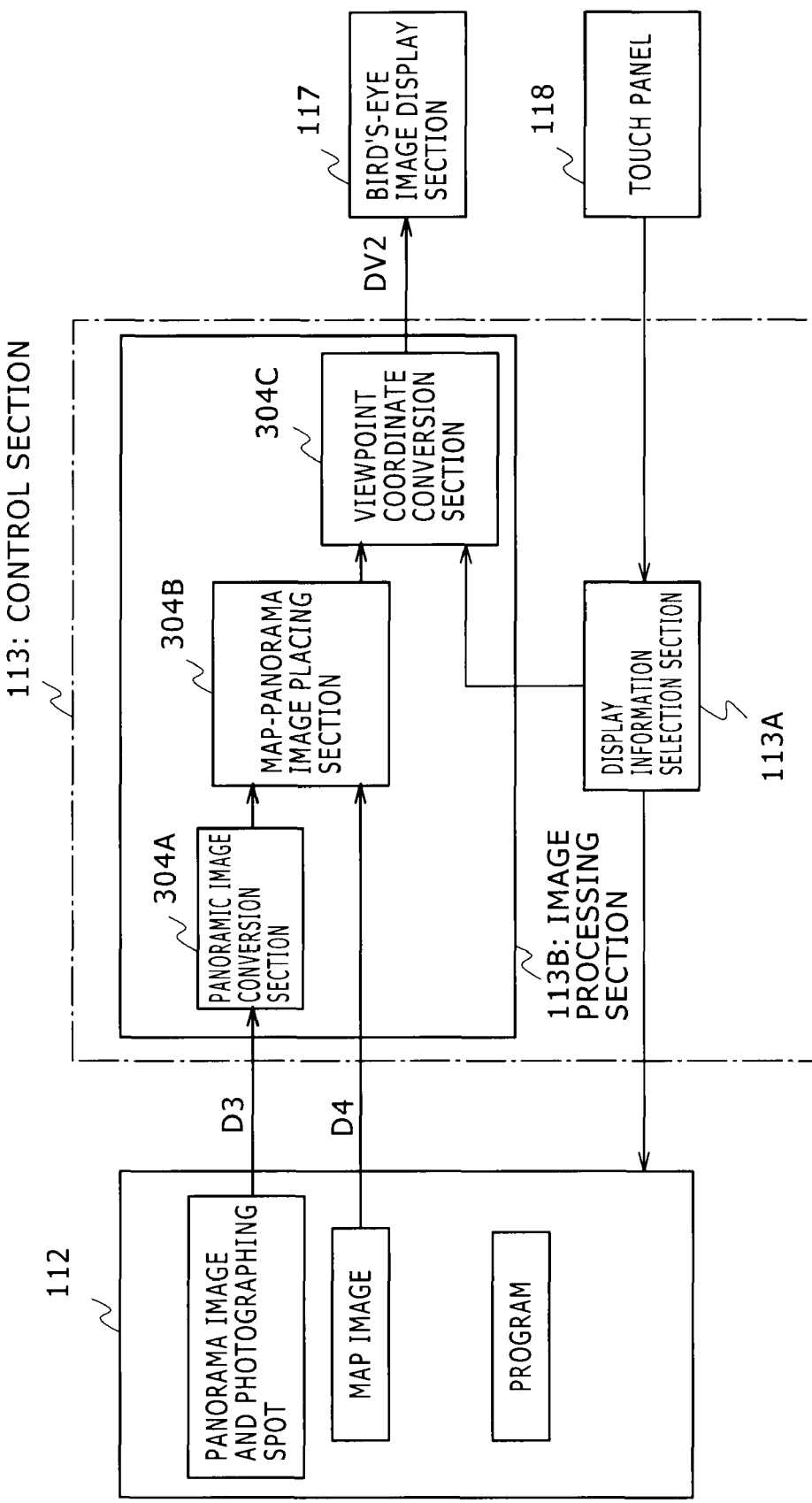
FIG. 73 is a block diagram showing a construction of an image processing apparatus for displaying a bird's-eye image containing a photographed image.

FIG. 73 shows the construction of an image processing apparatus 301 for displaying a bird's-eye image provided with a photographed image as mentioned above. The mutually corresponding parts in FIGS. 73 and 19 are designated by the same reference numerals and a detailed description is omitted accordingly. This image processing apparatus 301 includes the media database 112, the control section 113, the bird's-eye image display section 117, and the touch panel 118. This image display apparatus 301 includes a computer having a sufficient image processing capability.

As mentioned above, the media database 112 is formed by a recording and reproducing section such as a large-capacity hard disk apparatus, for example. This media database 112 records and maintains various programs needed for operations of the image display apparatus 301, multiple types of image data for bird's-eye images, and image data for photographed images photographed at photographing spots specified on the respective bird's-eye images, etc. This media database 112 reproduces and outputs these pieces of maintained image data.

Here, the bird's-eye image is an image of the photographing spot corresponding to the photographed image viewed from the above and is available as a photographed image, an illustrated image, a computer graphics image, a map image, etc. This embodiment uses a map image as the bird's-eye image. In other words, the media database 112 records and maintains the image data D4 for a map image as the image data for a bird's-eye image.

Figure 74:
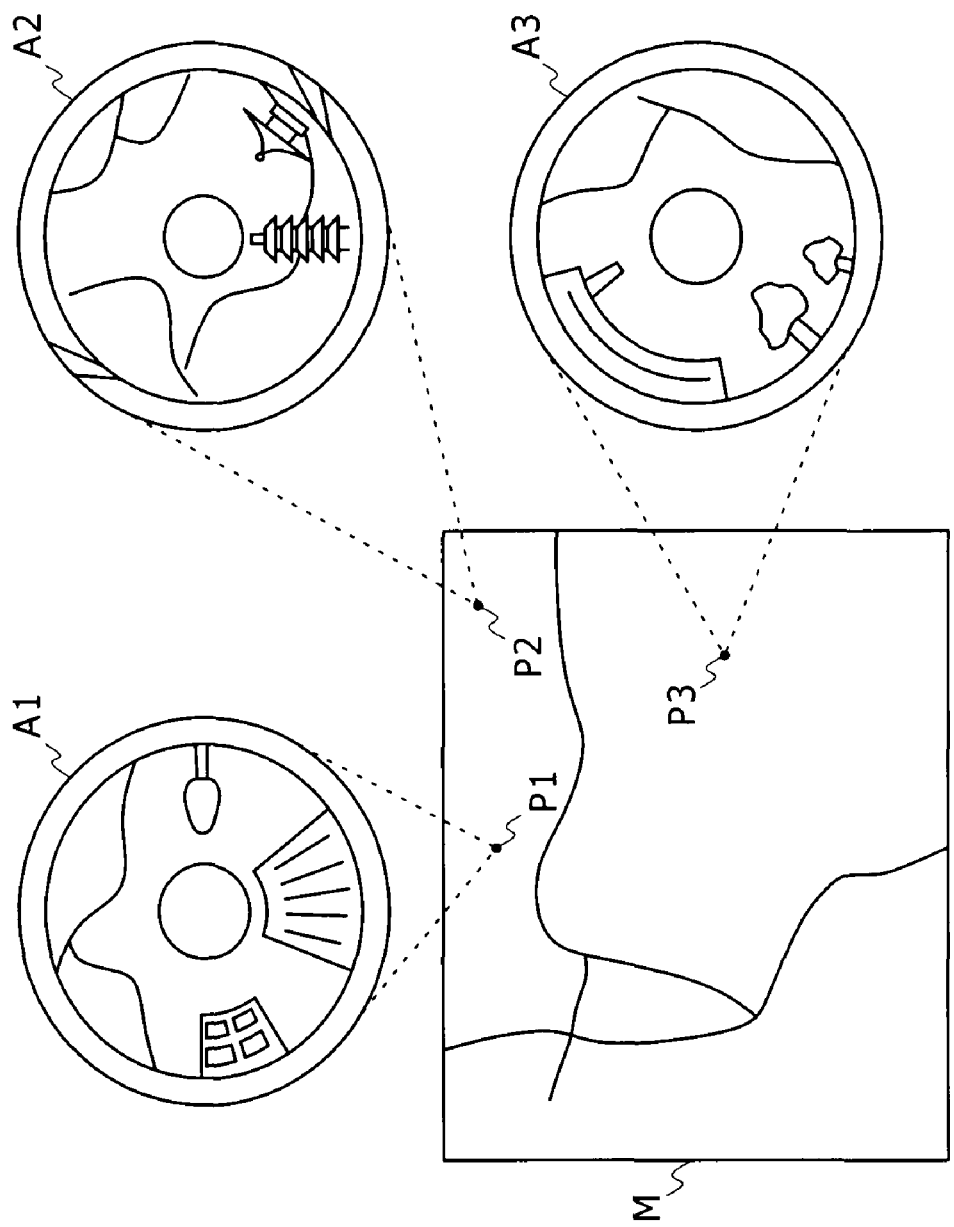
FIG. 74 illustrates a panorama image as a photographed image.

As indicated by a map M in FIG. 74, the photographed images are equivalent to various images photographed at photographing spots P1 through P3 specified in the map image. This embodiment uses a panorama image as the photographed image. In other words, the media database 112 records and maintains the image data D3 for the panorama image as image data for the photographed image. This panorama image is acquired by photographing a circumference using a fish-eye lens and is formed into a circle. The panorama image at each photographing spot is assigned with information about the photographing spot as link information for specifying the photographing spot on the map image.

Meanwhile, instead of assigning the link information to the panorama image in this manner, it may be preferable to assign link information for specifying a panorama image corresponding to a photographing spot in the map image. Further, this panorama image may be available as an imaging result using a hyperboloidal mirror or an imaging result using multiple images photographed by panning the imaging apparatus (camera) on a constant-angle basis. Panorama images according to various techniques are available. Moreover, each panorama image is photographed so that a specified direction matches a constant orientation. The panorama image to be provided is appended with altitude information indicating an altitude of the photographing spot.

Meanwhile, the media database 112 to be provided is previously installed with the image data D3 for these panorama images, the image data D4 for the map image, and a program needed for processes of this image processing apparatus 301. Instead of this previous installation, the media database 112 may be provided in such a manner that it is recorded on various recording media such as an optical disk, magnetic disk, and memory card or it is downloaded via a network such as the Internet.

The bird's-eye image display section 117 is formed of a liquid crystal display panel, for example, displays an image according to the video data DV2 output from the image processing section 113B, and consequently displays an image by layering the panorama image on the map image.

The touch panel 118 is included in a user operation section. Using this touch panel 118, the user can perform operations such as changing a viewpoint position and changing a scene. Operation information from this touch panel 118 is notified to the display information selection section 113A. Meanwhile, the user operation section can use operation devices such as a mouse, acceleration sensor, and joy stick instead of this touch panel 118.

The control section 113 is an arithmetic means for performing a program recorded in the media database 112. Performing this program provides various types of function blocks. That is, this control section 113 includes the image processing section 113B and the display image selection section 113A. In addition, this image processing section 113B includes a panoramic image conversion section 304A, a map-panorama image placing section 304B, and a viewpoint coordinate conversion section 304C.

As shown in FIGS. 75A and 75B, the panoramic image conversion section 304A maps elements of a circular panorama image based on imaging results A1 through A3 to a horizontally long and thin rectangular area. In this manner, the panoramic image conversion section 304A converts these circular panorama images A1 through A3 into horizontally wide field-angle rectangular panorama images B1 through B3. Meanwhile, a similar image conversion process using the mapping process can be performed on panorama images photographed by using a hyperboloidal mirror to generate horizontally wide field-angle, rectangular panorama images B1 through B3 in this manner. Further, when the panorama images are made of multiple images photographed by panning the imaging apparatus on a constant-angle basis, these images can be concatenated to generate such panorama images B1 through B3.

The map-panorama image placing section 304B arranges the panorama images on the map image based on the map image data D4. In this case, the panorama images are arranged so as to be directed to the viewpoint. The viewpoint coordinate conversion section 304C performs a viewpoint coordinate conversion process for converting the image containing the panorama images arranged in this manner into an image viewed from the viewpoint direction. The viewpoint coordinate conversion section 304C outputs the video data DV2 based on the process result to the bird's-eye image display section 117.

The display information selection section 113A follows the operation information notification from the touch panel 118 and selects a map image and a panorama image to be processed by the image processing section 113B, i.e., to be displayed on the bird's-eye image display section 117. In this case, image data for the selected map image and panorama image is read from the media database 112 and is supplied to the image processing section 113B. Further, the display information selection section 113A follows the operation information notification from the touch panel 118 and supplies information about the viewpoint to the viewpoint coordinate conversion section 304C of the image processing section 113B.

With reference to flowcharts in FIGS. 76 through 79, the following then describes a procedure of the control section 113 related to display of a map image containing arranged panorama images.

At Step ST1, the control section 113 starts a display process when the power is supplied or the user touches the touch panel 118. The control section 113 proceeds to Step ST2. Here, the control section 113 reads the following from the media database 112: the image data D4 for a map image to be displayed in an initial state; the image data D3 for a panorama image photographed at a photographing spot specified on that map image; and information indicating the photographing spot. The map image to be displayed in an initial state may be predetermined or may be displayed last in the most recent display.

At Step ST3, the control section 113 then uses a process related to the function block for the panoramic image conversion section 304A to convert the circular panorama images A1 through A3 acquired at Step ST2 into the horizontally long rectangular panorama images B1 through B3 (see FIG. 75). The process at Steps ST2 and ST3 is equivalent to an initialization process.

Figure 77:
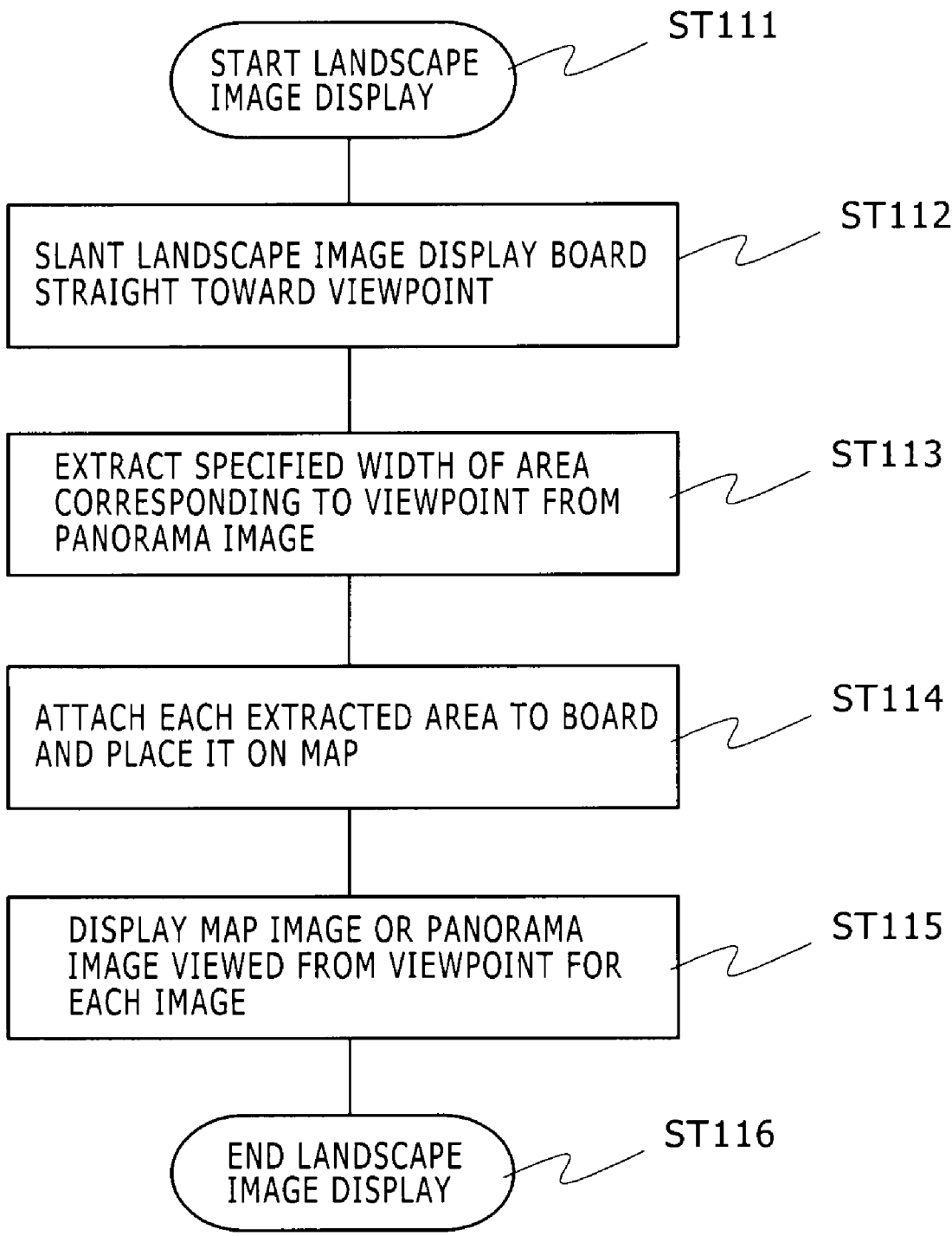
FIG. 77 is a flowchart showing a procedure of a landscape image display process in the display process.
Figure 80:
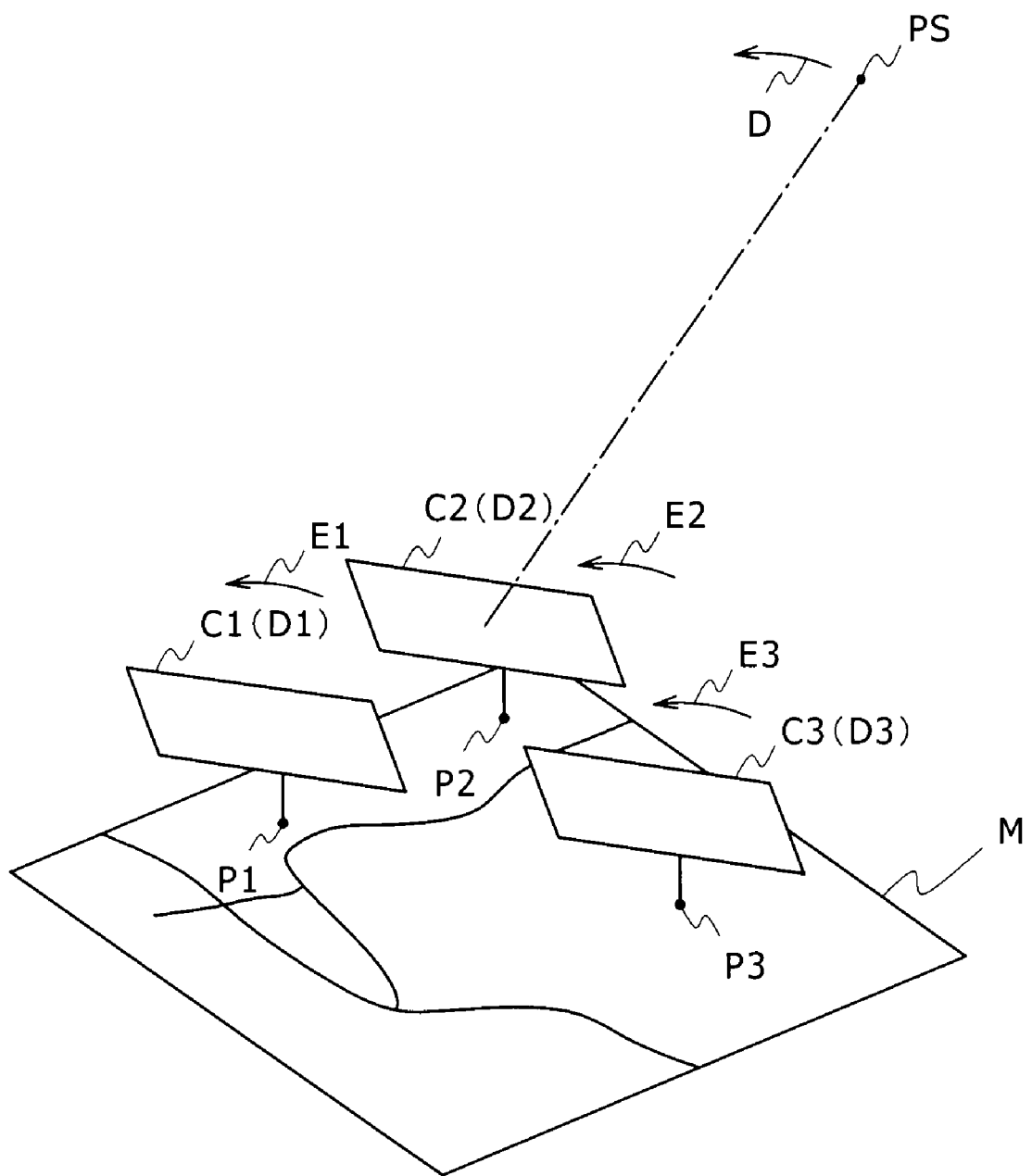
FIG. 80 illustrates tilt adjustment based on arrangement of landscape image display boards and a viewpoint when a panorama image is arranged on a map image.

The control section 113 then proceeds to Step ST4 and performs a process for displaying a landscape image. FIG. 77 shows the procedure of a landscape image display process. That is, at Step ST111, the control section 113 starts the landscape image display process and proceeds to Step ST112. Here, as shown in FIG. 80, the control section 113 uses a process related to the function block for the map-panorama image placing section 304B to arrange landscape image display boards C1 through C3 based on the photographing spot information and slant the boards C1 through C3 straight toward a viewpoint PS. The landscape image display boards C1 through C3 are specifically sized planes provided at the photographing spots P1 through P3 on the map image M.

Meanwhile, here, being straight toward signifies the relation of positioning each board surface orthogonal to a line connecting the center of each of boards C1 through C3 with the viewpoint PS. Further, here, the boards C1 through C3 may be positioned straight toward the viewpoint PS only in directions along the map image M. According to need, it may be preferable to change a slant (elevation angle) at which the boards C1 through C3 are moved upward to the viewpoint PS. The boards C1 through C3 may be positioned perpendicularly to the map image M.

Figure 81:
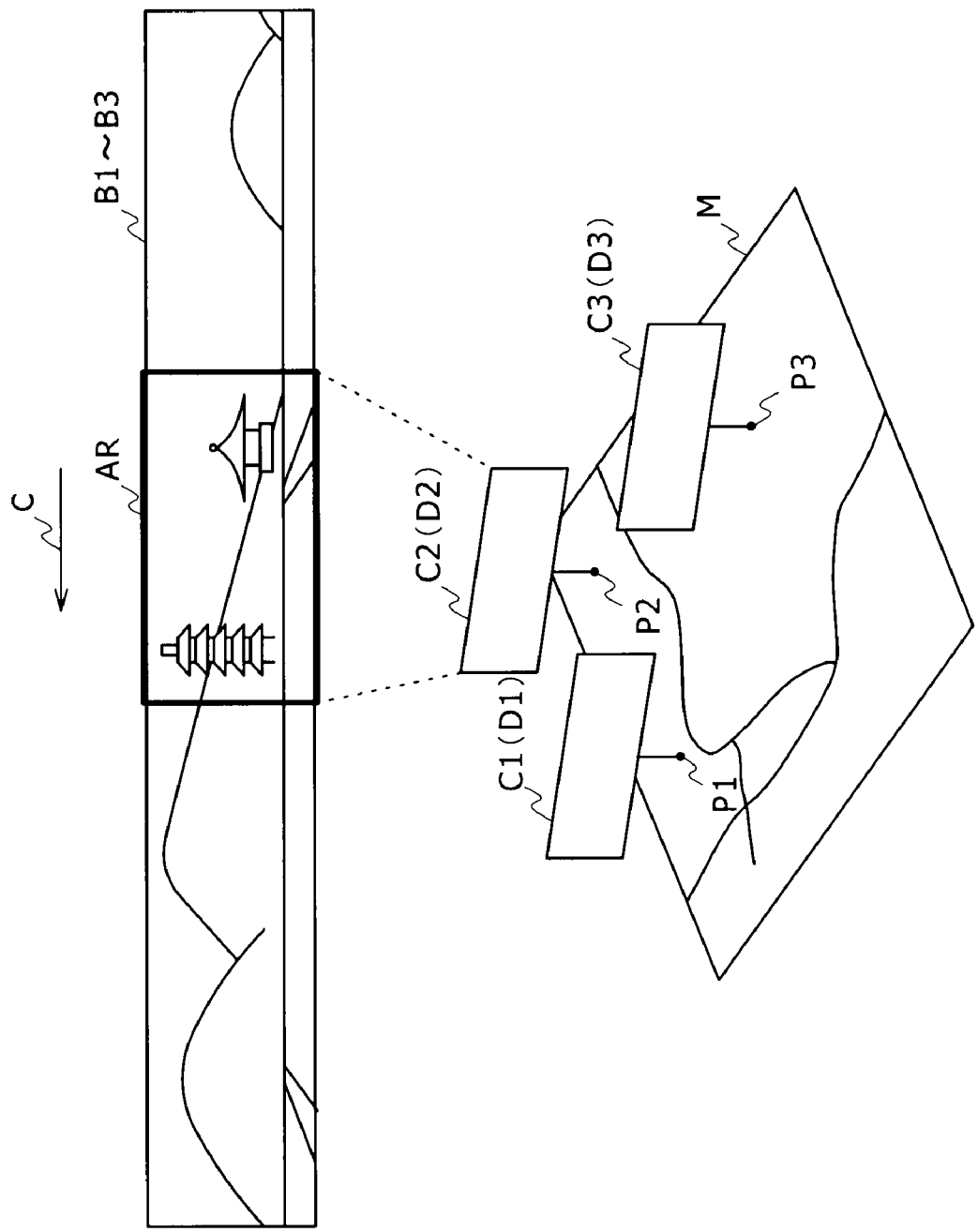
FIG. 81 illustrates extraction of a partial area corresponding to a viewpoint for a panorama image.

At Step ST113, the control section 113 then uses a process for a process related to the function block for the map-panorama image placing section 304B to extract the panorama images B1 through B3 based on an area AR having a specified width corresponding to the size of each of the boards C1 through C3 as shown in FIG. 81. In this manner, the control section 113 extracts the area AR having the specified width from the panorama images B1 through B3 and limits horizontal lengths of the panorama images D1 through D3 displayed on the boards C1 through C3 to be described later. Even when the boards C1 through C3, i.e., the panorama images D1 through D3, are positioned to be straight toward the moving viewpoint PS, the control section 113 prevents the panorama images D1 through D3 from interfering (colliding) with each other and improves the viewability.

Meanwhile, here, the extraction area AR for extraction from the panorama images B1 through B3 is configured to correspond to the viewpoint PS. That is, the control section 113 sets this extraction area AR to an area viewable from the viewpoint direction. When the viewpoint is positioned to the north of the map image M, for example, the control section 113 extracts south parts of the panorama images B1 through B3. Conversely, when the viewpoint is positioned to the south of the map image M, the control section 113 extracts north parts of the panorama images B1 through B3. In accordance with the viewpoint movement, the control section 113 sequentially moves the extraction area AR as indicated by an arrow C.

At Step ST114, the control section 113 then attaches the images D1 through D3 to the boards C1 through C3, respectively. As mentioned above, the images D1 through D3 are extracted from the panorama images B1 through B3 in accordance with the extraction area AR. In this manner, the photographing spots P1 through P3 on the map image M are provided with the panorama images D1 through D3 photographed at the photographing spots P1 through P3.

Figure 82A:
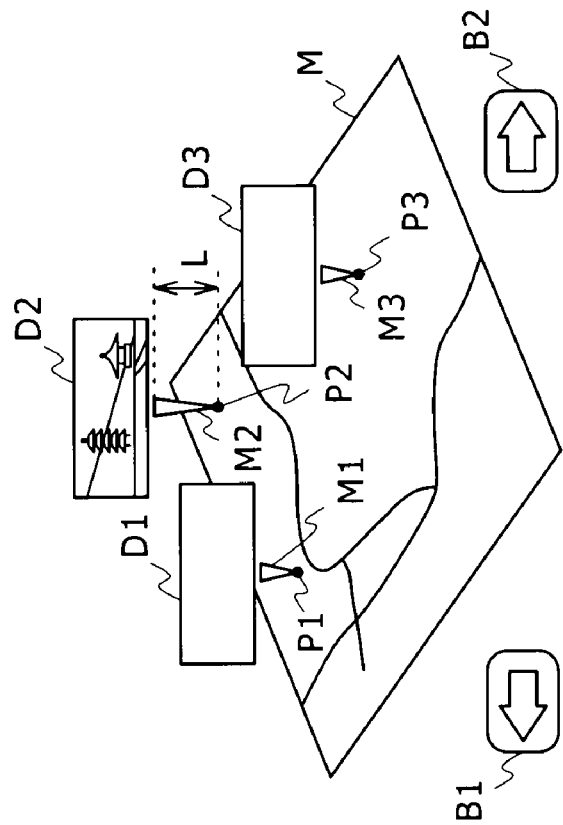
FIGS. 82A and 82B show a display example of an image containing panorama images arranged on a map image.
Figure 82B:
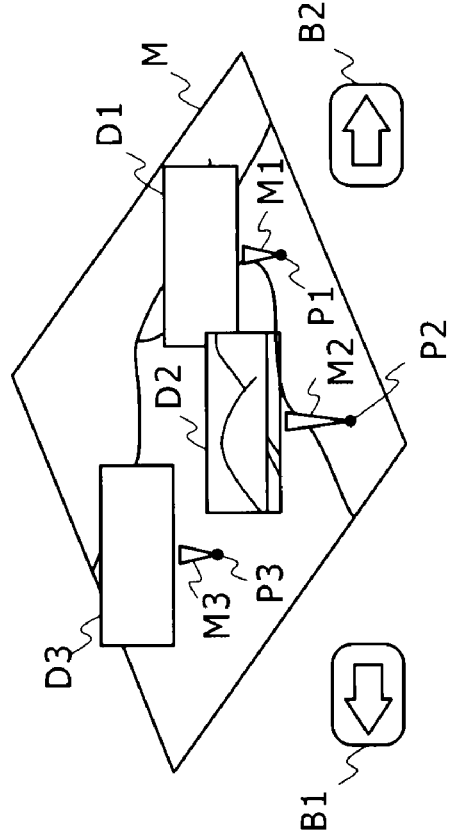

At Step ST115, the control section 113 then uses a process related to the function block for the viewpoint coordinate conversion section 304C to perform the viewpoint coordinate conversion process so that the map image M containing the panorama images D1 through D3 can be viewed from the viewpoint PS. When this process acquires the video data DV2 for the display image, the control section 113 supplies that data to the bird's-eye image display section 117. While this embodiment uses a parallel conversion process to perform the viewpoint coordinate conversion process, various techniques can be used depending on needs. In this manner, as shown in FIGS. 82A and 82B, the bird's-eye image display section 117 displays images containing the panorama images D1 through D3 on the map image M viewed from the viewpoint PS. Meanwhile, here, the viewpoint PS is reversed between display examples in FIGS. 82A and 82B.

Meanwhile, in this case, the control section 113 places triangular marks M1 through M3 with their vertexes downward on the map image M so that the tips indicate the photographing spots. The control section 113 displays the panorama images D1 through D3 above the marks M1 through M3, making it possible to recognize in detail the photographing spots corresponding to the panorama images D1 through D3.

Further, the control section 113 settles a length L of each of the marks M1 through M3 in proportion to the photographing spot altitude based on the altitude information assigned to each panorama image data, making it possible to roughly recognize the photographing spot altitude. Meanwhile, various shapes can be widely used for such marks. For example, the mark and the panorama image can be displayed with a pole and a signboard thereon as if the pole were driven into the ground. The length of this pole may indicate the altitude. In addition, the control section 113 displays buttons B1 and B2 toward the user so that he or she can control the movement of his or her viewpoint.

Meanwhile, the control section 113 performs a sequence of these processes by virtually placing the panorama images D1 through D3 on the map image M in this manner, forming a two-dimensional image viewed from the viewpoint PS, and mapping pixel values for the map image M and the panorama images A1 through A3 to this two-dimensional image.

Figure 78:
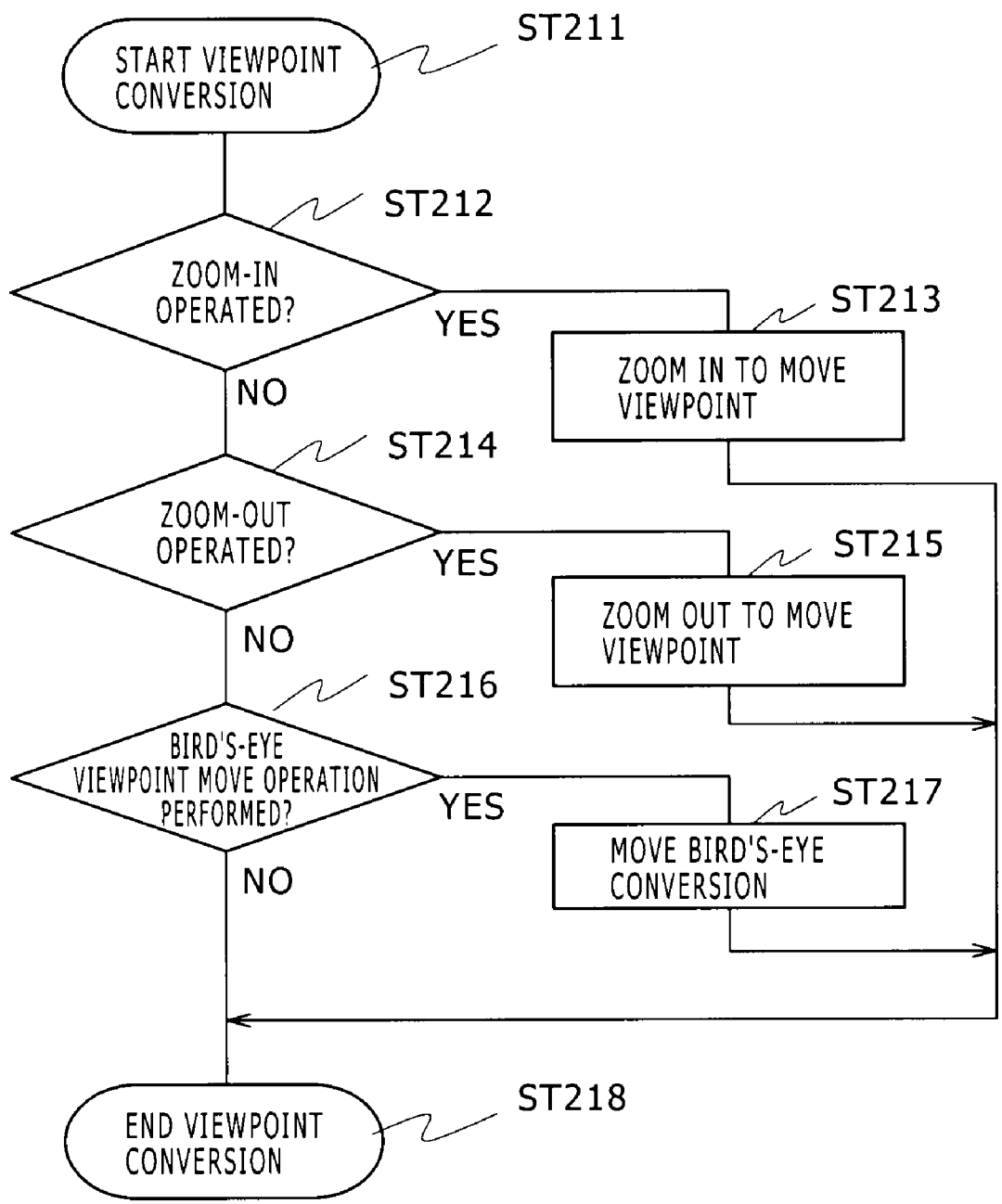
FIG. 78 is a flowchart showing a procedure of a viewpoint conversion process in the display process.

After the process at Step ST115, the control section 113 terminates the landscape image display process at Step ST116. The control section 113 proceeds to Step ST5 in FIG. 76 and performs a viewpoint conversion process. FIG. 78 shows a process of the viewpoint conversion process. That is, the control section 113 starts the viewpoint conversion process at Step ST211 and proceeds to Step ST212. Here, based on the operation information from the touch panel 118, the control section 113 uses a process related to the function block for the display image selection section 113A to determine whether or not a zoom-in operation is performed. When the zoom-in operation is performed, the control section 113 proceeds to Step ST213 and performs the viewpoint movement process for zoom-in. At Step ST218, the control section 113 then terminates the viewpoint conversion process.

When it is determined at Step ST212 that the zoom-in operation is not performed, the control section 113 proceeds to Step ST214 and determines whether or not a zoom-out operation is performed. When the zoom-out operation is performed, the control section 113 proceeds to Step ST215 and performs the viewpoint movement process for zoom-out. At Step ST218, the control section 113 then terminates the viewpoint conversion process.

Figure 83:
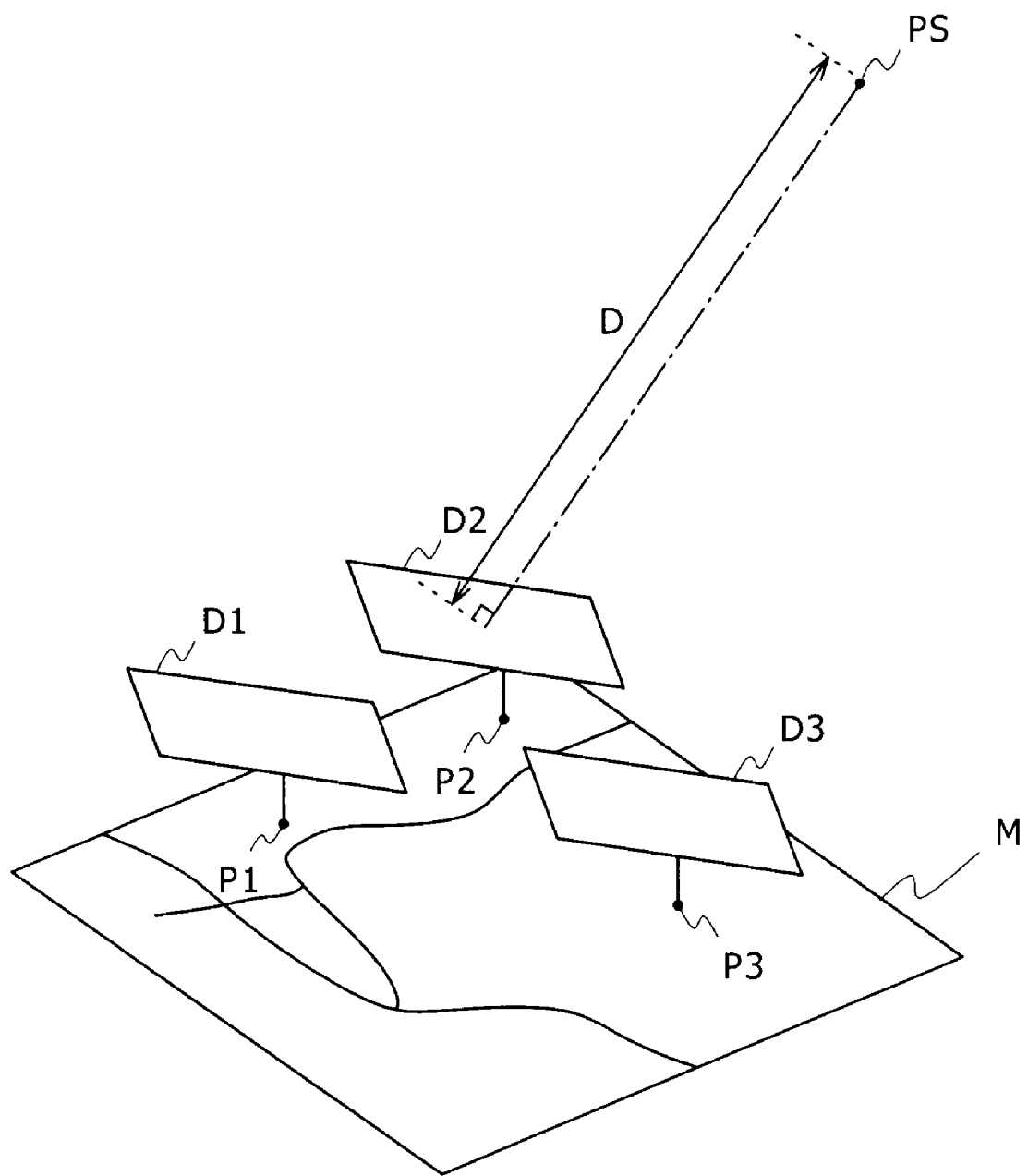
FIG. 83 illustrates a viewpoint movement process for zoom-in and zoom-out.

Here, as shown in FIG. 83, the viewpoint movement process for the above-mentioned zoom-in and zoom-out operations changes a distance D between the map image M and the viewpoint PS for a specified value. In this case, the viewpoint movement process for zoom-in decreases the distance D for a specified value and allows the viewpoint PS to approach the map image M for a specified value. On the other hand, the viewpoint movement process for zoom-out increases the distance D for a specified value and allows the viewpoint PS to leave the map image M for a specified value. The display image selection section 113A supplies the thus changed viewpoint information to the above-mentioned viewpoint coordinate conversion section 304C.

Figure 84:
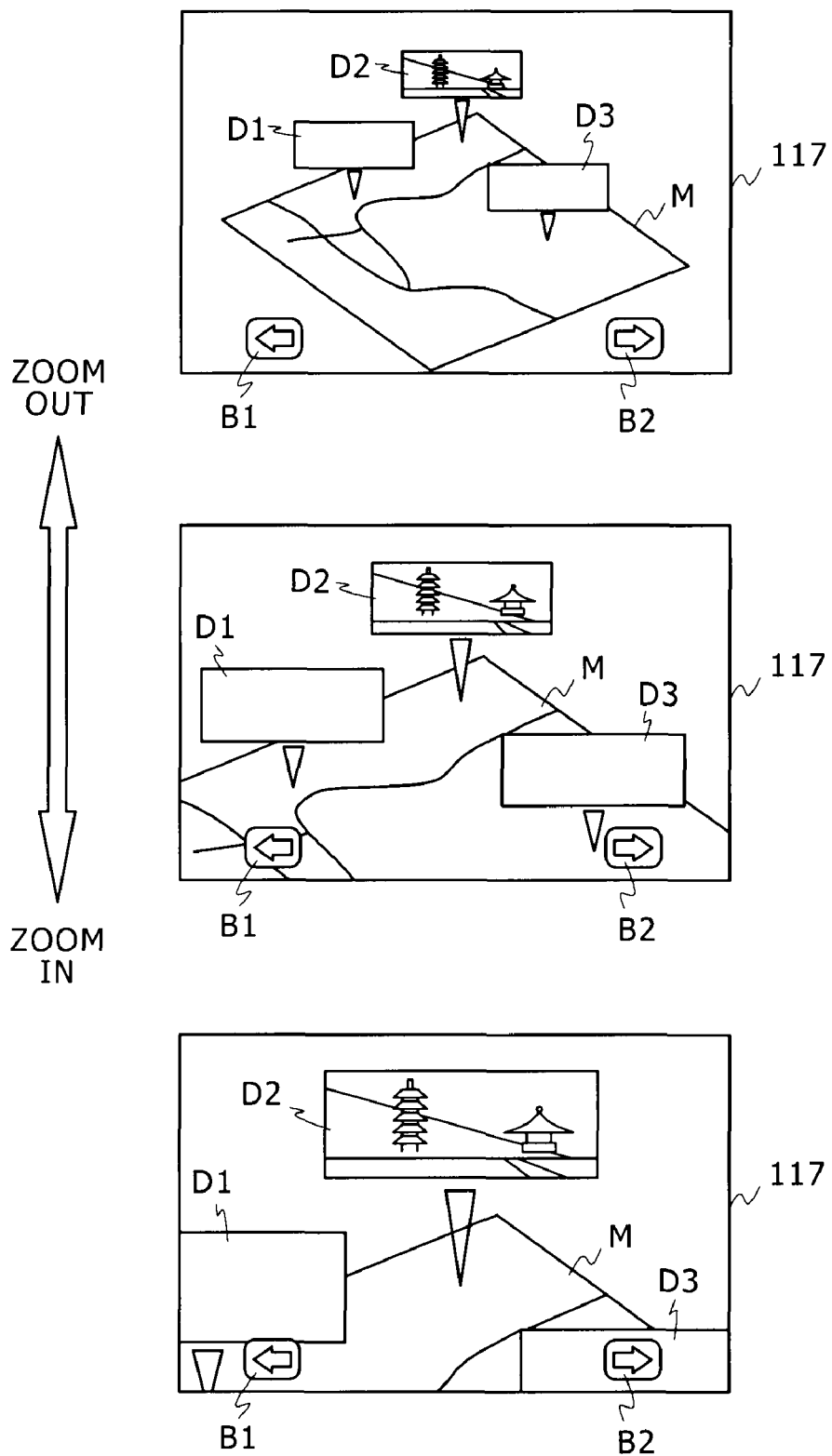
FIG. 84 shows display examples for zoom-in and zoom-out on the bird's-eye image display section.

When the zoom-in or zoom-out operation continues, the viewpoint movement process at Step ST213 or ST215 is repeated to continuously change the viewpoint PS. In this manner, the viewpoint coordinate conversion section 304C is supplied with the information about the viewpoint changed by the viewpoint movement process for the zoom-in or zoom-out operation. The viewpoint coordinate conversion process is performed so as to view the image from the viewpoint changed by this viewpoint coordinate conversion section 304C. As shown in FIG. 84, the bird's-eye image display section 117 displays images so as to zoom in or zoom out.

When the zoom-out operation is not performed at Step ST214, the control section 113 determines at Step ST216 whether or not a bird's-eye viewpoint move operation is performed. When the bird's-eye viewpoint move operation is performed, the control section 113 proceeds to Step ST217. The control section 113 uses a process related to the function block for the display image selection section 113A to perform the bird's-eye viewpoint movement process. At Step ST218, the control section 113 then terminates the viewpoint conversion process.

As shown in FIGS. 85A through 85C, for example, the above-mentioned bird's-eye viewpoint movement process moves the position of the viewpoint PS. FIG. 85A shows an example of moving the viewpoint PS at a specified speed as if hovering around a targeted point. FIG. 85B shows an example of moving the viewpoint PS at a specified speed along a specified route around a targeted point on a spheric surface of a hemisphere. These examples in FIGS. 85A and 85B assume the bird's-eye viewpoint move operation, once enabled, to be active until disabled. On the other hand, the example in FIG. 85C horizontally moves the viewpoint PS in accordance with the user's drag operation on the screen, for example. Meanwhile, this bird's-eye viewpoint move operation includes an operation of the buttons B1 and B2 (see FIG. 82) for controlling the movement of the viewpoint displayed on the screen.

When the bird's-eye viewpoint move operation continues, the viewpoint movement process at Step ST217 is repeated. The viewpoint PS varies continuously. In this manner, the viewpoint coordinate conversion section 304C is supplied with the viewpoint information changed by the bird's-eye viewpoint movement process. The viewpoint coordinate conversion process is performed so that the image is viewed from the viewpoint changed by the viewpoint coordinate conversion section 304C. In this manner, as indicated by arrows D and E1 through E3 in FIG. 80, for example, orientations of the map image M and the boards C1 through C3 are changed so as to follow the movement of the viewpoint PS. Further, the contents of the panorama images D1 through D3 displayed on the boards C1 through C3 also change.

Figure 76:
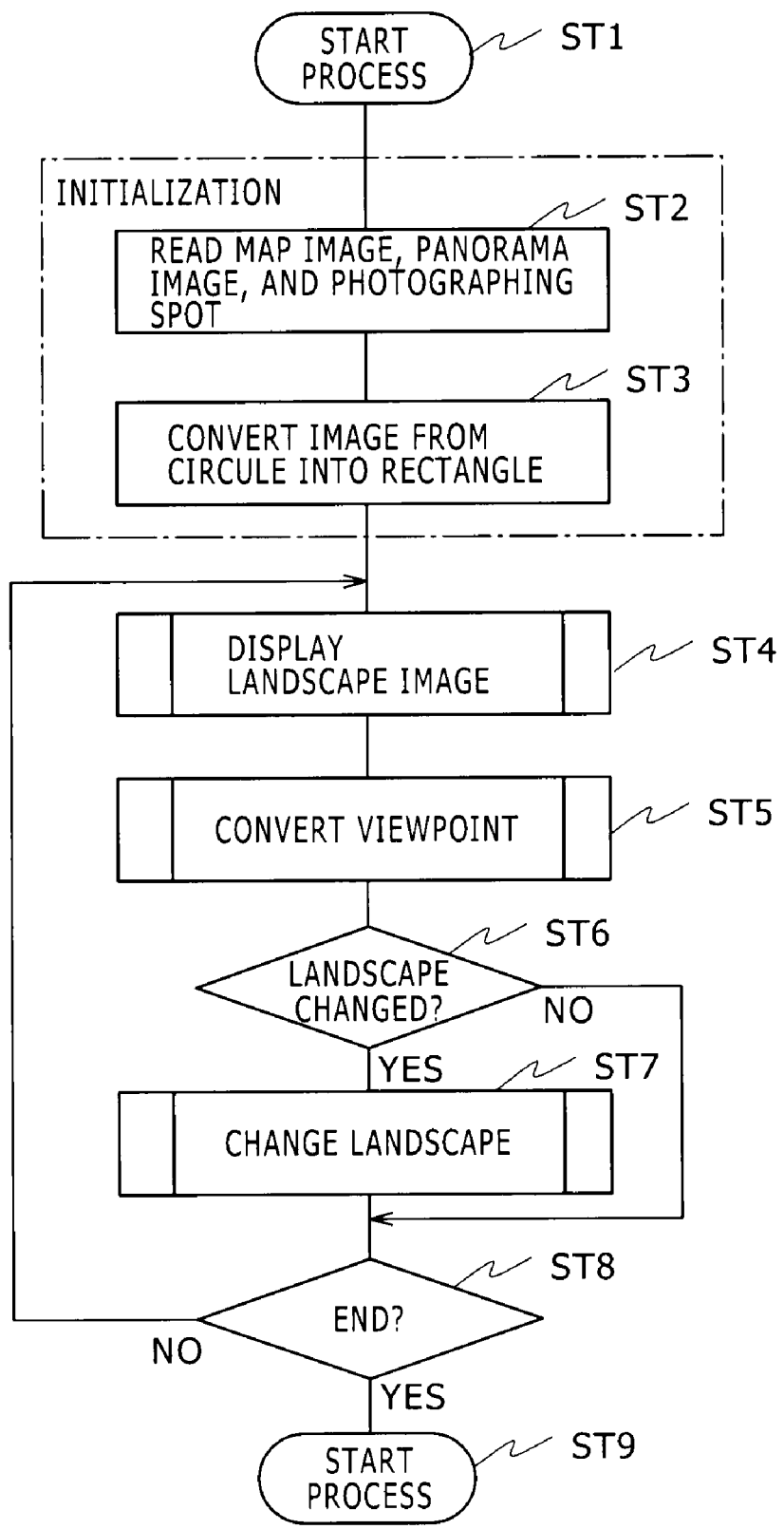
FIG. 76 is a flowchart showing a procedure of a display process by the control section included in an image display apparatus.

At Step ST218, the control section 113 terminates the viewpoint conversion process and then proceeds to Step ST6 in FIG. 76. Here, based on the operation information from the touch panel 118, the control section 113 uses a process related to the function block for the display image selection section 113A to determine whether or not a scene change operation is performed. When the scene change operation is performed, the control section 113 proceeds to Step ST7.

The user performs the scene change operation when he or she uses the touch panel 118 to select a new map image (bird's-eye image) to be displayed on the bird's-eye image display section 117. Meanwhile, in this case, the control section 113 may display the menu screen independently or along with the map image in response to a user request. Based on the menu screen, the user may select an intended map image.

Figure 79:
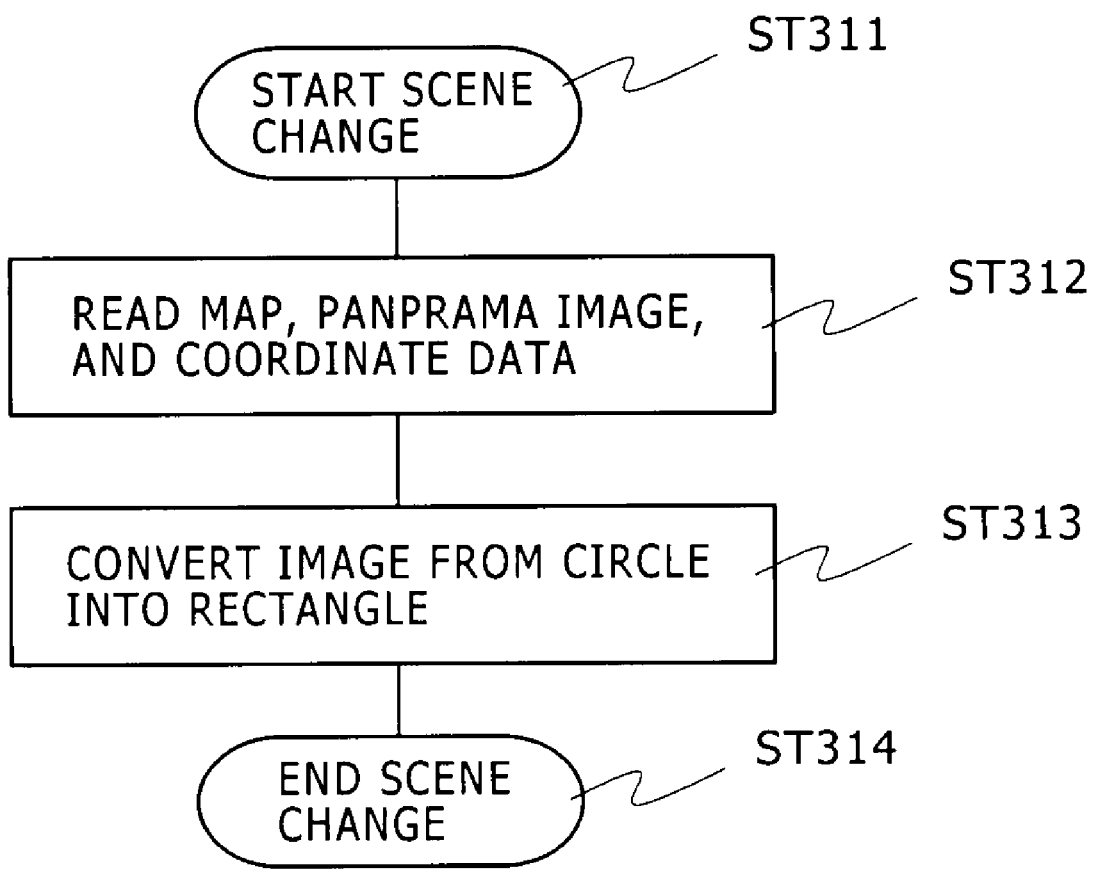
FIG. 79 is a flowchart showing a procedure of a scene change process in the display process.

FIG. 79 shows the procedure of a scene change process. That is, the control section 113 starts the scene change process at Step ST311 and proceeds to Step ST312. Here, the control section 113 reads the following from the media database 112: the image data D4 for the selected map image; the image data D3 for a panorama image photographed at a photographing spot specified on that map image; and information indicating the photographing spot.

At Step ST313, the control section 113 then uses a process related to the function block for panoramic image conversion section 304A to convert the circular panorama images A1 through A3 acquired at Step ST312 into the horizontally long rectangular panorama images B1 through B3 (see FIG. 75). The process at Steps ST312 and ST313 is equivalent to the initialization process at Steps ST2 and ST3 as mentioned above.

After the process at Step ST313, the control section 113 terminates the scene change process at Step ST314 and proceeds to Step ST8 in FIG. 76. Since the scene change process reads the new map image data D4 etc. from the media database 112 as mentioned above, the above-mentioned landscape image display process is performed using the new map image data D4 etc. Accordingly, the bird's-eye image display section 117 displays the new map image M etc. to change the scene.

When it is determined at Step ST6 in the flowchart of FIG. 76 that the scene change operation is not performed, the control section 113 immediately proceeds to Step ST8. Here, the control section 113 determines whether or not to terminate the display on the bird's-eye image display section 117. For example, the control section 113 determines the termination of the display when the power supply is turned off or when the user touches a specified location of the touch panel 118 twice successively. Further, for example, the control section 113 determines the termination of the display when a specified time period expires after the last time of the user operation on the touch panel. Meanwhile, the condition to determine the termination is not limited thereto.

When the display is not determined to terminate, the control section 113 returns to Step ST4 and repeats the same process as that mentioned above. On the other hand, when the display is determined to terminate, the control section 113 proceeds to Step ST9 and terminates the display process.

As mentioned above, the image display apparatus 301 in FIG. 73 starts the display process when the power supply is turned on or when the user touches anywhere on the touch panel 118. At first, the control section 113 reads the following from the media database 112: the image data D4 for a map image to be displayed in an initial state; the image data D3 for a panorama image photographed at a photographing spot specified on that map image; and information indicating the photographing spot. The control section 113 generates a display image using the image data etc. In this case, panorama images are photographed and captured at photographing spots. The control section 113 arranges the panorama images at the photographing spots on the map image and converts the panorama images into images viewed from the viewpoint. In this manner, the bird's-eye image display section 117 displays an image containing the panorama images arranged on the map image as viewed from the viewpoint (see FIGS. 82A and 82B).

In this manner, the bird's-eye image display section 117 displays the map image where the panorama images are arranged. After that, the user may use the touch panel 118 to perform an operation (zoom-in operation, zoom-out operation, bird's-eye viewpoint move operation, etc.) to change the viewpoint. In such case, the control section 113 accordingly performs the viewpoint movement process to change the image containing the panorama images arranged on the map image displayed on the bird's-eye image display section 117 in accordance with the movement of the viewpoint position.

Further, in this manner, the bird's-eye image display section 117 displays the map image where the panorama images are arranged. After that, the user may use the touch panel 118 to change the scene. In such case, the control section 113 reads the following from the media database 112: the image data D4 for the newly selected map image; the image data D3 for a panorama image photographed at a photographing spot specified on that map image; and information about the photographing spot. The bird's-eye image display section 117 displays an image based on the new map image data D4 etc. to change the scene.

In this manner, the image display apparatus 301 in FIG. 73 allows the bird's-eye image display section 117 to display an image containing the panorama images (photographed images) arranged at photographing spots in the map image M (bird's-eye image), where the panorama images were photographed at the photographing spots. Accordingly, it is possible to easily recognize the geographical relationship between multiple panorama images, i.e., the panorama images D1 through D3 according to the above-mentioned embodiment.

Further, the image display apparatus 301 in FIG. 73 arranges the panorama image at the photographing spot in the map image M so as to be oriented toward the viewpoint PS. In addition, the map image M containing the arranged panorama image is converted into an image viewed from the viewpoint to provide a display image. Accordingly, the map image M is displayed so as to be viewed from the viewpoint PS. The panorama image is also displayed so as to be positioned straight toward the viewpoint PS. It is possible to display an image conformable to the viewing direction and more easily recognize the geographical relationship between multiple panorama images.

Moreover, the image display apparatus 301 in FIG. 73 extracts a partial area corresponding to the viewpoint from the panorama image as a wide-angle image and arranges that area at the photographing spot in the map image M (see FIG. 81). Accordingly, the panorama image displayed on the map image M can correspond to the viewpoint, i.e., can be viewed from the viewpoint direction. The user can confirm that image and therefore fully understand the place represented by the map image and the panorama image.

Furthermore, the image display apparatus 301 in FIG. 73 allows the user to use the touch panel 118 as a user operation section and change the position of the viewpoint PS. Accordingly, the user can change the viewpoint position and the orientation of the map image M to be displayed. Since the content of the panorama image arranged on the map image M changes accordingly, it is possible to more easily recognize the geographical relationship between multiple panorama images.

Still further, the image display apparatus in FIG. 73 arranges the panorama image on the map image M by extracting a partial area from the panorama image (see FIG. 81). Even when many horizontally long panorama images are displayed, they can be prevented from overlapping with each other to ensure the viewability. It is also possible to more easily recognize the geographical relationship between panorama images.

Meanwhile, when a few panorama images are arranged on the map image M, the extraction process may be omitted and the panorama images may be directly arranged. In this case, while the panorama images are arranged on the map image M, the display of parts of the panorama images is scrolled so that the part viewable from the viewpoint direction is positioned to the horizontal center of the panorama images. In this manner, it is possible to ensure the conformity between the viewing direction from the viewpoint and a landscape actually viewable at the site.

Figure 86:
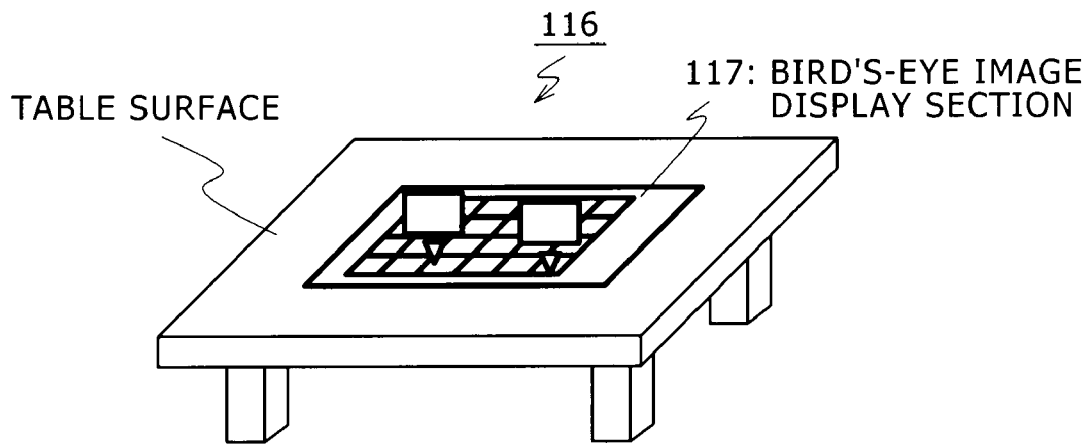
FIG. 86 shows an example of the remote commander whose table surface is provided with the bird's-eye image display section.

According to the above-mentioned embodiment, the image display apparatus 301 shown in FIG. 73 is used to display a bird's-eye image on the bird's-eye image display section 117 of the remote commander 116 in the image display system 101 shown in FIG. 19. FIG. 86 shows an example of forming the remote commander 116 into a table as furniture and providing the bird's-eye image display section 116 on the table surface.

Figure 87:
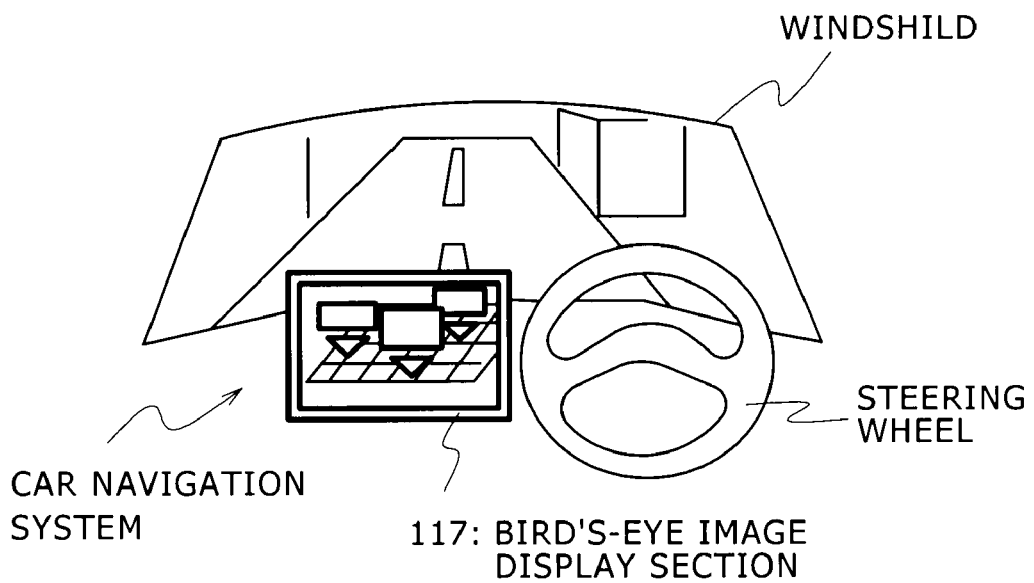
FIG. 87 shows an example applied to a car navigation system.

Further, the image display apparatus 301 as shown in FIG. 73 can be also used for a car navigation system as shown in FIG. 87.

In this case, for example, the system arranges and displays a corresponding panorama image at a current position detected by the GPS (Global Positioning System) etc. or on the map image corresponding to a destination specified by the user. At this time, the system displays the map image and the panorama image by setting the viewpoint in a default direction and further setting the viewpoint in accordance with the orientation of a car detected by the GPS etc.

Further, the system accepts the selection of a destination on the map image in accordance with an operation on the touch panel provided for the display screen and further accepts the selection of a destination in accordance with the selection of a panorama image. The system moves the viewpoint position to various directions in accordance with a similar operation on the touch panel. Meanwhile, moving the viewpoint includes rotation etc. around the center of the displayed map and movement parallel to the displayed map. The rotation can confirm an intended place by viewing it from various directions. The parallel movement can confirm a guided route, for example.

Figure 88:
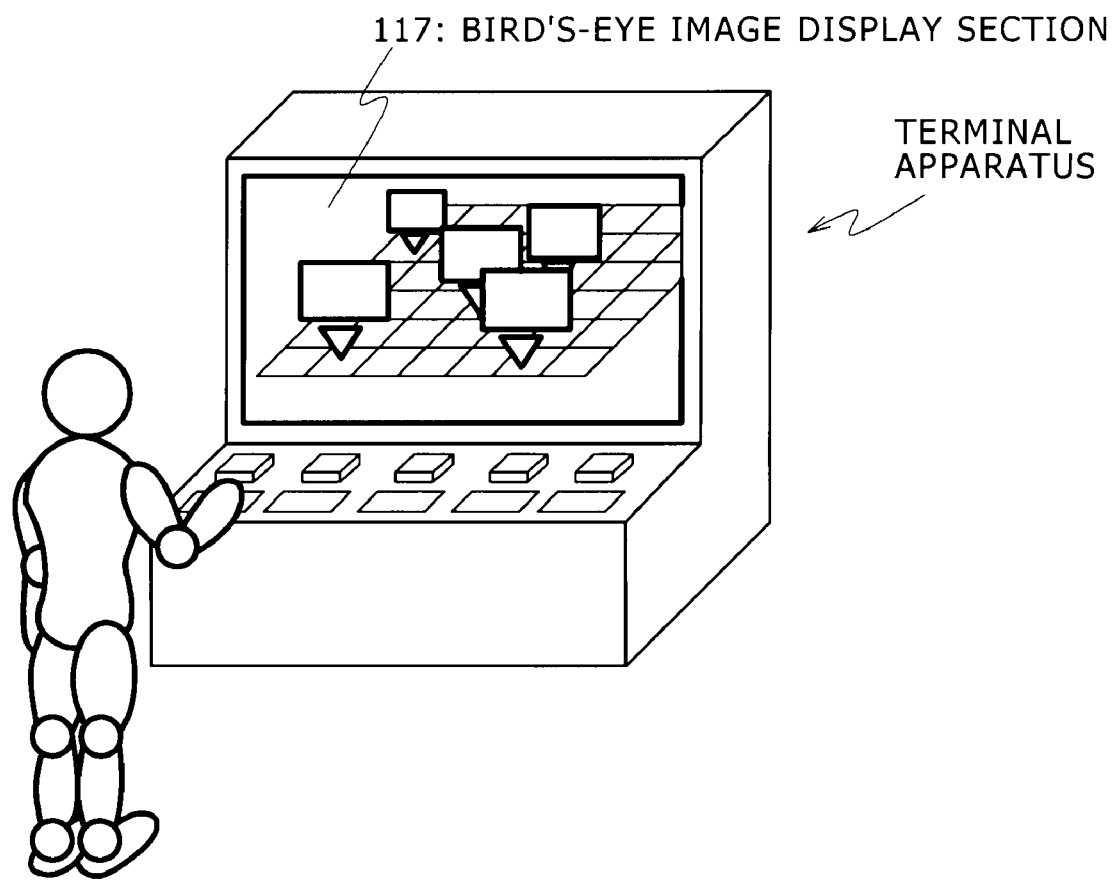
FIG. 88 shows an example applied to a terminal apparatus at a station, a convenience store, etc.

Further, the image display apparatus 301 shown in FIG. 73 can be similarly used for a terminal apparatus as shown in FIG. 88 installed at a railroad station, convenience store, etc.

While the above-mentioned embodiment has described the case of arranging and displaying a panorama image on the map image, the invention is not limited thereto. Instead of panorama images, the invention can be widely applied to cases of displaying too large a wide-angle image to be displayed on one screen as well as a normal field-angle image.

While the above-mentioned embodiment has described the case of displaying the image data by acquiring it from the media database 112 including the HDD etc., the invention is not limited thereto. For example, the invention can be widely applied to a case of accessing a networked server and acquiring image data.

While the above-mentioned embodiment has described the case of using a still picture as a photographed image, the invention is not limited thereto. A motion picture may be used as a photographed image. While the above-mentioned embodiment has described the case of applying the invention to the remote commander of the image display system and the car navigation system, the invention is not limited thereto and may be widely applied to various image displays such as an image viewer, for example.

INDUSTRIAL APPLICABILITY

The present invention can excellently audiovisually receive contents without disordering a room atmosphere and can be applied to an audiovisual system for audiovisually receiving video contents and audio contents.

The invention claimed is:

1. An audiovisual system for audiovisually presenting contents, the system comprising:
a room having a plurality of vertical walls, each including an inner wall and an outer wall provided with a specified interval therebetween, wherein an inner wall of at least one of the plurality of vertical walls includes a plurality of replaceable plate-like members; and equipment placed in a space between an inner wall and an outer wall of at least one of the plurality of vertical walls in the room and configured to provide the inner wall with at least one of a video display function and an audio output function, wherein the room has a room entrance for entering an inside through an outer wall and an inner wall of at least one of the plurality of vertical walls, and a side of the room entrance includes an entrance to a space between the inner wall and the outer wall of the at least one of the plurality of vertical walls.

2. The audiovisual system according to claim 1, wherein a space between the inner wall and the outer wall of each of the plurality of vertical walls is large enough for a person to enter.

3. The audiovisual system according to claim 1, wherein the room has a double ceiling structure including an under-the-roof portion and a ceiling provided with a specified interval to the under-the-roof portion.

4. The audiovisual system according to claim 1, wherein the room has a double floor structure including an under-the-floor portion and a floor provided with a specified interval to the under-the-floor portion.

5. The audiovisual system according to claim 1, wherein the room has a double ceiling structure including an under-the-roof portion provided with a specified interval to the under-the-roof portion;

the room has a double floor structure including an under-the-floor portion and a floor provided with a specified interval to the under-the-floor portion; and the inner walls of each of the plurality of vertical walls, the ceiling, and the floor form a structure supported by a plurality of legs against the under-the-floor portion.

6. The audiovisual system according to claim 1, wherein the room has a double ceiling structure including an under-the-roof portion provided with a specified interval to the under-the-roof portion;

the room has a double floor structure including an under-the-floor portion and a floor provided with a specified interval to the under-the-floor portion; and the ceiling and the floor are fixed to the outer walls of each of the plurality of vertical walls and the inner walls of each of the plurality of vertical walls are fixed to the ceiling and the floor.

7. The audiovisual system according to claim 1, wherein an inner wall of at least one of the plurality of vertical walls forms a rear-projection screen; and equipment to be placed in a space between the inner wall and an outer wall of the at least one of the plurality of vertical walls includes a projector configured to project a video on the screen.

8. The audiovisual system according to claim 7, wherein the projector is fixed to the outer wall of the at least one of the plurality of vertical walls such that a shorter-side direction corresponds to a wall-thickness direction; and video light is emitted from the projector in a direction along the outer wall, reflected on a mirror, and radiated to the screen.

9. The audiovisual system according to claim 1, wherein an inner wall of at least one of the plurality of vertical walls forms a diaphragm provided with an oscillator; and equipment to be placed in a space between the inner wall and an outer wall of the at least one of the plurality of vertical walls includes a drive device configured to drive the oscillator based on an audio signal.

\* \* \* \* \*